(12) United States Patent
Le et al.

(10) Patent No.: US 6,826,669 B1
(45) Date of Patent: Nov. 30, 2004

(54) MULTI-PROTOCOL MEMORY LOOKUP SYSTEM AND METHOD

(75) Inventors: Chinh H. Le, San Jose, CA (US); Ahmad Fawal, San Jose, CA (US)

(73) Assignee: LeWiz Communications, San Jose, CA (US)

(*) Notice: Subject to any disclaimer, the term of this patent is extended or adjusted under 35 U.S.C. 154(b) by 186 days.

(21) Appl. No.: 10/140,910

(22) Filed: May 6, 2002

Related U.S. Application Data

(60) Provisional application No. 60/289,662, filed on May 8, 2001, provisional application No. 60/289,684, filed on May 8, 2001, provisional application No. 60/289,677, filed on May 8, 2001, provisional application No. 60/289,656, filed on May 8, 2001, provisional application No. 60/289,661, filed on May 8, 2001, provisional application No. 60/289,664, filed on May 8, 2001, and provisional application No. 60/289,645, filed on May 8, 2001.

(51) Int. Cl.[7] .............................................. G06F 12/00
(52) U.S. Cl. ........................ 711/173; 711/1; 711/108; 711/144; 711/173; 711/205; 711/217; 711/220; 370/254; 370/389; 370/392; 370/463; 370/466
(58) Field of Search .............................. 711/108, 202, 711/103, 104, 119, 1, 144, 173, 205, 217, 220; 370/395.52, 395.5, 474, 254, 389, 392, 463, 466

(56) References Cited

U.S. PATENT DOCUMENTS

| | | | | |
|---|---|---|---|---|
| 4,959,811 A | * | 9/1990 | Szczepanek ................. | 365/49 |
| 5,537,623 A | * | 7/1996 | Chamberlain et al. ...... | 709/220 |
| 5,579,503 A | * | 11/1996 | Osborne ...................... | 711/119 |
| 5,649,149 A | * | 7/1997 | Stormon et al. ............ | 711/108 |
| 6,430,527 B1 | * | 8/2002 | Waters et al. ................. | 703/3 |
| 6,449,631 B1 | * | 9/2002 | Takamoto et al. .......... | 709/200 |
| 2001/0044876 A1 | * | 11/2001 | Brown ........................ | 711/108 |
| 2003/0189932 A1 | * | 10/2003 | Ishikawa et al. ............ | 370/392 |

OTHER PUBLICATIONS

Thomas et al, Nov. 4–7, 1991, IEEE MILCOM 91, vol. 1; pp. 193–197.*

* cited by examiner

Primary Examiner—Donald Sparks
Assistant Examiner—Hashem Farrokh
(74) Attorney, Agent, or Firm—Townsend and Townsend and Crew LLP

(57) ABSTRACT

A memory system includes a memory array for storing a plurality of data elements, the memory array comprising a plurality of memory blocks. In one embodiment, the data element are tag string data. The memory system may also include a comparator unit coupled to receive a memory block output and an input signal, wherein when the memory block output matches the input signal, the memory system transmits a match signal and a code word on a result bus. In one embodiment, data elements are stored as fragments in different portions of the memory array. The input signal may be received as fragments and compared to the data elements over different time periods. In one embodiment, the present invention provides a memory lookup system and method that supports multiple protocols.

14 Claims, 36 Drawing Sheets

| OSI | TCP/IP |
|---|---|
| Application (Layer 7) | Application (HTTP, FTP, SMTP, etc.) |
| Presentation (Layer 6) | |
| Session (Layer 5) | |
| Transport (Layer 4) | Transport (TCP/UDP) |
| Network (Layer 3) | Internet (IP) |
| Data link (Layer 2) | MAC |
| Physical (Layer 1) | PHY |

*FIG. 1*

| Rd    | HD 1 | HD 2 | HD3 | HD4 |   |   |   |   |
|-------|------|------|-----|-----|---|---|---|---|
| CMP 1 |      | 1    | 2   | 3   | 4 |   |   |   |
| CMP 2 |      |      | 1   | 2   | 3 | 4 |   |   |
| RES   |      |      |     | 1   | 2 | 3 | 4 |   |

HD = Header
Pipe Latency = 4
Pipe Complete = # of elements + 3 CLKs (7 clocks for 4 elements)
Pipe Stop if matched

*FIG. 10*

MULTI-PROTOCOL MEMORY LOOKUP SYSTEM AND METHOD

CROSS-REFERENCES TO RELATED APPLICATIONS

This application claims priority to U.S. provisional application Nos. 60/289,662, 60/289,684, 60/289,677, 60/289,656, 60/289,661, 60/289,664, and 60/289,645, all filed May 8, 2001, which are all incorporated by reference along with any references cited in this application.

BACKGROUND OF THE INVENTION

The present invention relates generally to data communication networks and network content processing, and more particularly, to a memory lookup system and method that supports multiple protocols.

Data communication networks are used to interconnect many data processing resources, including computers, workstations, servers, printers, modems, and storage devices. For example, two or more computers may be connected together through a network such as a local area network, wide area network, or the Internet. Network users are able to share files, printers and other resources, send messages and run applications on remote computers. An important part of any data communication network includes the physical components or network communication devices used to interconnect the data processing resources. The design, architecture, and data processing techniques of the individual network components (e.g., routers, switches, and/or servers) may limit the speed and functionality of the data communication network. Moreover, network components are typically comprised of integrated circuit components that are configured together to carry out the operations and implement the functionality of the particular type of network component. For example, a network component such as a server may include integrated circuit components such as a microprocessor, microcontroller, application specific integrated circuit, memory, logic chips, and other types of chips. Accordingly, the design, architecture, and data processing techniques of the integrated circuit components utilized by the network components may also limit the speed and functionality of the computer network.

The speed of networking interconnect technologies is moving toward giga/tera bit per second range with the introduction and adoption of optical communication technologies. This implies an ever-increasing amount of information flowing through the Internet pipeline. Accordingly, there is an increasing demand on the network components and integrated circuit components to process and deliver the increasing volumes of information to the users. One term commonly used to describe the rate network components process information is bandwidth. Bandwidth can be affected by a variety of factors such as the efficiency of the system architecture and data processing techniques. As more data is placed on the network, the bandwidth of the network components and integrated circuit components will become a limiting factor in the speed of the overall network.

Therefore, there is a need to increase the efficiency of the network components and integrated circuit components to more efficiently use available bandwidth and improve the functionality of data networks.

SUMMARY OF THE INVENTION

Embodiments present invention include a system and method for performing memory lookup operations in a memory system. The techniques of the present invention may be used advantageously in a parser dictionary lookup unit ("DLU") for receiving protocol string data, such as tag string data, and comparing the input protocol string data against data elements in a memory array. In one embodiment, code words corresponding to pre-loaded data elements may be transmitted on a DLU system output and used by other resources in the parser.

In one embodiment, the present invention includes a memory system comprising a memory array for storing a plurality of data elements and a plurality of code words, the memory array comprising a plurality of memory blocks, an address generator including an address line coupled to each memory block to simultaneously access individual memory locations in each memory block, the memory blocks producing a data element on a memory block output in response to receiving an address signal on the address line, and a plurality of comparators, each comparator coupled to receive a memory block output and an input signal. Furthermore, when the memory block output matches the input signal, the memory system transmits a match signal and at least one of the code words on a result bus, and when the memory block output does not match the input signal, the memory system does not transmit a match signal and at least one of the code words on the result bus.

In another embodiment, the present invention includes a memory system comprising a memory array for storing a plurality of first data fragments and second data fragments, each of the first data fragments corresponding to one of the second data fragments, a comparator unit coupled to a memory array output and to an input signal, the input signal having a first state during a first time period and a second state during a second time period, and an output stage coupled to receive a comparator unit output signal and generate a match signal when the input signal first state and second state matches one of the first data fragments and corresponding one of the second data fragments stored in the memory array. The memory array sequentially transmits at least a portion of the first data fragments to the comparator unit during the first time period for comparison with the first state of the input signal, and the memory array sequentially transmits at least a portion of the second data fragments to the comparator unit during the second time period for comparison with the second state of the input signal.

In another embodiment, the present invention includes a method comprising receiving input string data in a memory system, generating a start address, transmitting the start address to a memory array to simultaneously access a plurality of memory blocks, comparing the input string data to string data elements stored in the memory locations in each of the plurality of memory blocks identified by the start address, and transmitting a match signal and a code word when the input string data matches one of the string data elements. In another embodiment, the start address accesses one of a plurality of protocol segments in each memory block. In another embodiment, the memory array stores string data for a plurality of protocols.

In another embodiment, the present invention includes a method comprising receiving a first input string data fragment in a memory system during a first time period, comparing the first input string data fragment to first string data fragments stored in a first portion of a memory array, receiving a second input string data fragment in the memory system during a second time period, comparing the second input string data fragment to second string data fragments stored in a second portion of a memory array, and transmitting a match signal and a code word when the first and second input string data fragments matches one of the first and second string data fragments stored in the memory array. In another embodiment, the first portion of memory array comprises a plurality of memory banks, each bank storing a plurality of first string data fragments. In another embodiment, the plurality of memory banks are accessed simultaneously and first string fragments in each memory bank are compared to the first input string fragment simultaneously. In another embodiment, the memory array stores string fragments for a plurality of protocols.

In another embodiment of the present invention, the system supports a plurality of protocols including at least two protocols selected from the group consisting of HTTP, SMTP, FTP, XML, ebXML, DNS, SSL, and POP3.

Other objects, features, and advantages of the present invention will become apparent upon consideration of the following detailed description and the accompanying drawings.

BRIEF DESCRIPTION OF THE DRAWINGS

FIG. 1 illustrates a comparison of the standard open system interconnect networking model and the TCP/IP networking model.

FIG. 10 illustrates the operation of the data pipeline according to one embodiment of the present invention.

DETAILED DESCRIPTION

The present invention provides for a multi-protocol memory lookup system and method. The techniques of the present invention may be utilized in a network component such as a router, switch, or server, for example. Additionally, the techniques of the present invention may be implemented in a stand alone integrated circuit or, alternatively, incorporated as part of a larger integrated circuit system. A multi-protocol memory lookup system according to one embodiment of the present invention may include a memory array including a plurality of memory blocks. At least one of the memory blocks includes one or more protocol segments for defining a group of protocol data elements within the memory block. Each protocol segment includes at least one protocol data element stored in a memory location identified by an address. The memory location may also store additional data associated with the protocol data element. The multi-protocol memory lookup system may receive an input signal. The system may then access the protocol data elements and return a match signal if the input signal matches one of the protocol data elements.

FIG. 1 illustrates a comparison of the standard open system interconnect networking model and the TCP/IP networking model helpful in understanding the features and advantages of the present invention. The standard open system interconnect ("OSI") networking model includes Application Layer 7, Presentation Layer 6, Session Layer 5, Transport Layer 4, Network Layer 3, Data Link Layer 2, and Physical Layer 1. As illustrated in FIG. 1, TCP/IP follows a similar model. The TCP/IP networking model includes Application Layer 5, Transport Layer 4, Internet Layer 3, Media Access Control ("MAC") Layer 2, and Physical ("PHY") Layer 1.

Figure 2:
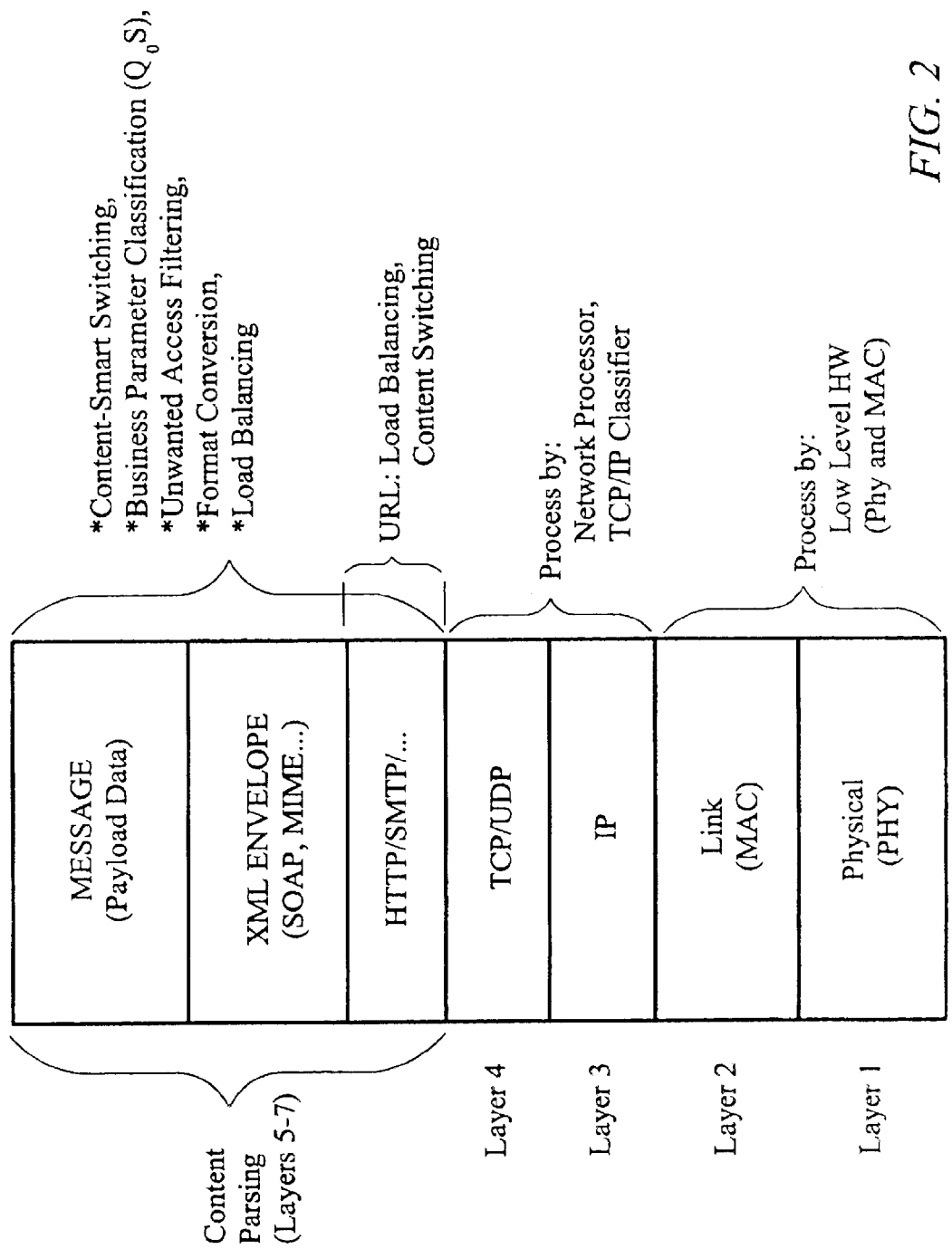
FIG. 2 illustrates sublayers of the TCP/IP networking model.

In practice, the top layer of the TCP/IP model is further divided into other sublayers. FIG. 2 illustrates sublayers of the TCP/IP networking model. Layers 1–4 of the TCP/IP model are the same as in FIG. 1. Namely, layer 1 is the physical layer, layer 2 is the MAC (i.e., Link) layer, layer 3 is the internet protocol ("IP") layer, and layer 4 is the Transmission Control Protocol ("TCP") and User Datagram Protocol ("UDP") layer. However, FIG. 2 illustrates how information is distributed across TCP/IP layers 5, 6 and 7. Layer 5 may contain Hypertext Transfer Protocol ("HTTP") information, Simple Mail Transfer Protocol ("SMTP") information, or File Transfer Protocol ("FTP") protocol information, for example. Layer 6 may contain an ebXML protocol, simple object access protocol ("SOAP"), or other extended markup language ("XML") protocol. Layer 7 generally contains the message payload. In some embodiments layer 6 may not exists. In that case, only layer 5 information such as HTTP and the message payload of layer 7 will be present.

Unlike layers 1–3, which carry binary or hex intensive protocols such as TCP or IP, layers 5–7 carry string intensive protocols. A string, or character string, is defined as a data structure composed of a sequence of characters that typically represent human readable text, and are interpreted by a computer as text rather than as numbers, as is well known by those skilled in the art. A string may contain any sequence of elements from a given character set, such as letters, numbers, control characters, ASCII, or extended ASCII. A character, on the other hand is a letter, number, punctuation mark, or other symbol or control code that is represented to a computer by one unit (e.g., 1 byte) of information as is also well known by those skilled in the art. Therefore, layers 1–3 implement the low level coding for implementing and facilitating the transfer of information between computers on a network. On the other hand, layers 5–7 contain the content of the actual information for the application or applications. The layer 5–7 data is primarily in string format and may be of variable lengths depending upon the application and/or type of transaction.

Figure 3:
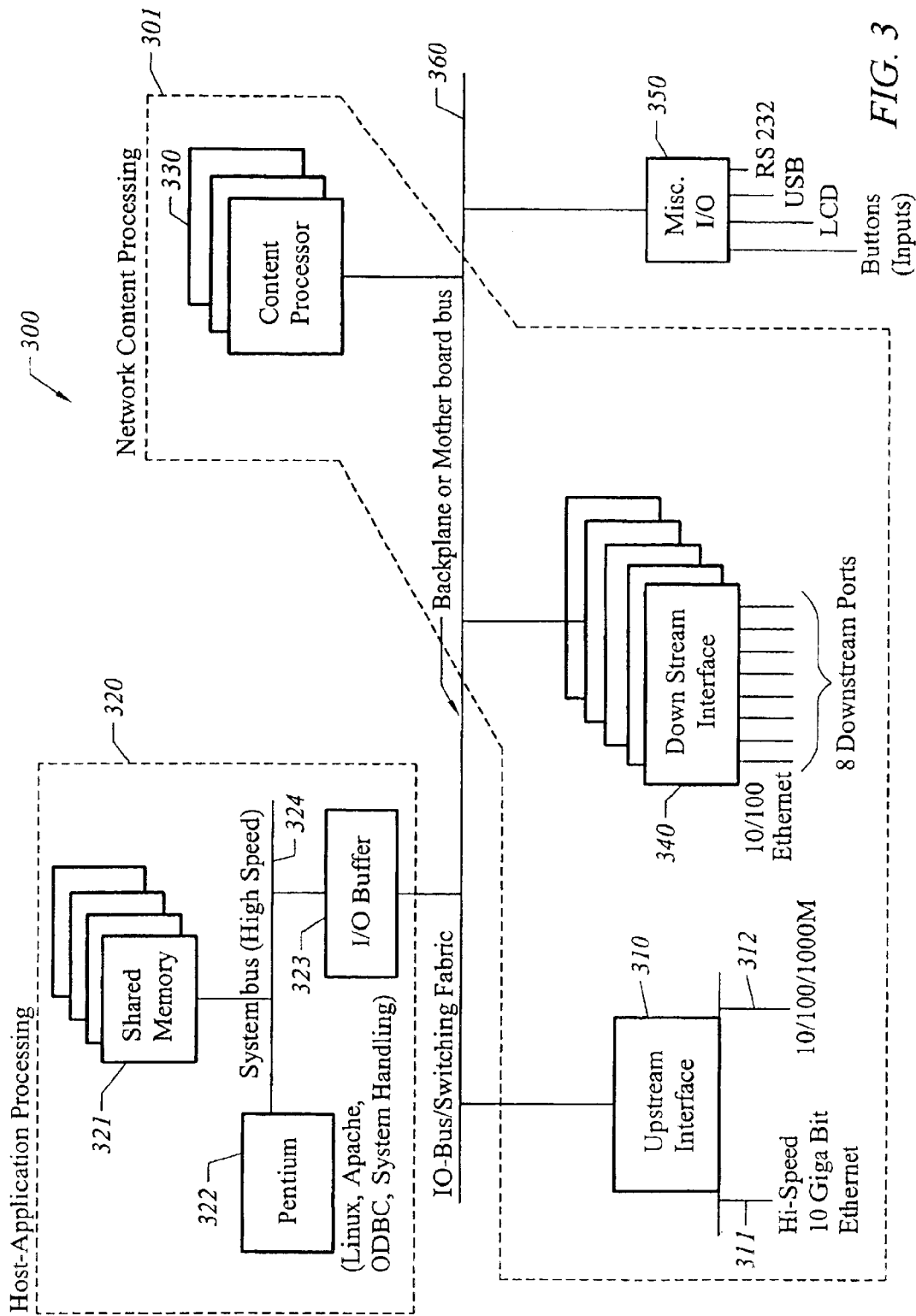
FIG. 3 illustrates a system including a content processor that utilizes a multi-protocol memory lookup system in accordance with one embodiment of the present invention.

FIG. 3 illustrates a network processing system 300 including a content processor 330 that utilizes a multi-protocol memory lookup system in accordance with one embodiment of the present invention. The network processing system 300 includes a host application processor 320, a network content processing system 301, an input-output bus 360, and input-output interface units 350. The network content processing system 301 includes content processor 330, upstream interface 310, and down stream interface 340. The upstream interface 310, host application processor 320, content processor 330, down stream interface 340, and input-output interface units 350 are coupled together by the input-output bus 360.

Network data is received from an external network in the upstream interface unit 310. The upstream interface unit 310 may include a Hi-Speed 10 Giga Bit Ethernet input 311 or 10/100/1000M Ethernet input 312, for example. The upstream interface unit is coupled to input-output bus 360. Data received in the upstream interface unit 310 may be transmitted to the input-output bus 360 for transmission to the host application processor or the content processor. According to one embodiment of the present invention, the content processor 330 receives network data from the upstream interface and executes parsing and classification operations on the level 5–7 string data within the network data. The results of the parsing and classification operations may be used to control the flow of information in the network. Additionally, the host application processor 320 includes a microprocessor 322 (e.g., Pentium) which may be running on a Linux operating system, for example. The host application processor 320 also includes shared memory 321, and I/O buffer 323 coupled together by host processor bus 324 which may be a high speed system bus, for example. The I/O buffer 323 couples the host application processor 320 to the input-output bus 360. The host processor may be used to configure and control the network content processing system 301 and thereby control the flow of data through the network.

Figure 4:
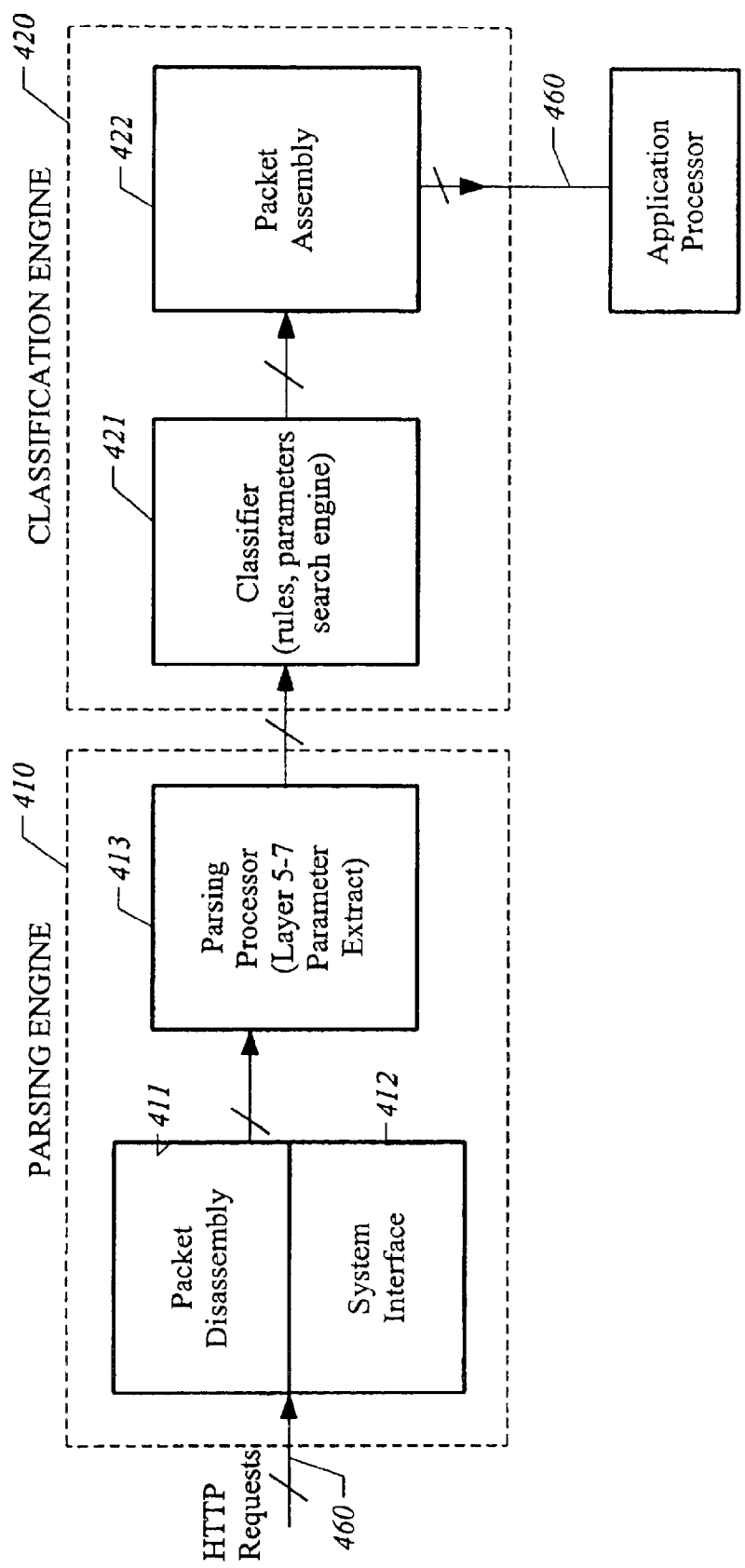
FIG. 4 illustrates a functional block diagram of a content processor according to one embodiment of the present invention.

FIG. 4 illustrates a functional block diagram of a content processor 400 according to one embodiment of the present invention. The content processor 400 includes a parsing engine 410 (i.e., a parser) and a classification engine 420. Network data is transmitted to the content processor 400 from the input-output bus 460 and received in parser 410. In one embodiment, the network data transmitted to the parser 410 includes HTTP requests. The network data is received in the parser 410 under the control of the parser system interface unit 412. The network data is then disassembled in packet disassembly unit 411 and transmitted to the parsing processor 413. The parsing processor 413 extracts parameters from layers 5–7 of the network data. The parsed network data is then transmitted to the classification engine 420. The classification engine 420 includes a classifier 421 and packet assembler 422. The data is then reassembled into packets and transmitted to the host application processor 430 over input-output bus 460.

Figure 5:
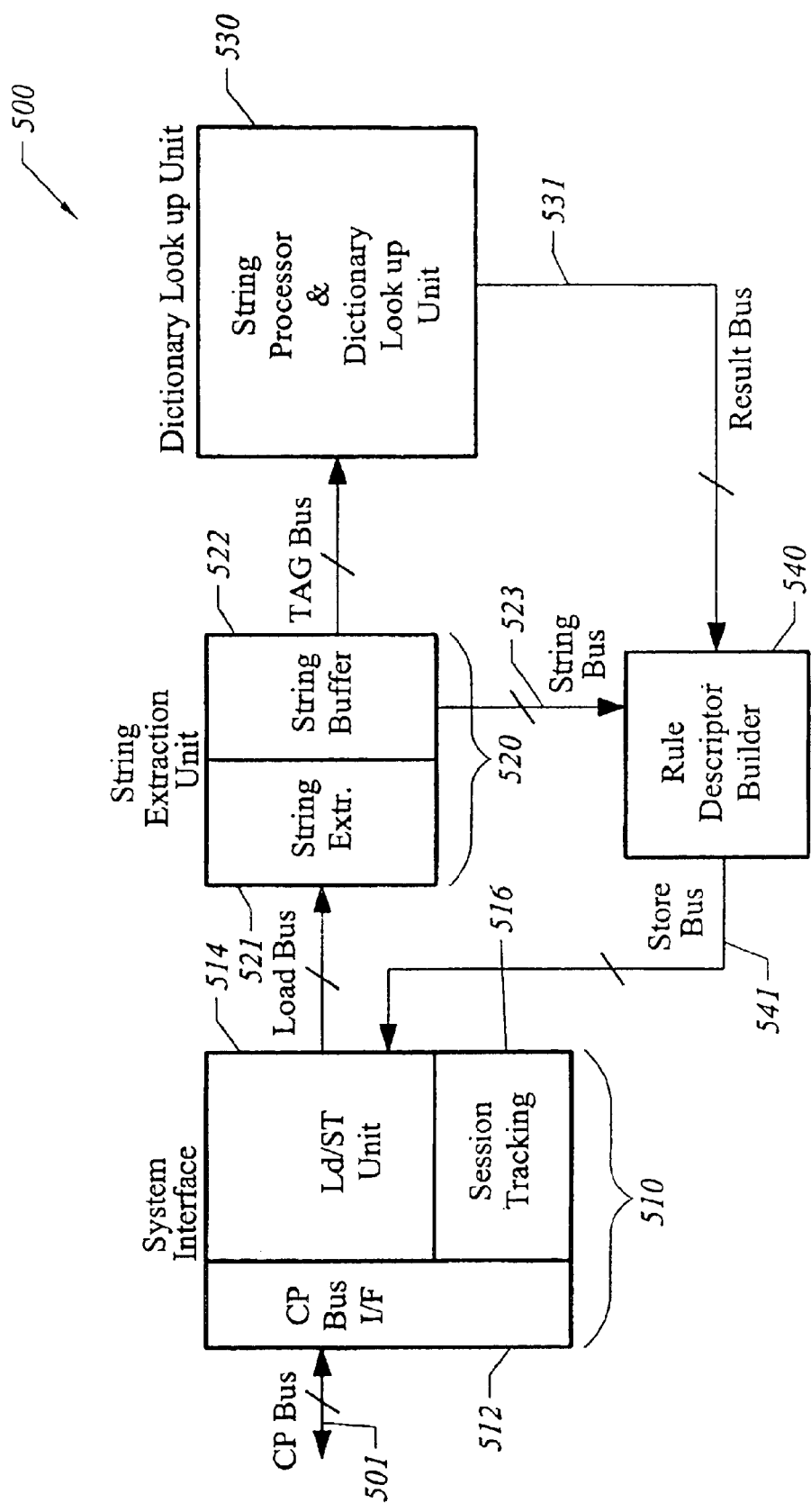
FIG. 5 illustrates a functional block diagram of a parsing engine according to one embodiment of the present invention.

FIG. 5 illustrates a functional block diagram of a parser 500 according to one embodiment of the present invention. The parser 500 includes a system interface unit 501, a string extraction unit 520, a dictionary lookup unit 530, and a descriptor builder also referred to as a query builder 540. The system interface unit 510 includes a content processor bus interface ("CP bus interface") 512, a load/store unit 514, and a session tracking unit 516. The system interface unit 510 is used to interface the internal resources of the parser with external content processor system components through the CP bus 501. Data received by the system interface unit 510 is loaded into the string extraction unit 520. The string extraction unit 520 includes a string extractor 521 and a string buffer 522. The string extractor 521 receives string data and searches through the string data for string delimiters. A string delimiter may include a character marking the beginning or end of a unit of data.

In one embodiment, the string extractor parses the input data and extracts tag string data. Tag string data may include one or more characters containing information about a file, record type, or other data structure. For example, in markup languages such as HTML, SGML, or XML, a tag may be a code that identifies an element in a document used for formatting, indexing, and linking information in the document. Additionally, the string extractor may parse the input data and extract header string data. The extracted tag string data and header string data are then passed to the string buffer 522. The tag string data may then be transmitted to the dictionary lookup unit 530.

In one exemplary embodiment, the techniques of the present invention are utilized in the dictionary lookup unit 530. The dictionary lookup unit 530 may check the extracted tag string data against elements in a dictionary and return a match signal and a code word on search result bus 531 if the extracted tag string data matches one of a plurality of protocol strings stored in the dictionary. The information on the search result bus 531 is transmitted to the descriptor builder 540. The descriptor builder may also receive the header string data on string data bus 523. The descriptor builder forms the parsing result descriptor, defined in more detail below, for software running on the host application processor. The parsing result descriptor and the header string data are transmitted from descriptor builder 540 over store bus 541 to the system interface unit 510 for storage in external CP memory.

Figure 6:
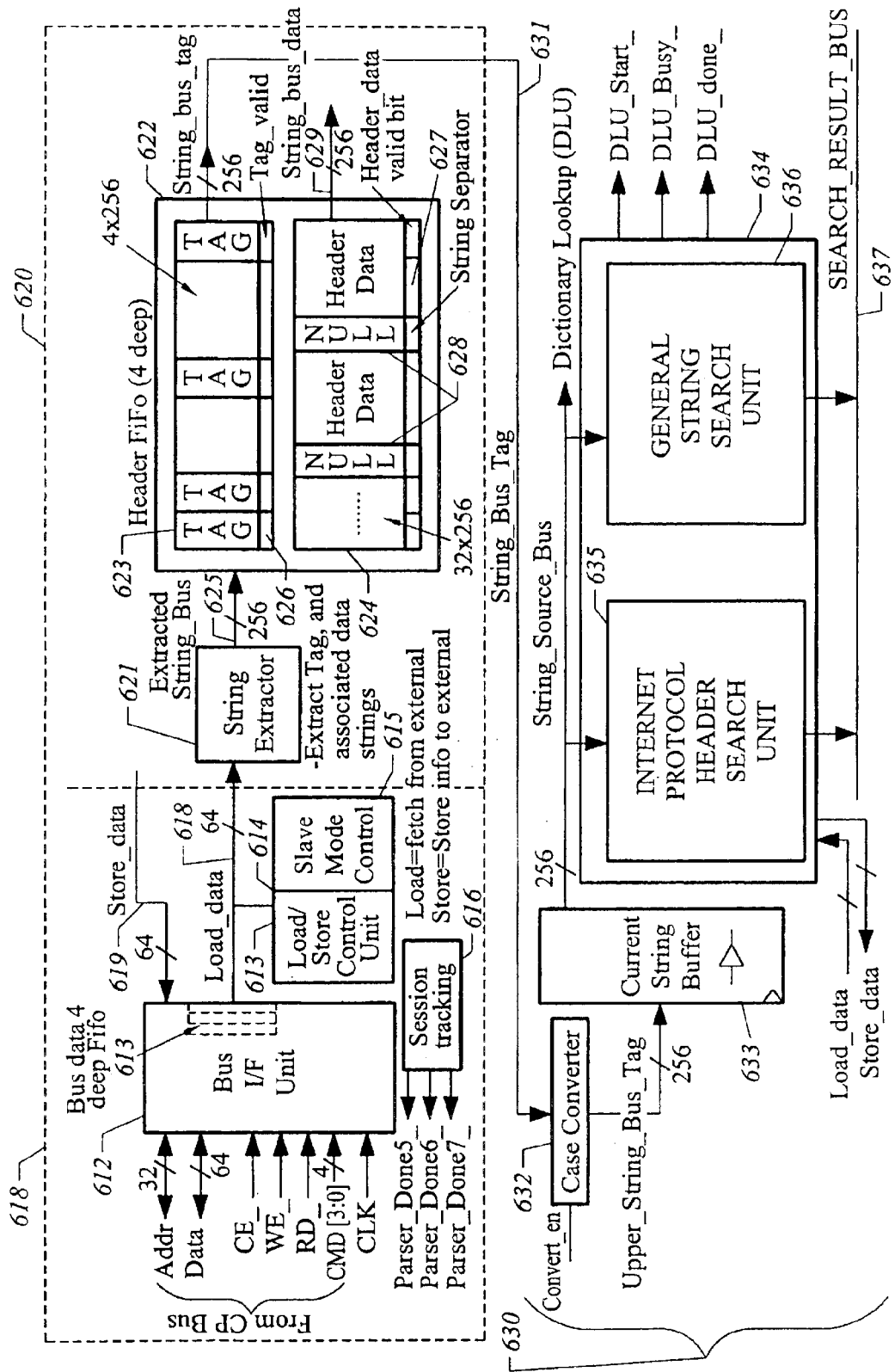
FIG. 6 is a block diagram illustrating a system interface unit, string extraction unit, and dictionary lookup unit utilized in a parsing engine according to one embodiment of the present invention.

FIG. 6 is a more detailed block diagram illustrating a system interface unit 610, string extraction unit 620, and dictionary lookup unit 630 utilized in a parsing engine according to one embodiment of the present invention. The system interface unit 610 includes a CP bus interface 612, load/store unit 614, and session tracking unit 616. The CP bus interface 612 is coupled to the CP bus to receive signals Addr (e.g., a 32-bit address), Data (e.g., a 64-bit data signal), CE_ (e.g., chip enable), WE_ (e.g., write enable), RD_, CMD(3:0) (e.g., a 4-bit parser command line), and CP bus clock CLK. The CP bus interface 612 may perform all the slave mode and master mode accesses for the parser one CP bus clock at a time. In one embodiment, the CP bus interface 612 includes protocol and command decoding logic (not shown) for decoding and commands and protocol information received from external resources. For example, the parser may receive information indicating that the data to be parsed is formatted in a particular protocol out of a range of protocols (e.g., HTTP, SMTP, FTP, DNS, SSL, POP3, or XML). In one embodiment, the CP bus interface 612 may also include a bus data FIFO 613 (i.e., first-in first-out memory). The FIFO may be used for temporarily storing information after reception or prior to transmission. For example, the FIFO may be a 4 deep FIFO for temporarily storing information after receipt from the CP bus or prior to transmission to the CP bus. Furthermore, the CP bus interface may be coupled to a load bus 618 and a store bus 619. The load bus 618 and store bus 619 are used to transmit data to and from internal resources of the parser.

The system interface unit 610 may also include a load/store unit 614 to control the access of external resources by the parser. The load/store unit 614 includes a load/store controller 613 and a slave mode controller 615. The load/store unit may control the transfer of large data blocks to and from the parsers internal memory buffers. Additionally, the load/store unit loads the message payload (i.e., unparsed network data) from resources external to the parser. The load/store unit then forwards the payload to the string extraction unit 620 for processing. Furthermore, the load/store unit controls the storage of result data from the descriptor builder (not shown). In one embodiment, the load/store unit operates in a burst access mode to perform its functions more efficiently. The load/store unit slave mode controller 615 controls the master/slave operations of the system interface unit. For example, the parser may be put in a slave mode to allow external resources to configure or pre-load information into the parsers internal memory buffers or programmable configuration registers (not shown). In one embodiment, the system enters a slave mode to allow software running on the host application processor to check the parser's status and check for errors.

The system interface unit 610 also includes a session tracking unit 616 to track the duration and status of a parsing operation in the parser. In one embodiment, the parser operates on one layer of the unparsed network data at a time (i.e., one protocol at a time). Therefore, the parser may track the byte count of the layer or layers until the parser has completed the parsing operation on each layer (e.g., layers 5, 6, and 7). The session tracking unit may also include multiple state machines for tracking each layer separately. In parsing the HTTP layer, for example, a "content length" value may be 1400 bytes. The session tracker may track the parsing operation until all the 1400 bytes are completed. In some embodiments, there may be embedded layers within a layer, for example, an ebXML layer within an HTML layer. In this case, the session tracker will also track the parsing operation for the inner layer. After the parsing operation is completed, the session tracker asserts a "parser done" signal to indicate that the parser has completed the corresponding session. In one embodiment, there are three parser done signals: parser_done5_is asserted when layer 5 is completed, parser_done6_is asserted when layer 6 is completed, and parser_done7_is asserted when layer 7 is completed.

The string extraction unit 620 includes a string extractor 621 and a header string memory buffer ("string buffer") 622. In one embodiment, the string buffer is a first-in first-out memory (i.e., a string FIFO). The string extractor 621 is coupled to the load bus 618 to receive the unprocessed network data from the system interface unit 610. For example, the load bus may be a 64-bit bus. Accordingly, the string extractor 621 will accept 64-bits of unparsed network data at a time. As mentioned above, the string extractor 621 receives string data and searches through the string data for string delimiters. A string delimiter may include a character marking the beginning or end of a unit of data. The string extractor 621 may include multiple algorithms for extracting strings from different data protocols. For example, an incoming string may be an HTTP string having ":" as a separator. On the other hand, the incoming string may also be an XML protocol string having a hierarchical structure. The incoming string may also be a uniform resource locator ("URL") string. URL's are addresses for resources on the internet and may specify the protocol to be used in accessing the resource (e.g., HTTP or FTP), the name of the server on which the resource resides (e.g., www.website.com), and the path to a resource (e.g., an HTML or XML document on that server). Accordingly, the string extractor 621 may be required to parse a variety of different types of string delimiters. In one embodiment, the string extractor may be required to search through a string for delimiters such as "space," ":", "<", or ">". For example, if the string "<header>" was received as an input, the string extractor may return the string "header." Similarly, if the string "content-type:" was received as an input, the string extractor may return the string "content-type." Furthermore, if the string "content-length: 5678" was received as an input, the string extractor may return the tag string "content-length" and a header string "5678." It is to be understood that the above examples are merely illustrative of possible embodiments. Accordingly, other embodiments of the string extractor may receive other delimiter strings or return other string extractor results, or both. Therefore, the string extractor of the present invention may include a plurality of algorithms implemented as state machines for parsing the different types of string data and returning a variety of string extractor results according to the requirements of the particular application.

The extracted tag string data and header string data are then passed to the string buffer 622. In one exemplary embodiment, the string buffer 622 is a first-in first-out memory ("string FIFO") including a tag FIFO 623 and a header FIFO 624. For example, the string FIFO may include a 4 deep tag FIFO organized as 4×256+1 (e.g., 256 bits and a tag valid bit). Additionally, the header FIFO section may be organized as 32×257. Once the string extractor has searched through an input and returned a result string, the string extractor output may be transmitted to string buffer 622 over string bus 625. If the result string is a tag string, then the string extractor transmits the tag string data to the tag FIFO and activates a valid bit in a tag_valid field 626. If the result string is a header string, then the string extractor transmits the header string data to the header FIFO and activates a valid bit in a header_valid field 627. Furthermore, the header FIFO 624 may include a string separator section 628 (e.g., a NULL string) inserted between header string data in order to separate the header string data associated with one tag from the header string data associated with other tags. Additionally, one tag may be associated with multiple header string data. The valid bit corresponding to the string separator section 628 is inactivated. The tag string data in the tag FIFO may be transmitted to the dictionary lookup unit 630 over tag string bus 631. Additionally, header string data in the header FIFO may be transmitted to the descriptor builder over header string bus 629. In one exemplary embodiment, the tag string bus 631 and header string bus 629 are 256-bit buses. However, it is to be understood that other variations or sizes for the buses 629 and 631 and string buffer 622 could be used.

The dictionary lookup unit ("DLU") 630 illustrates one embodiment of a multi-protocol memory lookup system according to the present invention. However, it is to be understood that the features and advantages of the present invention may also be used in other data processing systems and applications. Therefore, the following description of the DLU utilized in a data communication network is for illustrative purposes only. A multi-protocol memory lookup system may receive an input signal and, if the input signal matches one of the elements of the memory, return a match result signal and relevant data. For example, the DLU 630 includes a DLU memory array 634. In one embodiment, the DLU memory array may be a synchronous memory. For utilization in a parser 600, the DLU may receive one valid tag string data from the tag FIFO section 622 at a time. The tag string data may then be input to the DLU and compared with the elements of the DLU memory array 634. If a match is found, the DLU produces a match signal and a code word on search result bus 637. The match signal and code word are then transmitted to the descriptor builder (not shown). The DLU may also include DLU status signals DLU_start_ (i.e., initiate DLU search), DLU_busy_(i.e., DLU search in progress), and DLU_done_(i.e., DLU search complete). These signals may be utilized by other parts of the parser for interfacing with the operations of the DLU. In one exemplary embodiment, the DLU may also include a case converter 632 and string buffer 633. Accordingly, the tag string may be converted to upper case in the case converter and subsequently transmitted to the string buffer to await processing by the DLU memory array. The DLU may also include load_data and store_data lines for preloading information and monitoring status of the lookup operations.

Features and advantages of the present invention include memory lookup support for multiple protocols. A memory lookup system that supports multiple protocols may speed up system performance and also avoid time delays resulting from reloading different protocols into the system. In one embodiment, the present invention may simultaneously support 8 protocols in layers 5–7. For example, the DLU 630 may include a header search unit 635 for supporting HTTP, SMTP, ebXML, SSL, POP3, DNS, FTP, and a general purpose lookup table. In another embodiment, a memory lookup system may be configured as a general purpose memory lookup system (e.g., a general purpose string search engine). For example, the DLU may include a general string search unit 634.

FIGS. 7–17 illustrate the application of the features and techniques of the present invention to the implementation of a DLU according to one embodiment of the present invention. Alternatively, FIGS. 18–32 illustrate the application of features and techniques of the present invention to another implementation of a DLU according to another embodiment of the present invention. The various embodiments of the DLU are illustrative of the advantages of the present invention as defined by the claims, and should not be considered limiting.

Figure 7:
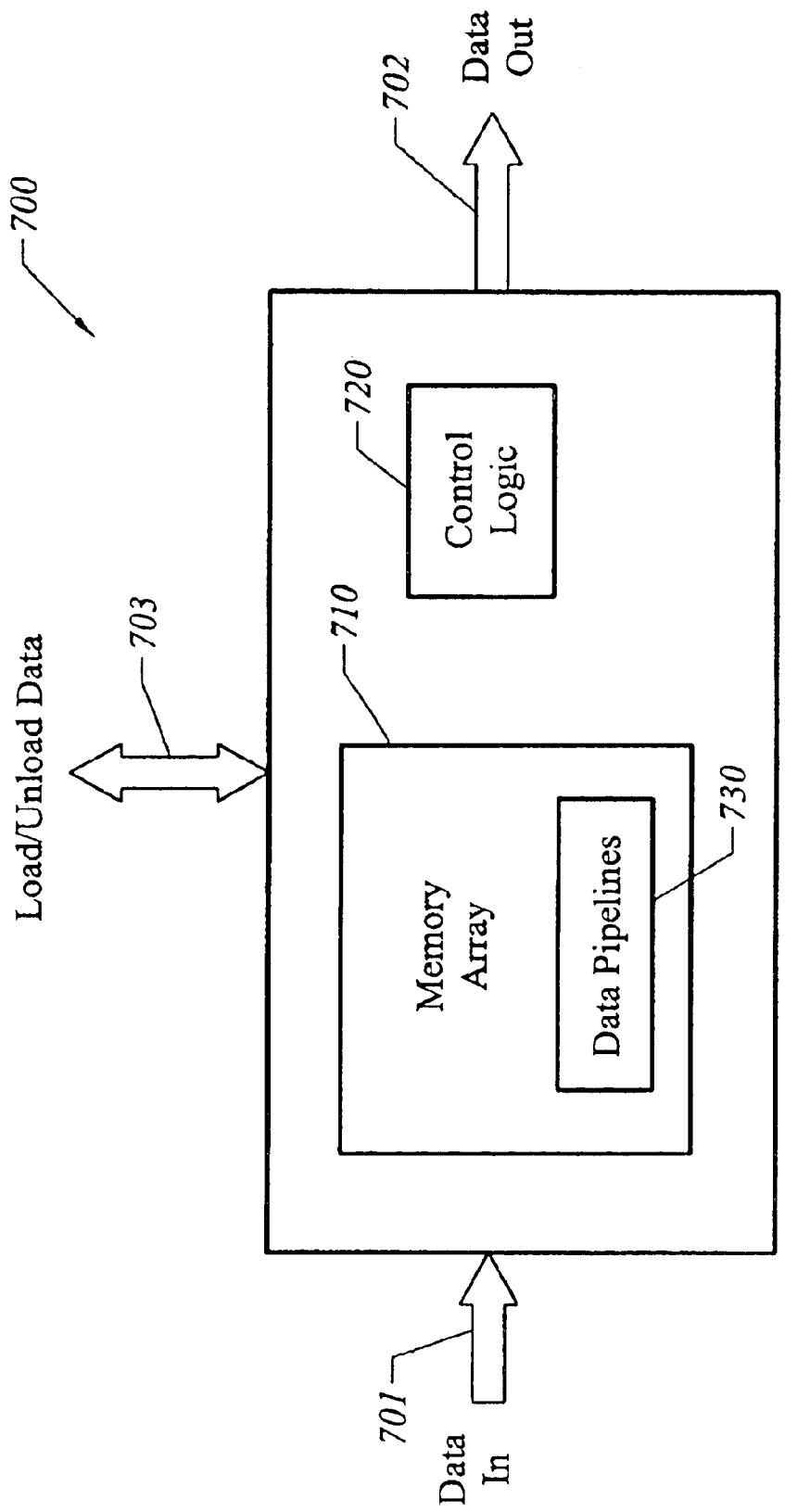
FIG. 7 illustrates a memory lookup system according to one embodiment of the present invention.

FIG. 7 illustrates a memory lookup system 700 according to one embodiment of the present invention. Memory lookup system 700 includes a memory array 710 and control logic 720. In one exemplary embodiment, data pipelines 730 are integrated into memory array 710. However, in other embodiments of the present invention, the data pipelines 730 may not be integrated into the memory array 720. Input data may be received in the memory lookup system 700 on input signal lines 701. The input signal lines may carry input signals that are to be operated on by the memory lookup system. In one embodiment, the memory lookup system 700 may be preloaded with data over signal lines 703. Data loaded into memory lookup system 700 may include, but is not limited to, configuration data, protocol identification data, or protocol code word data, for example. Additionally, data loaded into the memory lookup system 700 may be read (i.e., unloaded) over signal lines 703. Data read from memory may include, but is not limited to, protocol data, configuration data, status information, or error codes, for example. In one exemplary embodiment, the memory lookup system enters a slave mode during loading and unloading of data.

Figure 8:
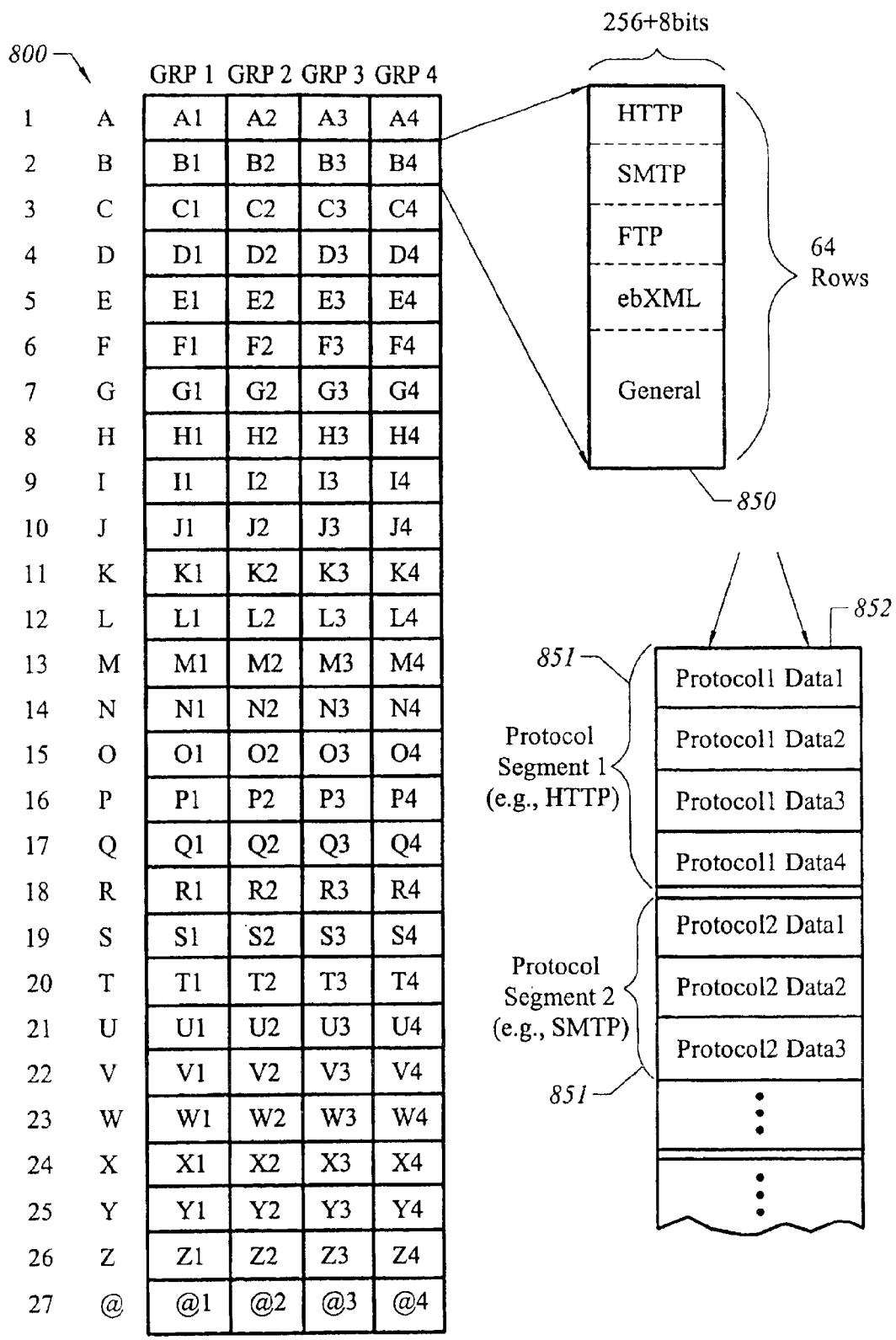
FIG. 8 illustrates a memory array utilized in a memory lookup system according to one embodiment of the present invention.

FIG. 8 illustrates a memory array 800 utilized in a memory lookup system according to one embodiment of the present invention. The memory array 800 is an N×M array of memory blocks 850. An exemplary memory block may be a 64×264 memory structure, for example. Each memory block 850 may include one or more protocol segments 851. Each protocol segment 851 includes one or more memory locations 852. Each memory location 852 may store a protocol data element such as a protocol string, and be identified by a unique memory address. In one exemplary embodiment, the memory array 800 includes 27 rows associated with the letters A–Z and the symbol "@." Additionally, the memory array 800 may include columns GRP1, GRP2, GRP3, and GRP4. Thus, all protocol strings beginning with the letter "A" may be located in memory blocks 850 in row A of memory array 800. If a particular protocol (e.g., HTTP) has multiple protocol strings beginning with the letter "A", then the protocol strings may be divided equally across each column, and grouped in protocols segments 851 in each memory block 850. Each protocol segment 851 includes memory locations 852 storing protocol data elements for the same protocol. For example, if a protocol has 15 elements starting with the letter "A", and the memory array includes 4 columns, then 3 of the 4 memory blocks 850 in row "A" may include 4 elements of the protocol. Additionally, one of the memory blocks 850 in the row may include a NULL string to provide an equal number of elements (i.e., segment depth count) in each protocol segment. In other embodiments, additional NULL strings may be added to make the total number of protocol data elements in a given row divisible by the total number of columns. Memory array 800 also includes optional row "@" which may be used for user defined data (e.g., user defined strings) to support customized protocols.

According to one embodiment of the present invention, the memory array 800 provides support for multiple protocols by including multiple protocol segments in each memory block 850. A protocol segment is a grouping of all the protocol data elements for a given protocol in a particular memory block. For example, each memory block 850 may include one or more protocol segments corresponding to the following protocols: HTTP, SMTP, FTP, XML, ebXML, DNS, SSL, or POP3. Of course, other protocols may also be used. Protocol segments 851 in the memory blocks 850 comprise one or more memory locations 852 each identified by unique addresses. The memory locations 852 may be used to store protocol data elements for a given protocol, such as protocol strings. In one embodiment, the protocol data elements may be HTTP header tags. For example, if HTTP has 8 header tags starting with the letter "A", and if a memory array 800 has 4 columns, then each memory block 850 in row A will have an HTTP protocol segment with 2 protocol data elements (i.e. 2 HTTP header tags). If a protocol had 11 protocol data elements starting with the letter "A," then 3 memory blocks in row A would have 3 protocol data elements in each protocol segment, and 1 memory block would have 2 protocol data elements and a NULL string in a protocol segment.

A memory lookup system according to one embodiment of the present invention may receive an input signal, such as an input protocol string or other protocol data element. The memory lookup system may execute a lookup operation to determine if one of the protocol data elements stored in the memory array 800 matches the input signal. In one embodiment, control logic 720 of FIG. 7 activates one row of memory array 800 at a time. The control logic may then simultaneously access a particular protocol segment 851 in each memory block 850. For example, the control logic may generate an address that simultaneously accesses the first HTTP header tags in each HTTP protocol segment in row A. The control logic may then sequentially access successive memory locations 852 in the protocol segments 851 and provide the protocol data elements to the first inputs of comparators coupled to each memory block 850. The other input of each comparator may receive the input signal. If the protocol data element matches the input signal, a match result signal is generated. In one embodiment, other data may be stored with each protocol data element (e.g., a code word). If a match result signal is generated, the data may be transmitted on a result bus within the match signal. If the protocol data element does not match the input signal, the control logic accesses the next successive memory location 852 in protocol segments 851, and provides the next protocol data elements from each memory block in the row to the comparator inputs. If the end of a protocol segment is reached without a match, then a "no match" signal may be transmitted on the result bus.

Figure 9:
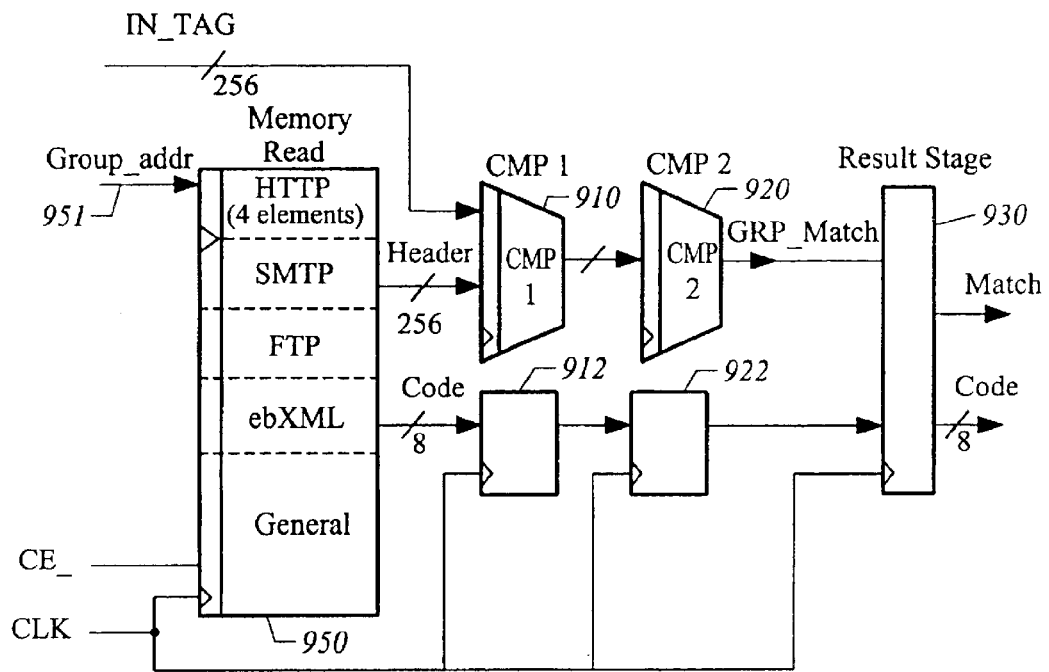
FIG. 9 illustrates a memory block and associated data pipeline according to one embodiment of the present invention.
Figure 9:
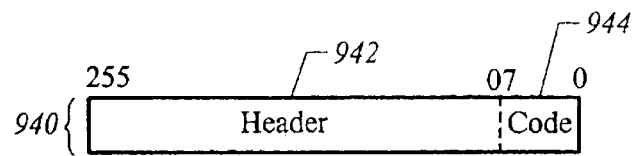

FIG. 9 illustrates a memory block and associated data pipeline according to one embodiment of the present invention. Memory block 950 receives an address on address line 951. The address line 951 may be a single serial line or parallel address bus, for example. The address is used to access the protocol data elements stored in the memory locations identified by each address. In one embodiment, the memory blocks are 64×264, which corresponds to 64 memory locations that are each 264-bits wide. An exemplary memory location 940 illustrates the data that may be stored in the memory blocks 950. Memory location 940 may comprise a first header field 942 for holding the protocol data element, and second code field 944 for holding data associated with the protocol data element, such as a code word corresponding to the protocol data element. In an exemplary embodiment, the header field is 256-bits and the code word field is 8-bits. In some embodiments, the header field holds sting data. If the string data is less than 256-bits, then the ASCII NULL character may be inserted. For HTTP, the protocol data elements may be HTTP header tags. Additionally, an HTTP header tag "content-length" may have a corresponding code word "0D" stored in field 944, for example. The total number of protocol data elements in a protocol segment in a memory block 950 is the group segment depth ("GSD"), also referred to as the segment depth count. The total number of protocol data element for all the protocol segments in a single row (e.g., row A) is the segment depth ("SD").

A data pipeline according to one embodiment of the present invention may include a 2-stage comparator having a first comparator stage 910 and a second comparator stage 920. An input signal is provided to a first input of the comparator. The second input of the comparator is the protocol data element stored in the memory location 940 accessed by the particular address on address line 951. The memory block 950 may also include an enable input CE_for activating memory blocks 950 one row at a time. In one embodiment, the input signal on the first comparator input is tag string data from tag FIFO 623 of FIG. 6, and the second comparator input receives a protocol string stored in memory location 940. The tag string data and protocol string may both be 256-bit strings, for example. The output of the first comparator stage 910 is transmitted to a second comparator stage 920 When the protocol string is accessed by the address on line 951, the code word is also accessed and provided at the input of a latch 912. Successive protocols and code words may be accessed in accordance with system clock CLK. The system clock is also provided to latches 912 and 922 to transfer the code words to result stage 930.

FIG. 10 illustrates the operation of the data pipeline according to one embodiment of the present invention. The pipeline has a latency of 4 clock cycles (i.e., data access, first comparator stage, second comparator stage, and result stage) The result of the comparator operation and the corresponding code word will be provided at the output of result stage 930 three clock cycles after the protocol string and code word are transmitted from the memory block 950. If the input signal is compared against N protocol strings in a given protocol segment (i.e. segment depth count=N), then the total latency will be (N+3) cycles.

Figure 11:
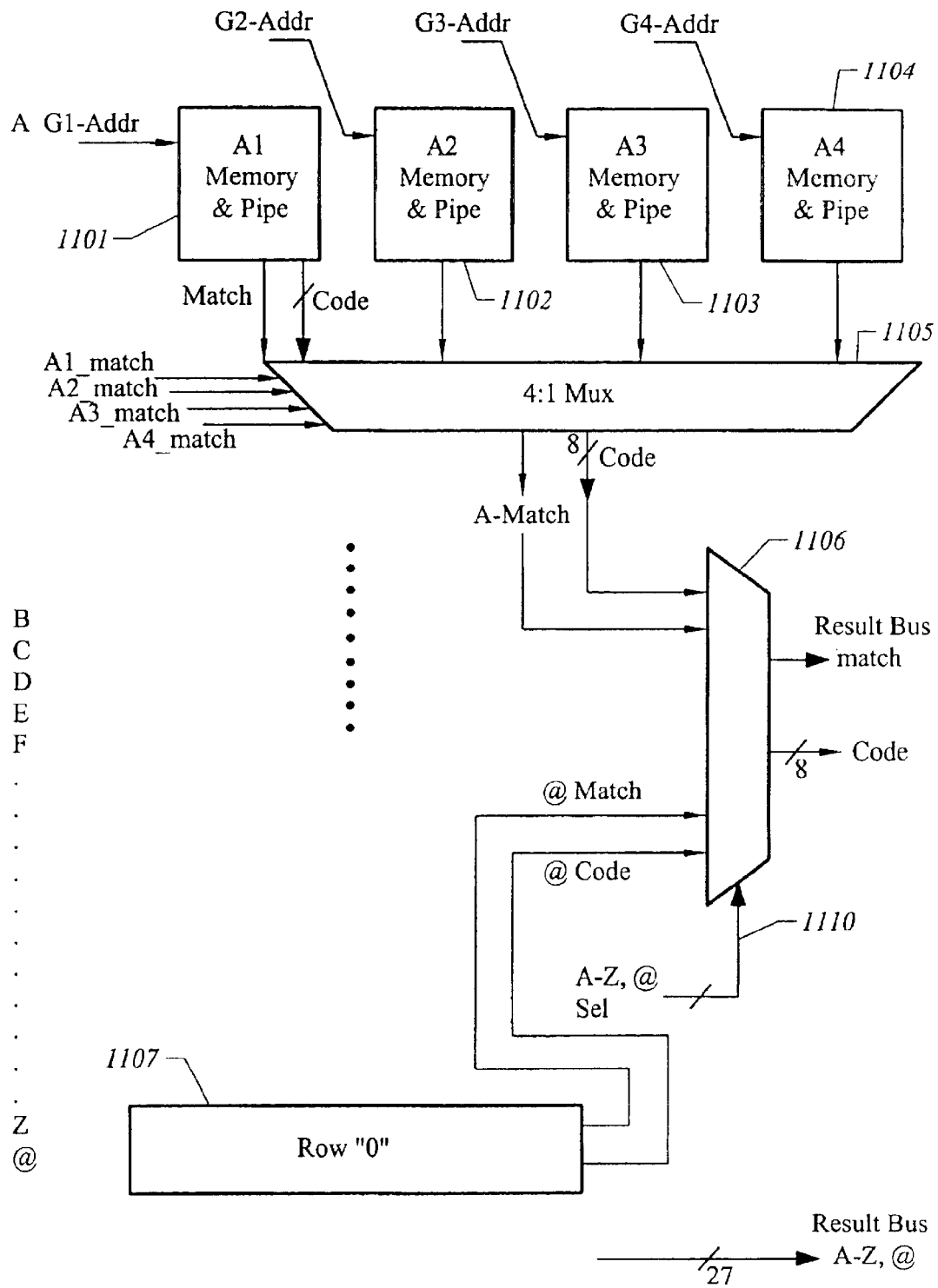
FIG. 11 illustrates memory blocks and associated data output path multiplexors according to one embodiment of the present invention.

FIG. 11 illustrates an output path for memory blocks and associated data pipelines using multiplexors according to one embodiment of the present invention. Memory units 1101–1104 each include a memory block and data pipeline for row A. The outputs of the memory units each include a result signal (e.g., match) and a code word. Each of the memory unit outputs is coupled to the input of a multiplexer 1105. The select input of the multiplexor 1105 is coupled to match signals from each memory unit (e.g., A1_match, A2_match, A3_match, and A4_match). Therefore, the memory unit loaded with a protocol data element matching the input signal will be selected by the multiplexor. The outputs of memory blocks in all rows of the memory array may be connected to similarly configured multiplexors. The outputs of the each multiplexor may be coupled to the input of array multiplexor 1106. The select input of array multiplexor 1106 is coupled to row select lines 1110. Therefore, each row may be selectively activated, and the memory blocks in the row may be searched for a protocol data element corresponding to an input signal. Accordingly, a matching result may be transmitted through successive multiplexors to a result bus.

Figure 12:
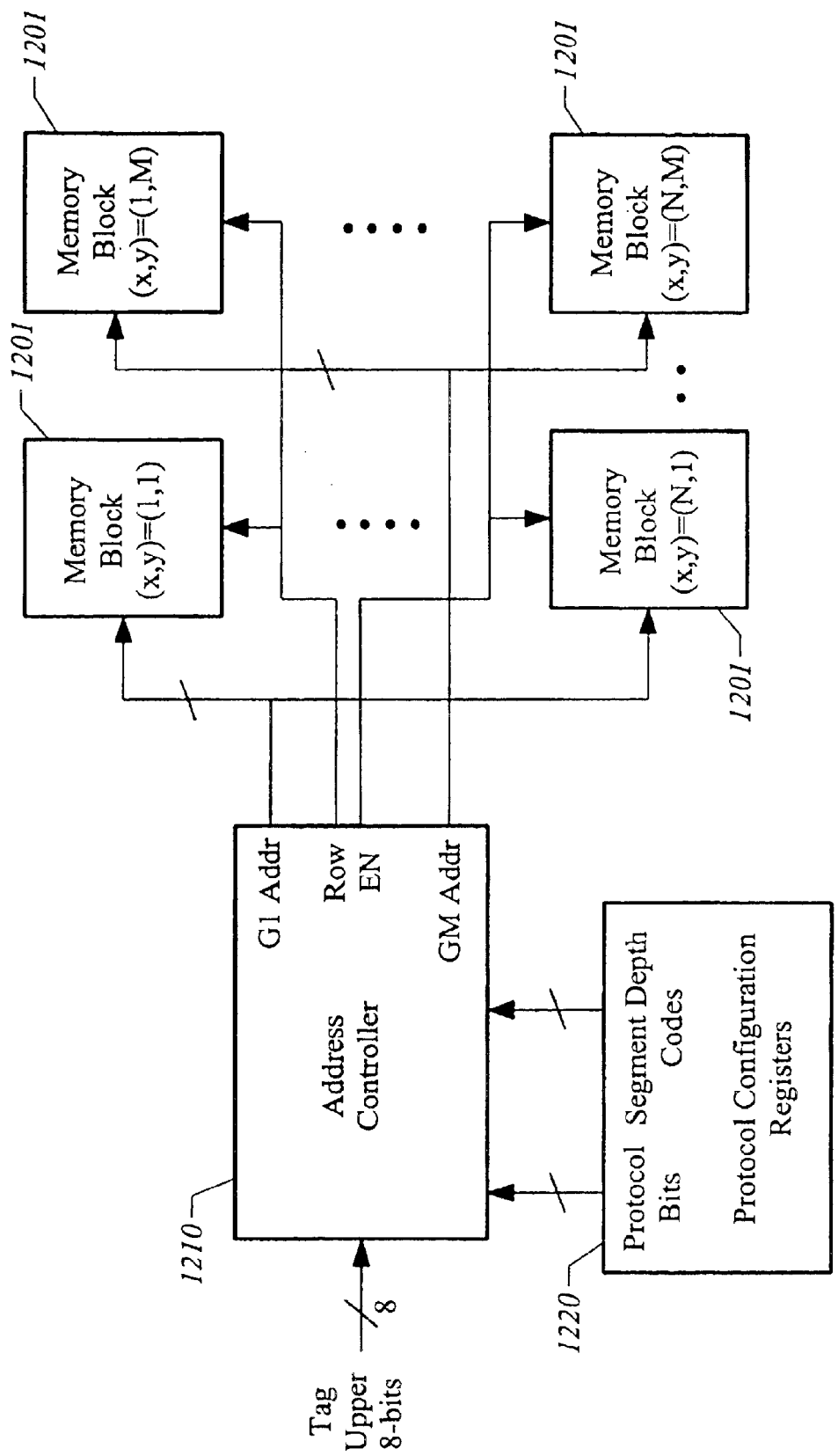
FIG. 12 illustrates an address control scheme according to one embodiment of the present invention.

FIG. 12 illustrates an address control scheme according to one embodiment of the present invention. A memory lookup system according to one embodiment of the present invention includes address controller 1210 for generating successive addresses to access individual memory locations during a lookup operation. In one embodiment, the upper 8-bits of an input string are input to the address controller 1210. The upper 8-bits may correspond to the first letter of an input string, for example. Additionally, the address controller may receive protocol bits for indicating which protocol is enabled in the system. For example, the address controller may receive 8 protocol signal lines representing 8 different protocols supported by the system. An active signal on a protocol signal line may indicate that the protocol corresponding to the signal line has been enabled. Furthermore, the address controller may receive segment depth codes. A segment depth code may be used to represent the segment depth ("SD") of the protocol in each row. For example, if a protocol has 16 string elements beginning with the letter A, then the segment depth for row A is 16. Accordingly, when row A is accessed, address controller 1210 may receive a segment depth code of "000" representing a segment depth of 16.

Figure 13:
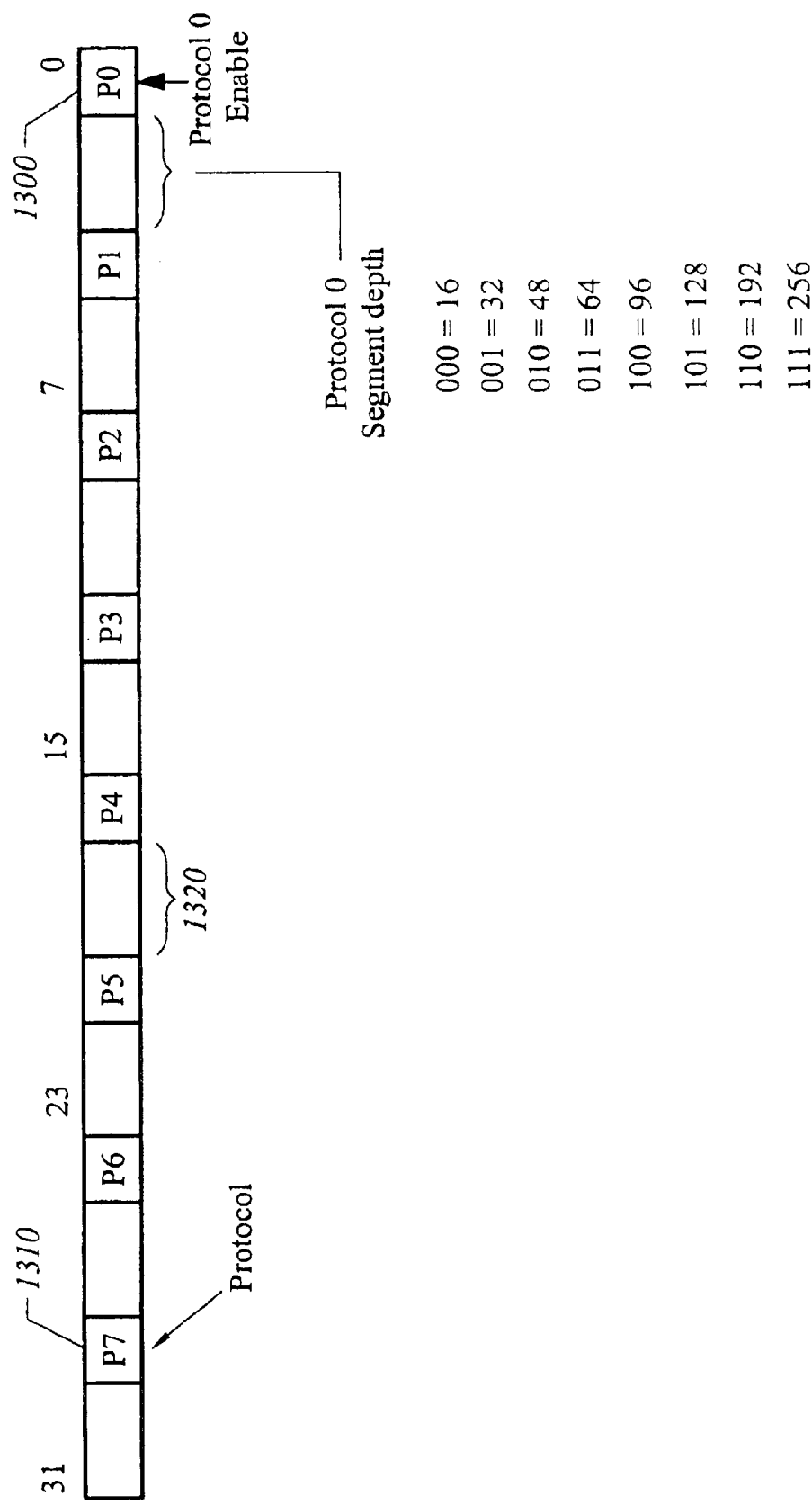
FIG. 13 illustrates a configuration register according to one embodiment of the present invention.

According to one embodiment, protocol configuration registers 1220 are provided for storing the protocol bits and segment depth codes. FIG. 13 illustrates one configuration register according to one exemplary embodiment of the present invention. The configuration register 1300 includes a plurality of protocol enable fields 1310 and segment depth codes 1320. In one embodiment, the configuration register 1300 is a 32-bit register supporting up to 8 different protocols. The protocol register indicates which protocol is enabled and the associated segment depth of the protocol. In one embodiment, protocol segment depths of 16, 32, 48, 64, 96, 128, or 256 may be supported. FIG. 13 illustrates possible 3-bit codes for each segment depth. For an exemplary 27×4 memory array, if a protocol has a segment depth of 256 and the memory blocks are 64×256, then only one protocol may be supported by the system. In other words, if the segment depth is 256 and if there are 4 columns in the memory array, then each memory block will have 64 protocols, which is the maximum for a 64 row memory block. Of course, it is to be understood that the information stored in the above described protocol register is only an exemplary technique of storing the information. Other configurations may also be used.

Referring again to FIG. 12, the address controller 1210 may receive the upper bits of an input signal and enable one of the rows of the N×M memory array. Additionally, the address controller may receive protocol bits and segment depth codes, and generate addresses for accessing individual memory locations in memory blocks 1201 to perform a lookup operation. Accordingly, the address controller may generate a memory address for each memory block of an active row (i.e., a group memory address). For example, if the memory array has 4 columns, then the address controller may generate G1_Addr, G2_Addr, G3_Addr, and G4_Addr, and thereby access memory locations in each memory block 1201. In one embodiment, the protocol segments in each memory block in a row are across the same address range in each memory block. Accordingly, the addresses required to access the protocol data elements stored in the memory locations in the protocol segments may have the same values.

Figure 14:
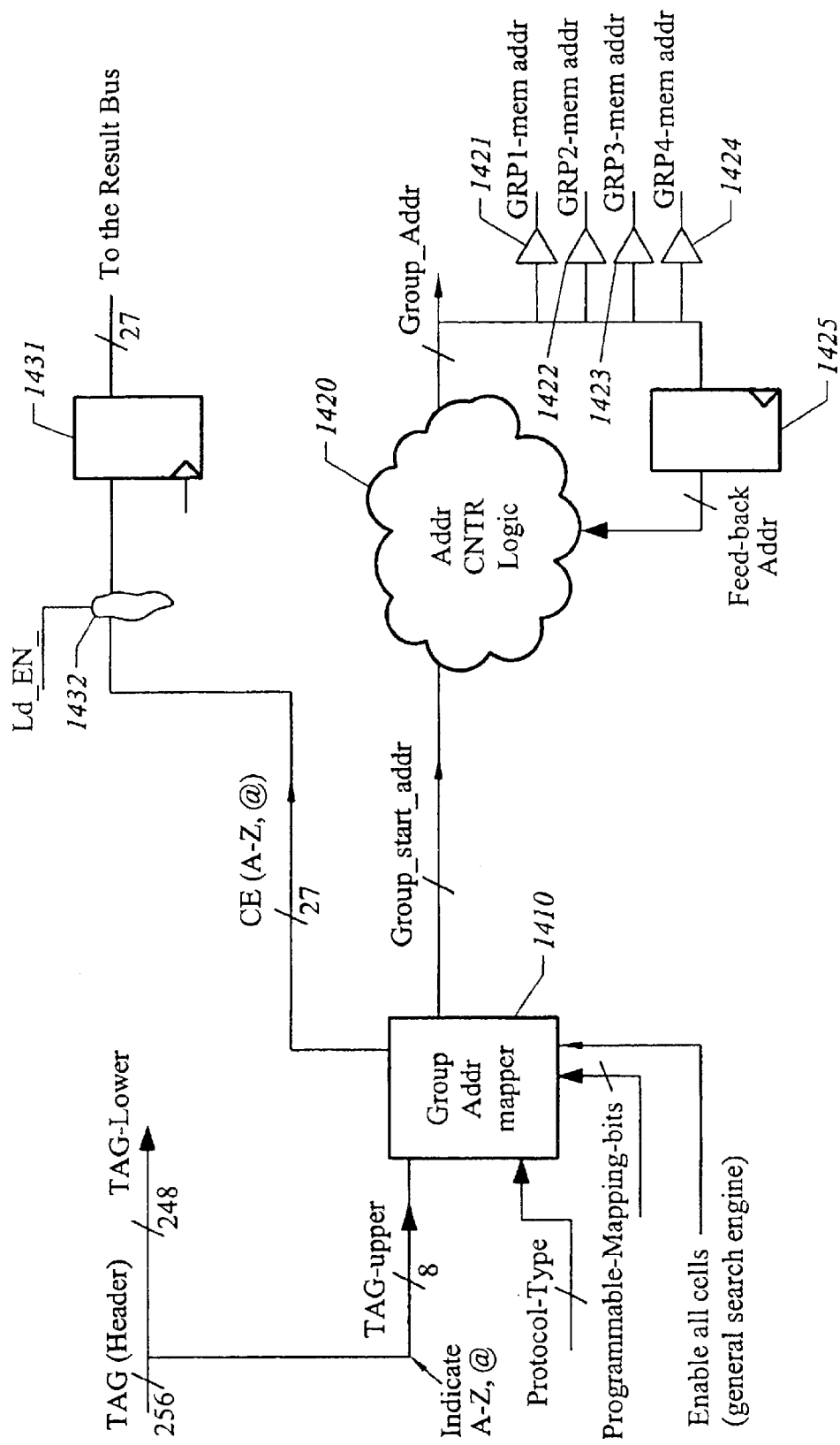
FIG. 14 illustrates address control logic according to one embodiment of the present invention.

FIG. 14 illustrates address control logic according to one embodiment of the present invention. The address control logic may be utilized in the address controller of FIG. 12, for example. The upper 8-bits of an input signal, which may be a header tag, are received by group address mapper 1410. The upper 8-bits may indicate whether the first letter of an input string is A–Z or @, for example. The group address mapper 1410 also receives protocol bits and segment depth code. Group address mapper 1410 generates a group start address that is used to simultaneously access a particular protocol segment 851 in each memory block 850 (see FIG. 8). The group start address is loaded into address counter logic 1420, and the individual memory location addresses are generated to sequentially access the protocol data elements in a protocol segment. The address counter logic 1420 generates group addresses, which may be transmitted to each memory block in the active row through address buffers 1421, 1422, 1423, and 1424. The output of the address buffer 1421 is the group memory address for the memory block in column 1 (e.g. GRP1). The output of the address buffer 1422 is the group memory address for the memory block in column 2 (e.g. GRP2). The output of the address buffer 1423 is the group memory address for the memory block in column 3 (e.g., GRP3). Furthermore, the output of the address buffer 1424 is the group memory address for the memory block in column 4 (e.g. GRP4).

The group address mapper 1410 may also generate row enable signals CE. In one embodiment there are 27 row enable signals corresponding to each row A–Z and @. The row enable signals may be loaded into an output latch 1431 under the control of a load signal 1432. The output of the latch 1431 may be coupled to the result bus.

Figure 15:
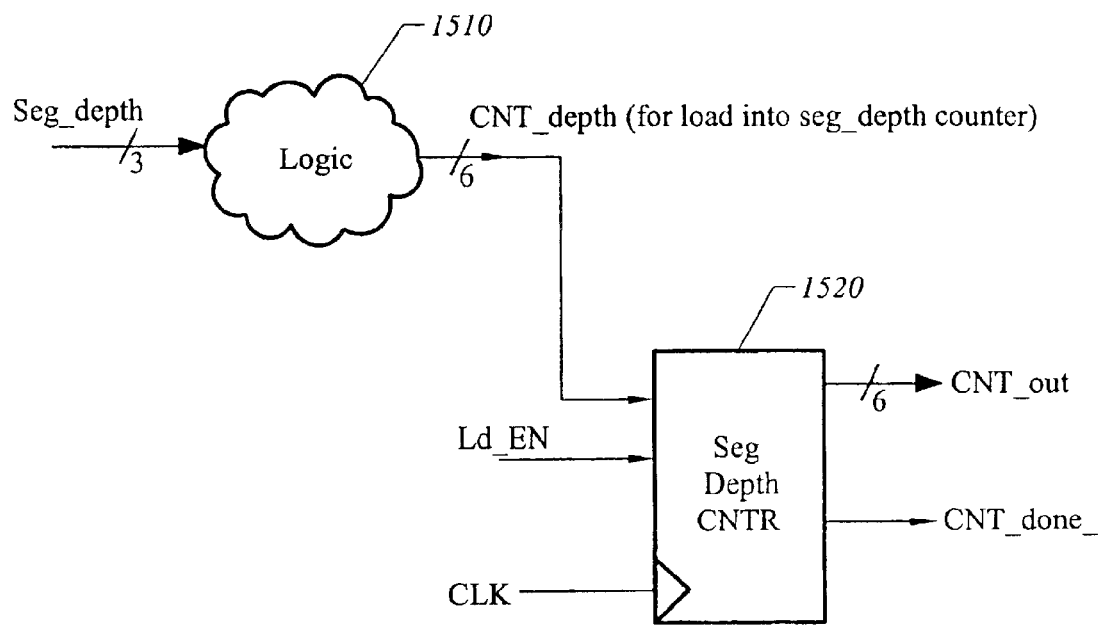
FIG. 15 illustrates a segment depth controller according to one embodiment of the present invention.

FIG. 15 illustrates a segment depth controller according to one embodiment of the present invention. The segment depth controller may reside in the address controller, for example. The segment depth controller may include a logic circuit 1510 and segment depth counter 1520. The logic circuit receives the segment depth code and generates a segment depth count ("CNT_depth"). The mapping between the segment depth codes, segment depths, and segment depth counts supported by the system is illustrated in FIG. 15 for one exemplary embodiment utilizing 4 columns in the memory array. For the case of 4 columns, the segment depth count will be ¼ of the segment depth. In other words, according to one embodiment, the total number of protocol data elements for a given protocol in a single row (e.g., row A) will be divided equally across the total number of columns. The efficiency of the lookup procedure is thereby substantially enhanced. The segment depth counter 1520 is used to keep track of when the end of a protocol segment has been reached during a lookup operation. The segment depth count is loaded into the segment depth counter 1520 at the beginning of each lookup operation under the control of load enable signal Ld_EN. In one embodiment, the segment depth counter 1520 may be a count down counter decremented under the control of clock CLK. When the segment depth counter 1520 reaches zero, the count done signal CNT_done_is activated. In one embodiment, the CNT_done_is an active low signal. Count done may be used to indicate the end of a lookup operation, for example.

Figure 16A:
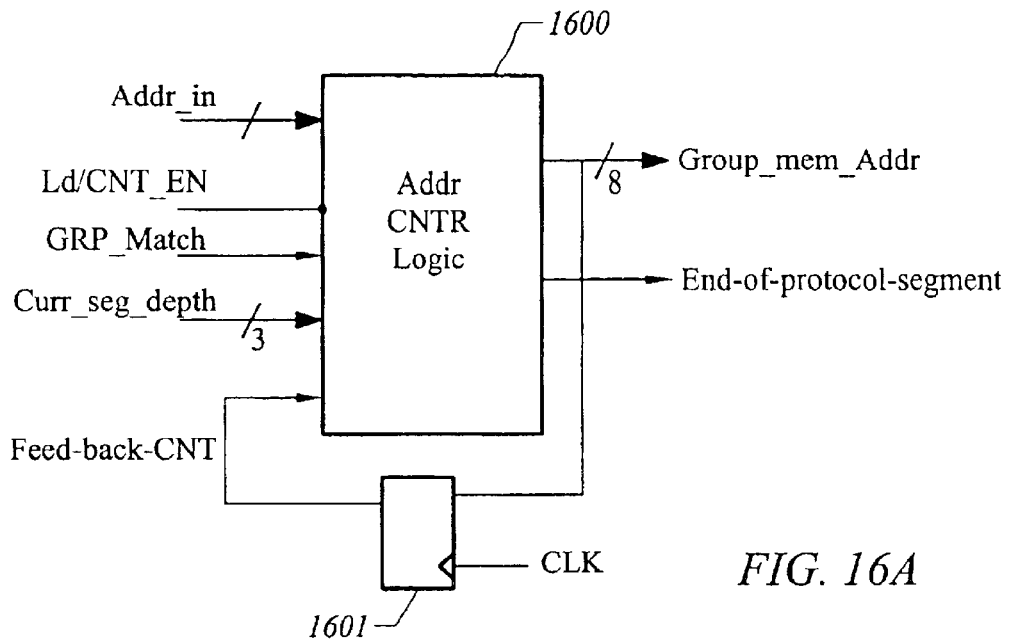
FIG. 16A illustrates address counter logic according to one embodiment of the present invention.
Figure 16B:
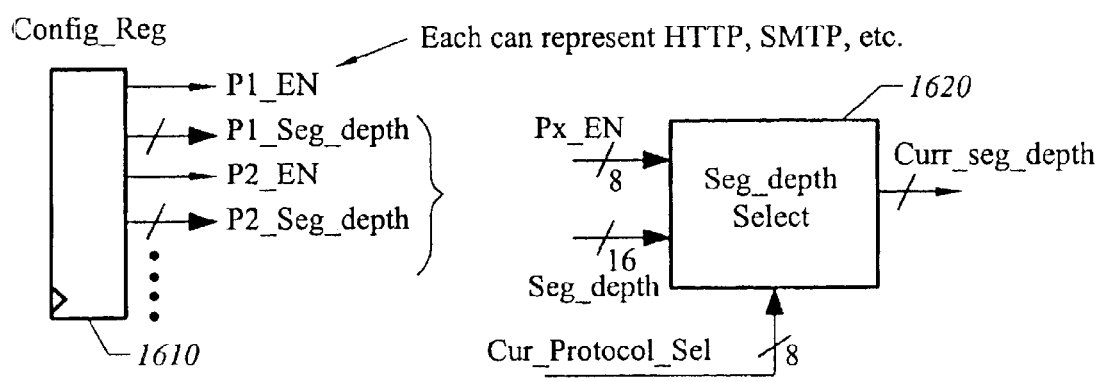
FIG. 16B illustrates a segment depth select circuit according to one embodiment of the present invention.

FIG. 16A illustrates address counter logic 1600 according to one embodiment of the present invention. The address counter logic 1600 may receive the start address "Addr_in" from the group address mapper. The address counter logic may also receive the segment depth code on the "Cur_seg_depth" signal line. FIG. 16B illustrates a segment depth select circuit 1620 according to one embodiment of the present invention. The protocol bits and segment depth codes in the configuration register 1610 may be coupled to the inputs of segment depth select circuit 1620. A current protocol signal "Cur_protocol_sel" selects one of the eight segment depth codes. The current segment depth code is transmitted from the segment depth select circuit 1620 to the address counter logic 1600. The address counter logic 1600 receives the start address and current segment depth, and generates addresses to access protocol locations in each memory block of an active row. Table 1 illustrates the start address for each protocol segment in a memory block according to one embodiment.

TABLE 1

| Protocol Segment | Starting Address |
| --- | --- |
| P0 | 0 |
| P1 | 0 + P0 segment depth count |
| P2 | P1 start address + P1 segment depth count |
| P3 | P2 start address + P2 segment depth count |
| P4 | P3 start address + P3 segment depth count |
| P5 | P4 start address + P4 segment depth count |
| P6 | P5 start address + P5 segment depth count |
| P7 | P6 start address + P6 segment depth count |

Figure 16C:
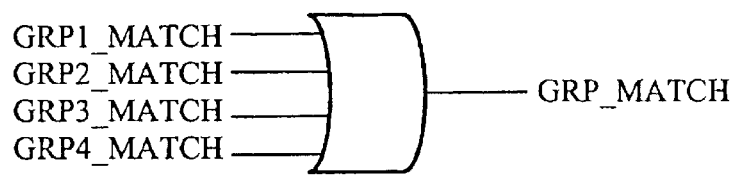
FIG. 16C illustrates a group result circuit according to one embodiment of the present invention.

In one embodiment, the address counter logic 1600 is loaded with the start address and counts up. Accordingly, the address counter logic 1600 receives a load/enable signal "Ld/CNT_EN" for loading the start address and enabling the count. In one exemplary embodiment, the address counter logic is comprised only of combinatorial logic, and includes a register 1601. The register 1601 may latch the initial start address output of the address counter logic on a clock signal CLK. The register may then feedback the count, which is subsequently decremented by the combinational logic in the address counter logic. The address will, therefore, be decremented until a match signal is received on GRP_match, or alternatively, until the segment depth code indicates that the end of the protocol segment has been reached. FIG. 16C illustrates a group result circuit according to one embodiment of the present invention. When a match is generated by one of the memory blocks, the GRP_MATCH signal may be activated to indicate that a match has been found on the row.

Figure 17:
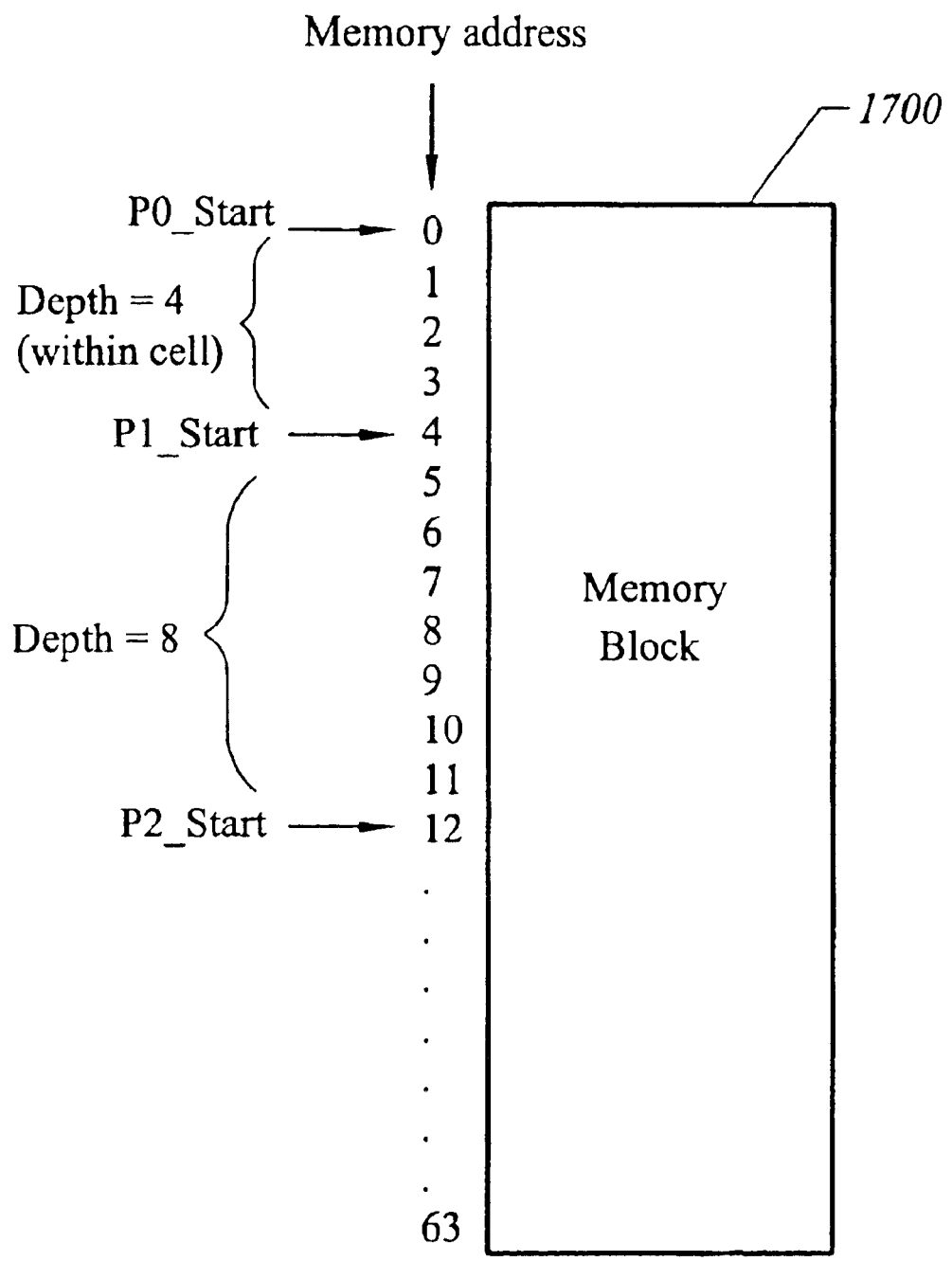
FIG. 17 illustrates memory address mapping according to one embodiment of the present invention.

FIG. 17 illustrates memory address mapping for a memory block according to one embodiment of the present invention. The memory block 1700 includes 64 rows (i.e., memory addresses 0–63). The first protocol, P0, has a protocol segment between addresses 0–3, and may have four protocol data elements stored memory locations 0–3. Therefore, the protocol segment for P0 has a segment depth count of four. The second protocol, P1, has a protocol segment between addresses 4–11, and may have eight protocol data elements stored memory locations 4–11. Therefore, the protocol segment for P1 has a segment depth count of eight. Thus, the third protocol, P2, has a protocol segment starting at address 12. Thus, protocols may be stored in this manner in each memory block in a row, and each protocol may include a number of protocol data elements, such as string data. Of course, it is to be understood that a system according to the present invention may support more or fewer numbers of protocols, and the numbers and types of protocol data elements may also be varied.

Figure 18:
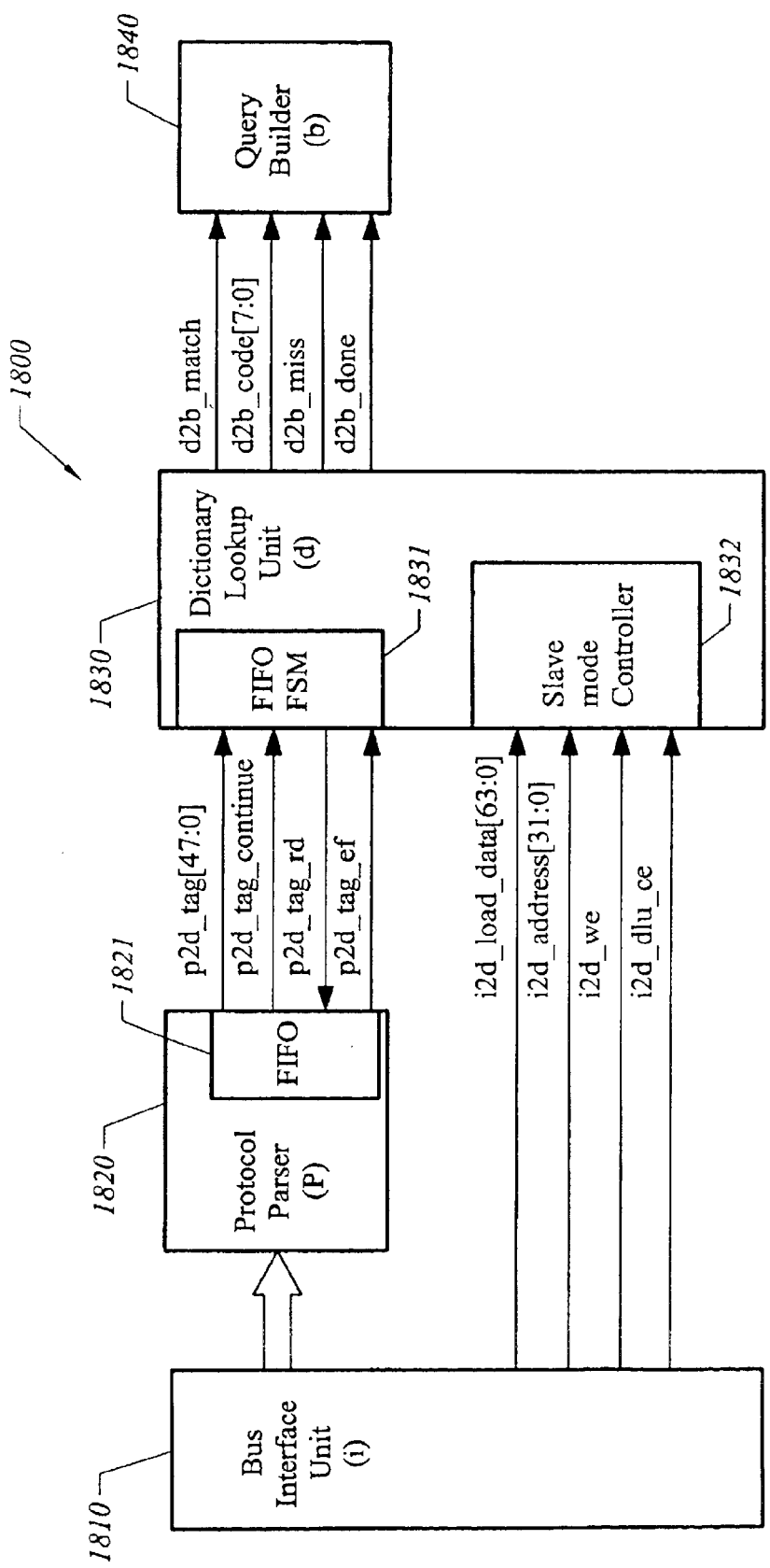
FIG. 18 illustrates a functional block diagram of a parser utilizing a preferred memory lookup system according to one embodiment of the present invention.

FIGS. 18–32 illustrates another memory lookup system according to another embodiment of the present invention. FIG. 18 illustrates a functional block diagram of a parser 1800 utilizing a memory lookup system according to one embodiment of the present invention. Parser 1800 includes a bus interface unit 1810, protocol parser 1820, dictionary lookup table ("DLU") 1830, and descriptor builder also referred to as a query builder 1840. The bus interface unit may couple the protocol parser 1820, DLU 1830, and query builder 1840 to an external bus such as a content processor bus, for example. The protocol parser 1820 may receive string data from the bus interface unit 1810. The protocol parser 1820 may then search through the string data for string delimiters and return tag string data and header string data. The protocol parser 1820 includes a string buffer 1821. In one embodiment, the string buffer is a first-in first-out memory (i.e., a string FIFO). The string buffer 1821 and bus interface unit 1810 are coupled to the DLU 1830. The output of the string buffer 1821 may be coupled to a DLU FIFO state machine controller 1831 for receiving a tag string (e.g., p2d_tag[47:0]), tag continue signal (e.g., p2d_tag_continue), and empty flag (e.g., p2d_tag_ef). The DLU may transmit an advance FIFO signal (e.g., p2d_tag_rd) to signal the string buffer 1821 to transmit the next set of data. The DLU 1830 may also include a slave mode controller 1832 coupled to the bus interface unit 1810 for receiving programming data for internal memory cells. The slave mode controller 1832 may receive load data on i2d_load_data[63:0], address information on i2d_address[31:0], a write enable signal i2d_we, and a chip enable signal i2d_dlu_ce. The slave mode controller 1832 may be used to load the DLU with internal data elements such as string data and code words, for example. The DLU 1830 may also generate an output that is transmitted to query builder 1840. The query builder 1840 may receive a match signal (e.g., d2b_match), code word (e.g., d2b_code[7:0]), miss signal (e.g., d2b_miss), and done signal (e.g., d2b_done).

Figure 19:
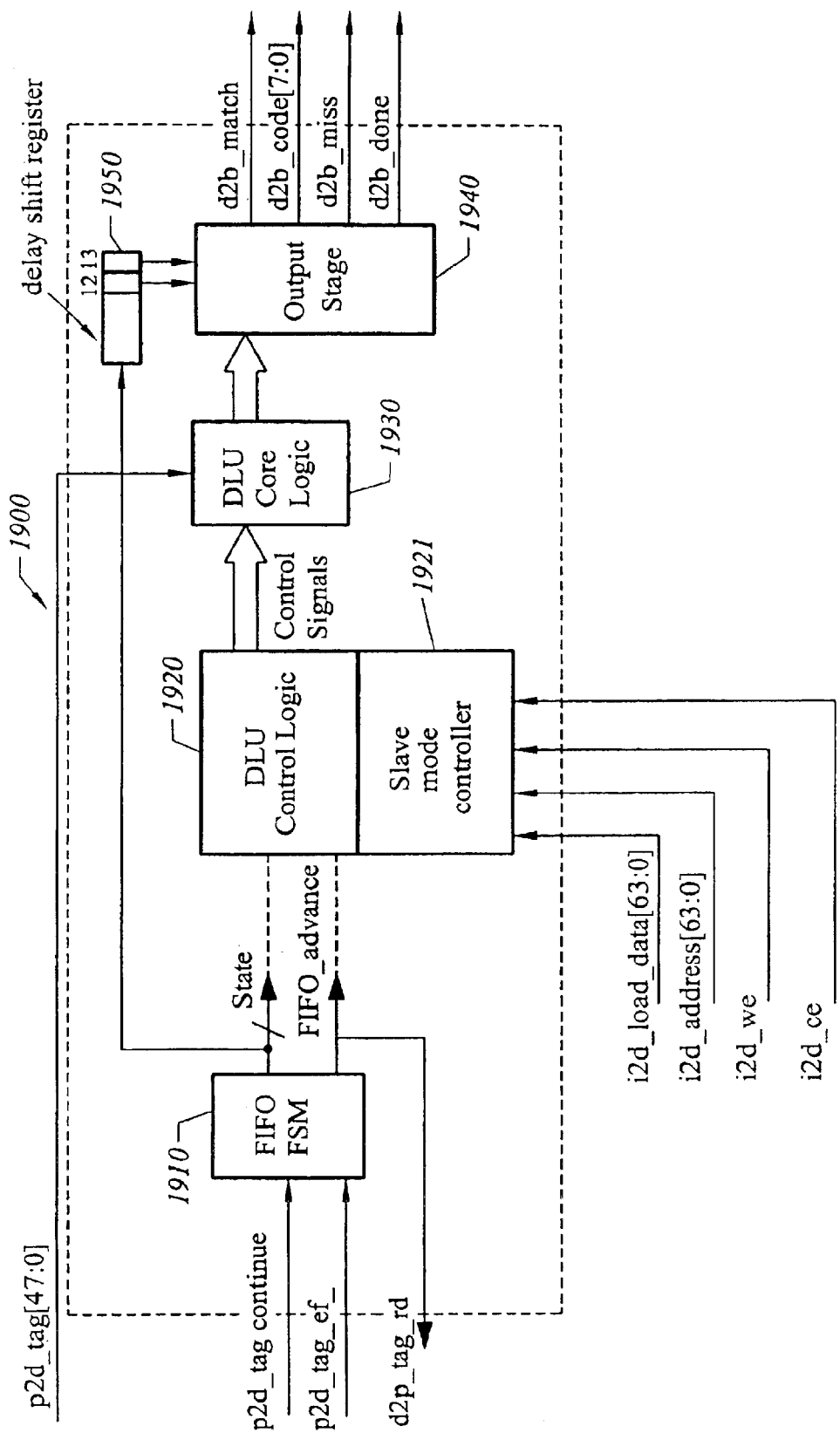
FIG. 19 illustrates a block diagram of a DLU according to one embodiment of the present invention.

FIG. 19 illustrates a block diagram of a DLU 1900 according to one embodiment of the present invention. The DLU 1900 includes a FIFO state machine ("FSM") controller 1910, DLU control logic 1920, DLU core logic 1930, a delay shift register 1950, and an output stage 1940. The FSM 1910 generates a load control signal "FIFO_advance" when the DLU is ready to receive data from the string FIFO 1821 or other external source. The FSM 1910 also receives a signal "tag_continue" indicating whether the next piece of data belongs to a new data element or is the next portion of a data fragment, such as a protocol string data fragment. Furthermore, the FSM 1910 receives a signal "empty_flag_" indicating that the string FIFO has no more data. The FSM 1910 transmits the FIFO_advance signal and a state signal to the DLU control logic 1920. The state signal may contain, for example, information on the current or past state of the FIFO state machine. The state information is also transmitted to a delay shift register 1950 for use by the output stage 1940.

DLU control logic 1920 also includes a slave mode controller 1921. The slave mode controller 1921 is used to allow external resources to gain access to the DLU internal resources to load configuration registers and internal memory arrays, for example. The slave mode controller 1921 may receive data (e.g., i2d_load_data[63:0]), address (e.g., i2d_address[63:0]), a write enable signal (e.g., i2d_we), and a chip enable signal (e.g., i2d_ce) from the bus interface unit 1910. The DLU control logic 1920 then generates control signals for accessing memory arrays and controlling the data flow in the DLU core logic 1930. The DLU core logic 1930 also receives an input signal. The input signal may be a reference signal to be compared against the data elements stored in the memory arrays in the DLU core logic 1930. In one embodiment, the DLU core logic 1930 sequentially receives protocol tag string fragments from a tag FIFO in the string FIFO 1821 as soon as the string fragments are available. The outputs of the DLU core logic 1930 are transmitted to the output stage 1940. Output stage 1940 receives the core logic outputs and generates a match signal "d2b_match" if the input signal matches one of the data elements in the DLU core logic memory array. If the input signal is string data received in fragments, the output stage 1940 will monitor the DLU core logic results and state information and generate a match signal as soon as the input fragments can be uniquely matched to one of the core logic memory array data elements. Additionally, if a match is found, then the output stage may transmit a code word "d2b_code[7:0] corresponding to the matched data element. If the input signal does not match one of the core logic memory array data elements, then the output stage may transmit a miss signal "d2b_miss." Furthermore, the DLU output stage 1940 signals external resources that a match or miss result is available by activating a "done" signal "d2b_done."

Figure 20:
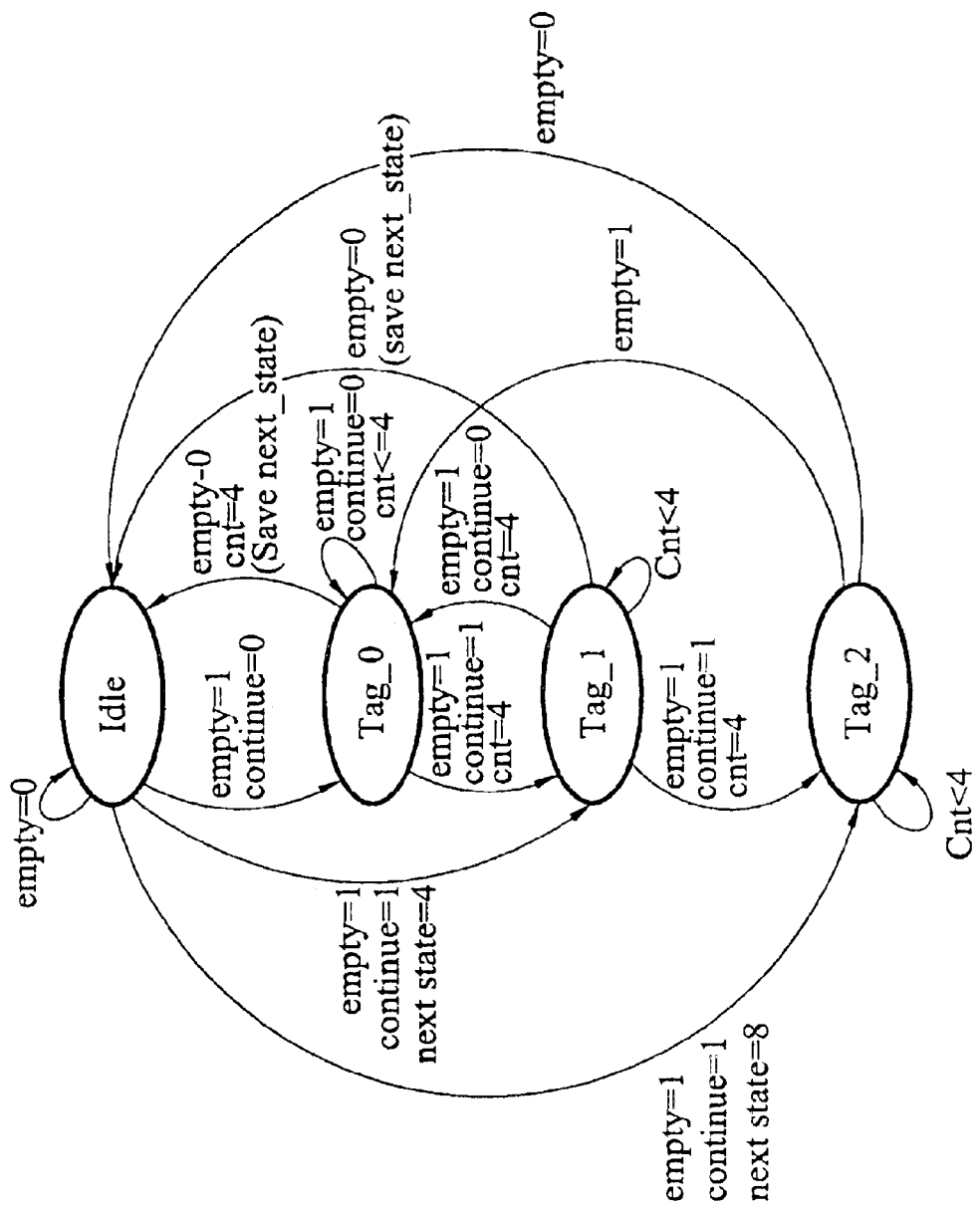
FIG. 20 is a state diagram illustrating the operation of a FIFO state machine controller according to one embodiment of the present invention.

FIG. 20 is a state diagram illustrating the operation of the FIFO state machine controller ("FSM") 1910 according to one embodiment of the present invention. The FSM of the present embodiment is particularly useful for loading data fragments from the string FIFO 1821. Data fragments may be, for example, protocol string fragments of complete protocol tags such as "accept," "content-location," or "proxy-authorization." Therefore, according to one embodiment of the present invention, the string FIFO 1821 may transmit a complete protocol string such as "accept." Additionally, the string FIFO 1821 may transmit a first protocol string fragment such as "content-" during a first time period, and then transmit a second protocol string fragment such as "location" during a second time period. Furthermore, the string FIFO 1821 may transmit a first protocol sting fragment such as "proxy-au" during a first time period, transmit a second protocol string fragment such as "thorizat" during a second time period, and transmit a third protocol string fragment "ion" during a third time period. Of course, the present technique allows for processing of data in a memory lookup system as it becomes available in the source (e.g., the string FIFO) and is thus not limited to string protocol data, tag strings, or FIFO's.

Initially, the FSM is in an "IDLE" state (e.g., state=0). The will remain in the IDLE state as long as the empty signal is low (i.e., logic 0). When a first fragment is available at the output of the string FIFO 1821, and thus received at the comparator inputs in the DLU core logic, the empty signal will go high (i.e., logic 1). The FSM will enter "TAG_0" state (e.g., state=2), and the state information will be transmitted to the DLU control logic 1920. In TAG_0 state the FSM will count 4 clock cycles using an internal counter while the DLU control logic 1920 and DLU core logic 1920 execute a table lookup operation. If the empty signal is low when internal FSM counter counts 4 clock cycles, then the FSM saves the TAG_0 state in the delay shift register 1950 for later use by the output stage 1940, and the FSM will return to the IDLE state. If the empty signal is high and the continue signal is high, then the FSM will enter the "TAG_1" state (e.g., state=4), and the new state information will be transmitted to the DLU control logic 1920. The TAG_1 state indicates that the input corresponds to a second fragment. The FSM will again count 4 clock cycles while the DLU control logic 1920 and DLU core logic 1930 execute a table lookup for the second fragment. If the empty signal is low when internal FSM counter counts 4 clock cycles, then the FSM saves the TAG_1 state in the delay shift register 1950 for later use by the output stage 1940, and the FSM will return to the IDLE state. If empty=1, continue=0, and the count has reached 4 cycles (i.e., cnt=4), then the next data in the string FIFO is a new tag string, and the FSM returns to state TAG_0. If empty=1, continue=1, and cnt=4, then the next data in the string FIFO is a third fragment, and the FSM will enter the "TAG_2" state (e.g., state=8). The FSM will again count 4 clock cycles while the DLU control logic 1920 and DLU core logic 1930 execute a table lookup for the third fragment. If the empty signal is low when internal FSM counter counts 4 clock cycles, then the FSM will return to the IDLE state. If empty=1, then there is a new tag immediately available in the string FIFO, and the FSM returns to TAG_0 state to begin processing a new series of fragments. Additionally, if successive fragments are not immediately available at the output of the string FIFO when a prior fragment has been completed (empty=0 and continue=1 when cnt=4), then the FSM may go back to IDLE state until the next fragment is available. When the next fragment is received, if empty=1, continue=1, and next state=4, then the next fragment is a second fragment and the FSM enters TAG_1 state. If empty=1, continue=1, and next state=8, then the next fragment is a third fragment and the FSM enters TAG_2 state.

Figure 21:
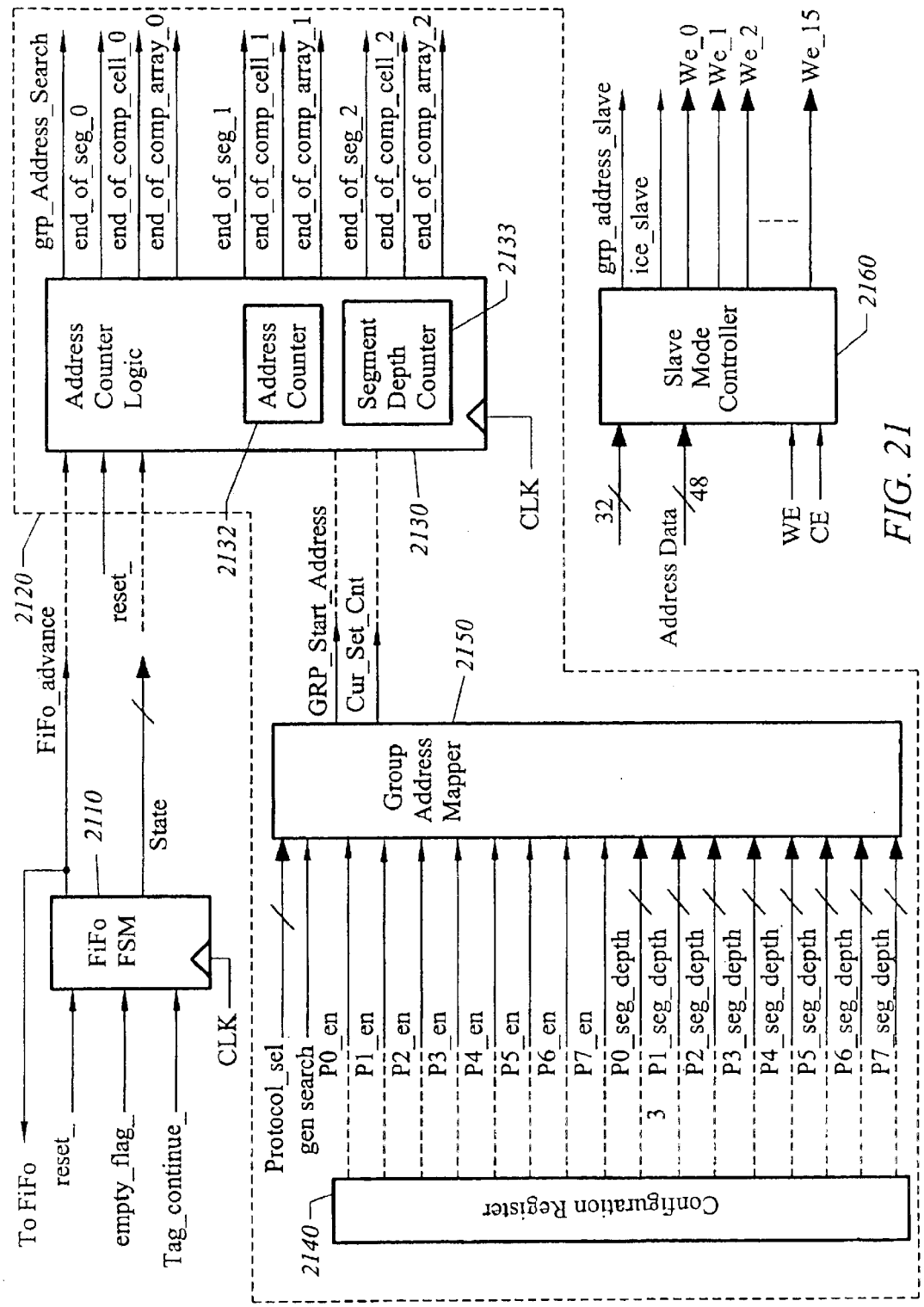
FIG. 21 illustrates DLU control logic and a FIFO state machine according to one embodiment of the present invention.

FIG. 21 illustrates the DLU control logic and FSM according to one embodiment of the present invention. The FSM 2110 transmits state information and a FIFO advance signal to the DLU control logic address controller 2120 The address controller 2120 includes an address counter 2130, configuration register 2140, and address group mapper 2150. The DLU control logic also includes a slave mode controller 2160. The configuration register 2140 may include protocol enable bits and segment depth codes for each protocol supported by the system similar to those describe above with reference to FIGS. 12 and 13. The data stored in the configuration register 2140 is coupled to the group address mapper 2150. The group address mapper 2150 uses the protocol enable and segment depth information in the configuration register 2140 to generate the starting address and segment depth count ("Cur_seg_depth") of the protocol for indexing the memory arrays in the DLU core logic 1930. The group address mapper 2150 also receives a protocol select input signal to indicate which protocol is active, and thus which memory locations should be accessed. Furthermore, the group address mapper 2150 also receives a general search input signal for signaling the system to perform a general search.

According to one embodiment, the DLU is implemented in an FPGA and each memory array includes multiple protocols with allowable segments depth of 16, 32, 48, and 64 words. Accordingly, the DLU memory arrays may include up to four concurrent protocols. Other implementations of course may use larger memory arrays for storing up to 256 words, and store up to 8 protocols simultaneously.

To calculate the ending of the protocol segment within the cell's memory array, a mapping from the protocol segment depth to a number representing the count of elements within the segment is used. This is the segment depth count ("segment_depth_cnt"), which depicted at the output of the group address mapper 2150 as "Cur_seg_cnt." Table 2 shows the segment depth count mapping.

TABLE 2

| Protocol Segment Depth (from Config Reg) | Segment Depth | Segment Depth Count ("segment_depth_cnt") |
|---|---|---|
| 000 | 16 | 4 |
| 001 | 32 | 8 |
| 010 | 48 | 12 |
| 011 | 64 | 16 |
| 100 | 96 | 24 |
| 101 | 128 | 32 |
| 110 | 192 | 48 |
| 111 | 256 | 64 |

In one embodiment, the group starting address may be calculated from the segment depth count according to the approach given in Table 1.

In response to the inputs, the group address mapper 2150 generates a group start address ("GRP_start_address") and segment depth count ("Cur_seg_cnt"). The FSM state, start address, and segment depth information are transmitted to the address counter logic 2130. The address counter logic 2130 may include an address counter 2132 and a segment depth counter 2133. The address counter logic 2130 transmits a group start address to the memory array in the DLU core logic 1930. Additionally, the address counter 2132 starts at the group start address and counts up. The address counter 2132 stops when the end of the segment is reached (i.e., at the segment depth count). The segment depth counter 2133 generates control signals needed for accessing independent memory basks in the DLU core logic 1930 memory arrays. In one embodiment, the memory arrays include a plurality of memory cells each having three independent memory banks for storing first, second, and third data fragments. The segment depth counter 2133 receives the segment depth count, state information, and FIFO advance signal and generates control signals for each memory bank in the DLU core logic 1930 storing data fragments. The state information, memory bank, and control signal relations are shown in Table 3. For example, when "state"=TAG_0=2 (e.g., the first input fragment of a tag input string), then the first memory bank and a memory cell should be accessed and data elements stored therein processed in accordance with the first input fragment. Accordingly, the signals "end_of_seg_0," "end_of_comp_cell_0," and "end_of_comp_array_0" are generated.

TABLE 3

| State Name | State Value | Memory Bank | Control Signals |
|---|---|---|---|
| IDLE | 0 | — | — |
| TAG_0 | 2 | 0 | end_of_seg_0<br>end_of_comp_cell_0<br>end_of_comp_array_0 |
| TAG_1 | 4 | 1 | end_of_seg_1<br>end_of_comp_cell_1<br>end_of_comp_array_1 |
| TAG_2 | 8 | 2 | end_of_seg_2<br>end_of_comp_cell_2<br>end_of_comp_array_2 |

FIG. 21 also illustrates the slave mode controller 2160, which may be included in the DLU control logic 1920. The slave mode controller 2160 may be used to put the DLU in slave mode for programming the internal memory arrays, the configuration register, or other internal resources. The slave mode controller 2160 may receive a 32-bit address signal, a 48-bit data signal, a write enable signal, and a chip enable signal. The slave mode controller 2160 may generate a slave group address "grp_address_slave" for accessing memory array locations to be programmed, an internal chip enable signal "ice_slave," and write enable signals for different portions of the memory array (e.g., write enable signals for memory cells We_0–We_15 for a memory array with 16 memory cells). In addition, both the FSM 2110 and Address counter logic 2132 may receive a reset signal (e.g., reset_) for resetting the system.

Figure 22:
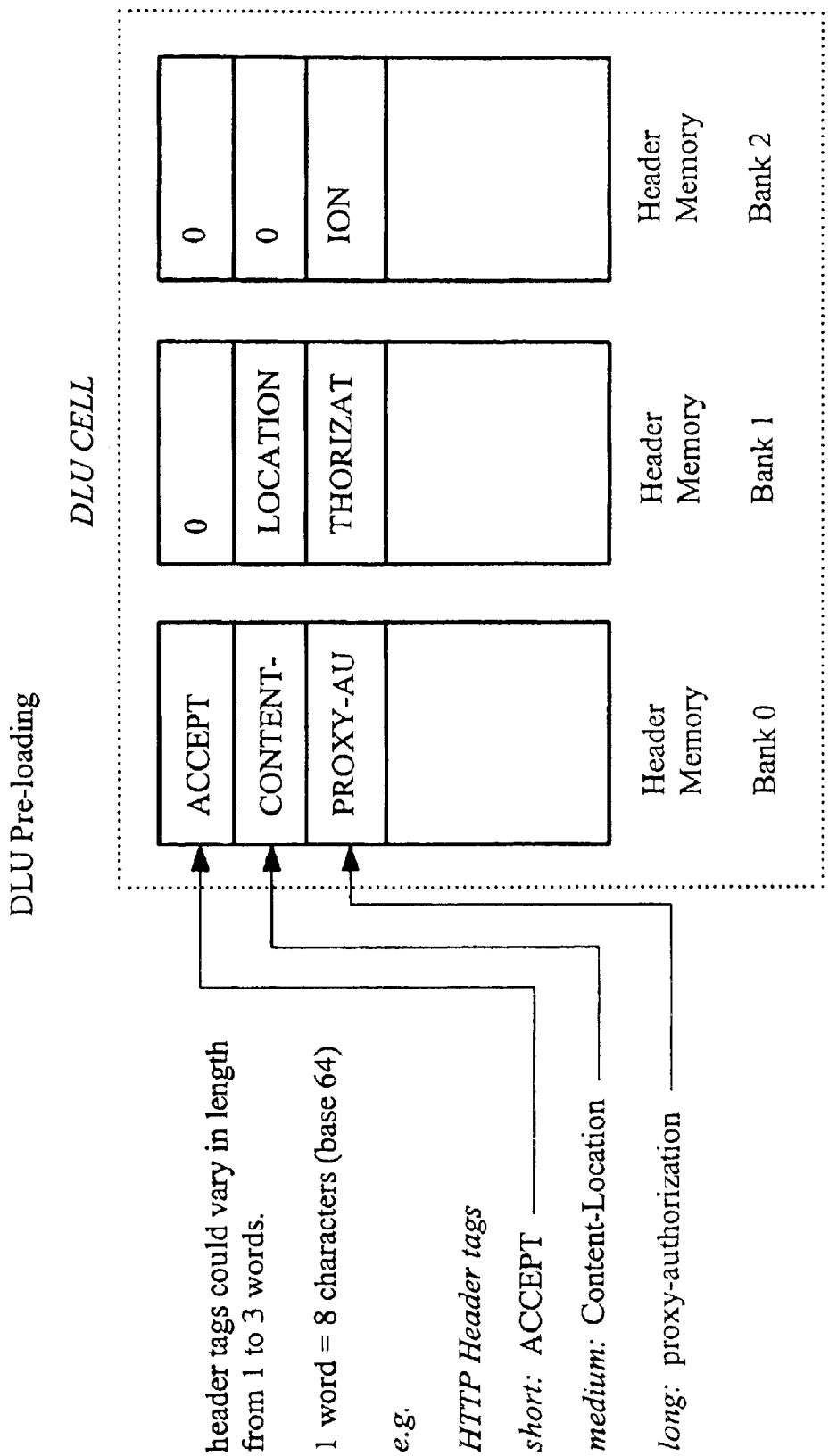
FIG. 22 illustrates data fragment loading into a memory array according to one embodiment of the present invention.

FIG. 22 illustrates data fragment loading into a memory array according to one embodiment of the present invention. Data elements supported by the DLU memory array may have different lengths. For example, HTTP header tag strings may vary between one to three 8 character fragments (i.e., words), wherein the characters may be base64 coded. In accordance with this technique, data elements in the DLU memory array may be divided into fragments and stored in multiple memory banks. As fragments are received in the DLU, individual banks may be accessed depending upon which fragment is being received. For example, if HTTP protocol is supported by the DLU, then "ACCEPT" would be stored in bank 0, "CONTENT-LENGTH" would be divided into two fragments and stored in banks 0 and 1, in "PROXY-AUTHORIZATION" would be divided into three fragments and stored in banks 0, 1, and 2.

Figure 23:
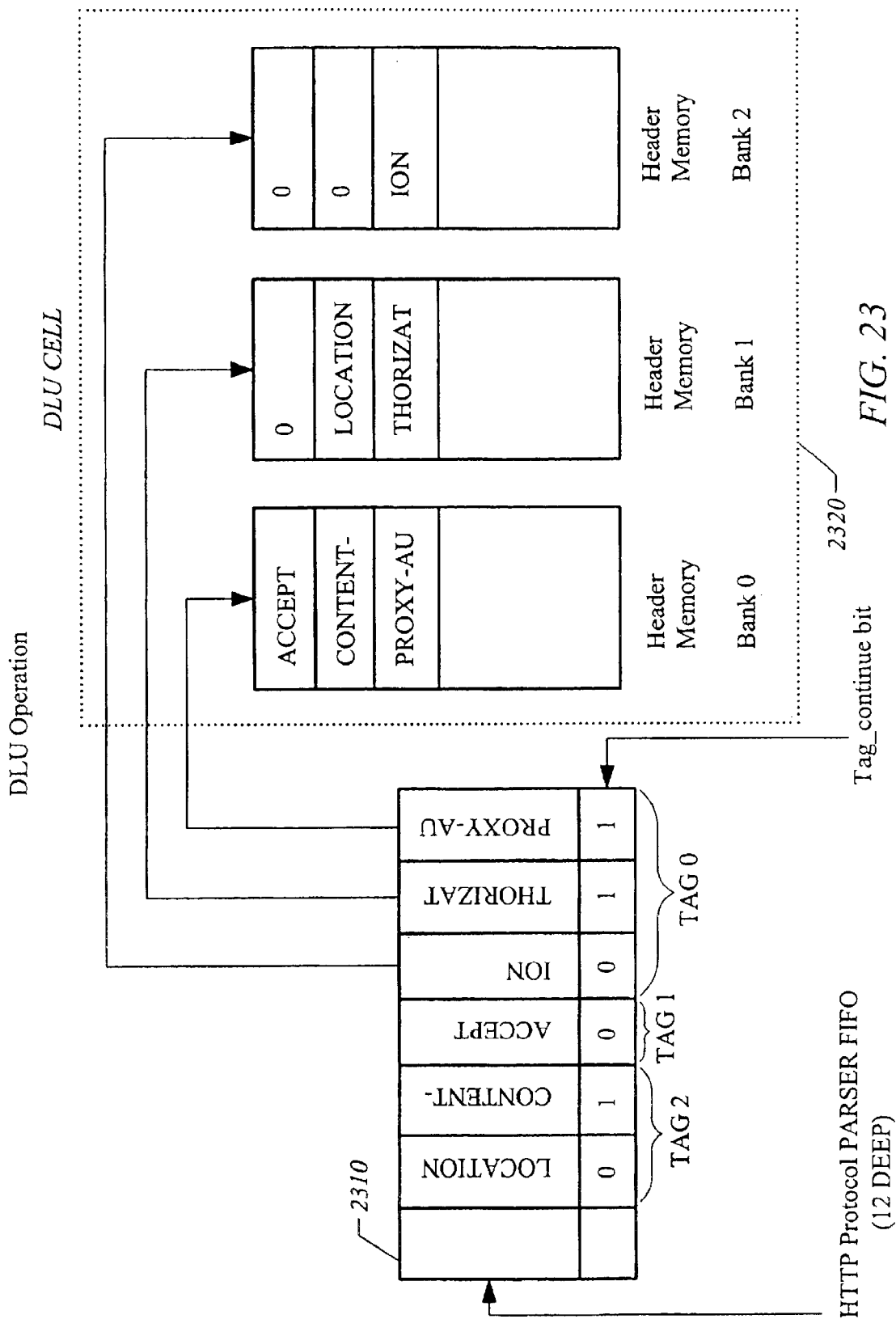
FIG. 23 illustrates how successive fragments may be compared against data elements in different memory banks according to one embodiment of the present invention.

FIG. 23 illustrates how successive fragments may be compared against data elements in different memory banks according to one embodiment of the present invention. As each fragment is made available in the string FIFO 2310, it is transmitted to the DLU for processing. In one embodiment, the string FIFO 2310 may be a 12 deep FIFO which receives HTTP protocol tag strings from a parser. The string FIFO 2310 may include a tag continue bit. For a single tag string that is 8 characters or less (i.e., fits within one fragment), the tag continue bit will be zero to indicate that the corresponding FIFO data is a single fragment (e.g., "ACCEPT"). On the other hand, if the tag string is over eight characters (e.g., "CONTENT-LOCATION"), then the tag will be divided into two or more fragments each 8 characters in length (i.e., each fragment being 48-bits for base64 6-bit/character coding), and stored in successive FIFO memory locations. The tag continue bit will be active (e.g., tag_continue=1) for the first fragment. The tag continue bit will be inactive for the last fragment. For another example, if the tag string is "PROXY-AUTHORIZATION," then the first FIFO memory location will contain the fragment "PROXY-AU" and the tag continue bit will be active. The second and third FIFO memory locations will contain the fragments "THORIZAT" and "ION," respectively. The tag continue bit will be active during the first fragment to indicate to the FSM (not shown) that the current input tag string includes multiple fragments. The tag continue bit will stay active until the last fragment (e.g., "ION"). When the tag continue bit transitions from active (e.g., tag_continue=1) to inactive (e.g., tag_continue=0), the FSM will know that the current fragment is the last fragment of the tag string.

The DLU will compare the input fragments against fragments pre-loaded into particular memory banks according to the state information in the FSM. For example, if "ACCEPT" is input to the DLU, it will be compared against internal DLU tag strings in bank 0 because the FSM will be in TAG_0 state. However, if "CONTENT-LOCATION" is input into the DLU, it will be received in a first fragment "CONTENT-" and a second fragment "LENGTH." Therefore, "CONTENT" will be compared against internal DLU strings in bank 0 when the FSM is in TAG_0 state, and "LENGTH" will be compared against internal DLU strings in bank 1 when the FSM is in TAG_1 state. Furthermore, if "PROXY-AUTHORIZATION" is input into the DLU, it will be received in a first fragment "PROXY-AU," a second fragment "THORIZAT," and a third fragment "ION." Therefore, "PROXY-AU" will be compared against internal DLU strings in bank 0 when the FSM is in TAG_0 state, "THORIZAT" will be compared against internal DLU strings in bank 1 when the FSM is in TAG_1 state, and "ION" will be compared against internal DLU strings in bank 2 when the FSM is in TAG_2 state.

Figure 24:
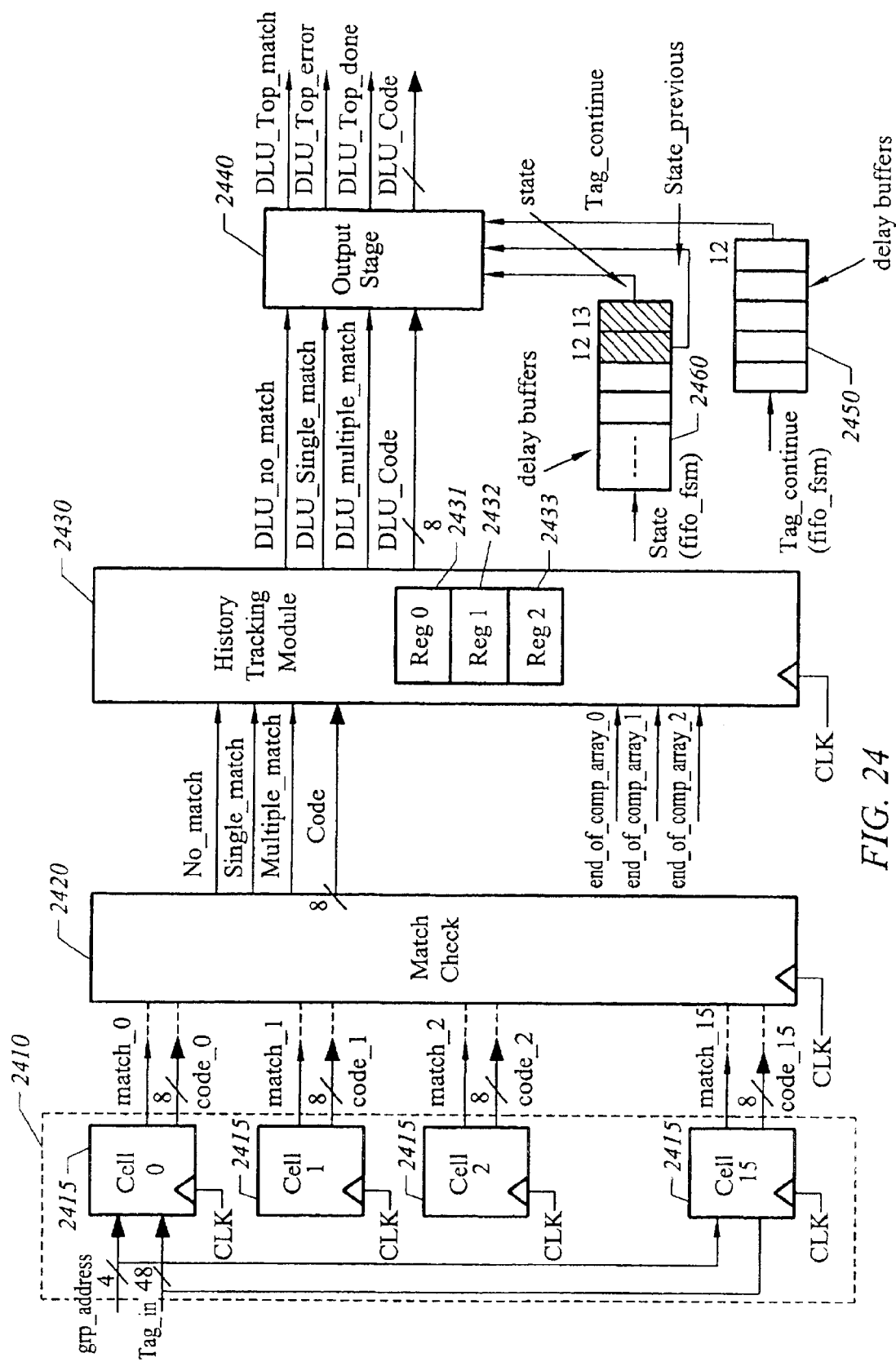
FIG. 24 illustrates a DLU core logic and output stage according to one embodiment of the present invention.

FIG. 24 illustrates a DLU core logic and output stage according to one embodiment of the present invention. The DLU core logic includes a memory array 2410, a match check module 2420, and a history tracking module 2430. The output of the history tracking mechanism 2430 is coupled to the output stage 2440. The output stage 2440 receives the history tracking module output signals, delayed state information, and a delayed tag continue signal and generates a match signal ("DLU_top_match"), a no match signal ("DLU_top_error"), a done signal ("DLU_top_done"), and transmits a code word ("DLU_code"). According to one embodiment of the present invention, the memory array 2410 includes a plurality of memory cells 2415 (e.g., cell0–cell 15). Each memory cell 2415 receives the group address from the address counter logic for simultaneously accessing memory locations in each cell. If each memory cell 2415 contains 16 memory locations, the group address may be a 4-bit address for simultaneously accessing each of the memory locations in each memory cell. Each memory cell 2415 also receives an input signal. In one embodiment, the input signal is a 48-bit tag string data on a "tag_in" line. The group address may be incremented across ranges of addresses within the memory cell 2415. For example, if the enabled protocol is HTTP, then the group start address may correspond to an HTTP protocol segment in each memory cell 2415. The address may be incremented to access each memory location in the HTTP protocol segment in each memory cell until either one of the data elements matches the input signal or until the segment depth count is reached (i.e., the end of the protocol segment). Each memory cell 2415 will transmit to the match check module 2420 a match signal indicating if there was a match and, if there is a match, a code word.

Figure 25:
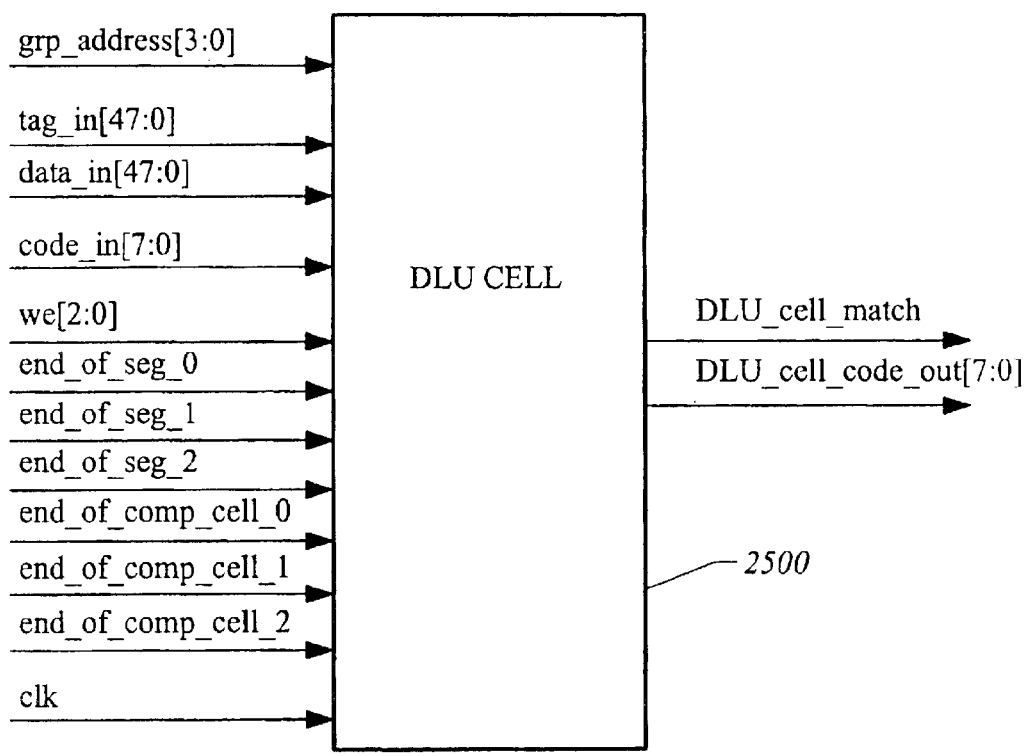
FIG. 25 illustrates the input and output signals of a single DLU memory cell according to one embodiment of the present invention.

FIG. 25 illustrates the input and output signals of a single DLU memory cell according to one embodiment of the present invention. The DLU memory cell 2500 receives a 4-bit group address signal "grp_address[3:0]" and an input tag string data signal "tag_in[47:0]" for commencing a lookup operation. Data fragments received during different time periods may be compared against protocols that are broken into fragments and pre-loaded into multiple memory banks. If the input signal matches one of the pre-loaded data elements, then the memory cell 2500 generates an active signal on "DLU_cell_match" output and transmits a pre-loaded code word corresponding to the matched data element on "DLU_cell_code_out[7:0]". Data elements may be pre-loaded on "data_in[47:0]" and code words may be pre-loaded on "code_in[7:0]". The memory cell 2500 also receives "end_of_seg_0," "end_of_seg_1," and "end_of_seg_2" from the address controller to enable the inputs and outputs of the internal memory blocks in the memory cell. Additionally, the memory cell 2500 receives "end_of_comp_cell_0," "end_of_comp_cell_1," and "end_of_comp_cell_2" from the address controller for controlling the inputs and outputs of the internal comparators in the memory cell. Furthermore, the memory cell 2500 receives a write enable signal "we[2:0]" and a clock "clk."

Figure 26:
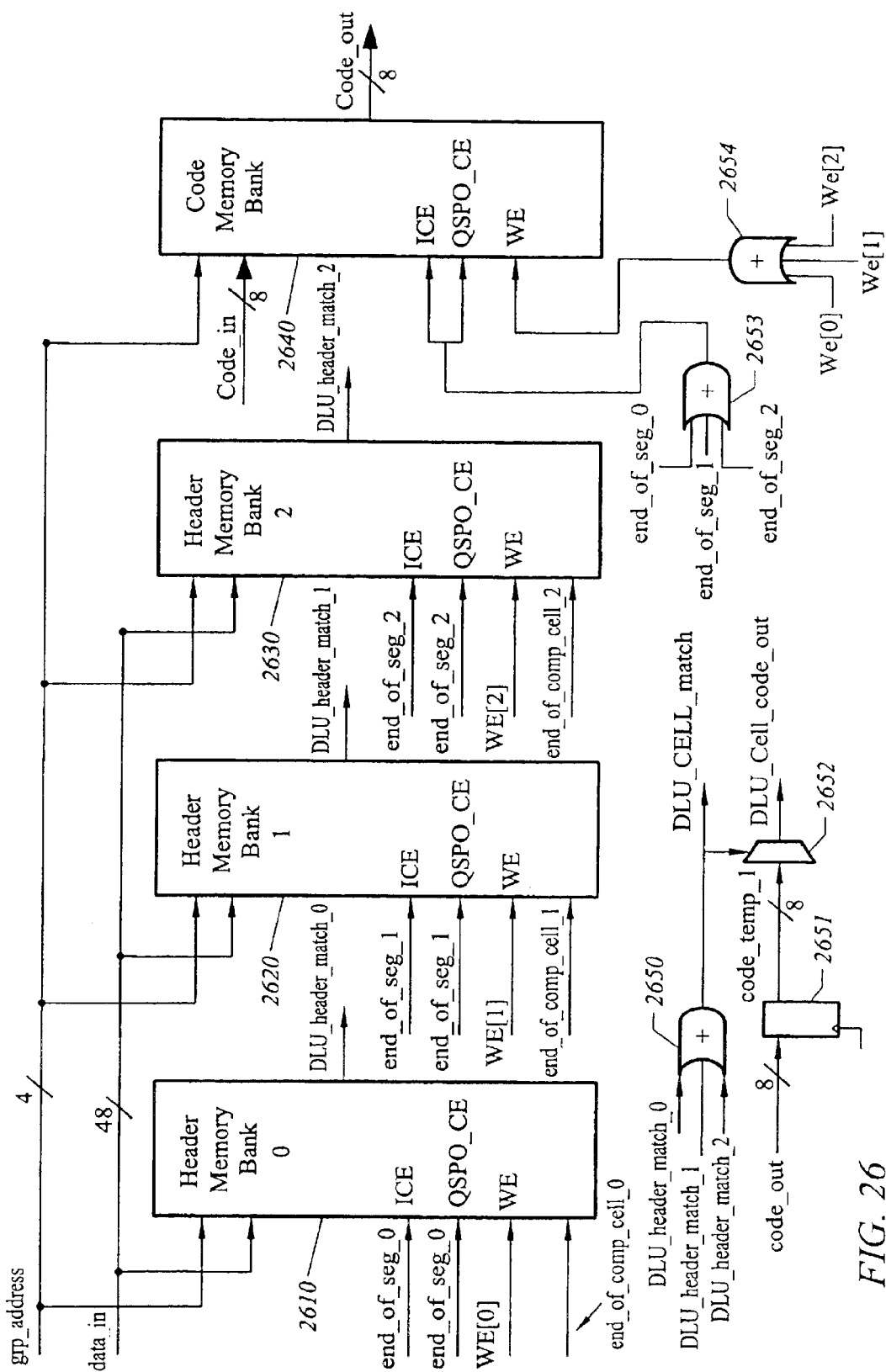
FIG. 26 illustrates the internal memory banks and circuitry of a memory cell according to one embodiment of the present invention.

FIG. 26 illustrates the internal memory banks and circuitry of a memory cell according to one embodiment of the present invention. Each memory cell may include three memory banks 2610, 2620, and 2630 for receiving input signals and generating an output match signal. Each memory cell may also include a code memory bank 2640 for receiving the match signal results of the three memory banks 2610, 2620, and 2630, and generating a code word when there is a match. Input signals are received on the "data_in" line, and may be 48-bit tag string data, for example. Addresses for the internal memory blocks in each memory bank are received on the "grp_address" line, and may be 4-bit address for individually accessing each of 16 different memory locations in the internal memory block, for example. During a first time period, when the first fragment is received (i.e., TAG_0, state=2), memory bank 2610 is enabled by the "end_of_seg_0" and "end_of_comp_cell_0" signals. The code memory bank 2640 is enabled by the operation of "end_of_seg_0" and OR gate 2653. Thus, the data elements in memory bank 2610 and code words in code memory bank 2640 are simultaneously accessed. As each code word is accessed, it is received in latch 2651, and at the input of multiplexor ("MUX") 2652. The other input of MUX 2652 may be tied to ground, for example. If a match signal is returned on the "DLU_header_match_0" output, then OR gate 2650 transfers the code word to the "DLU_cell_code_out" line. Likewise, during a second time period, when a second fragment is received (i.e., TAG_1, state=4), memory bank 2620 is enabled by the "end_of_seg_1" and "end_of_comp_cell_1" signals. The code memory bank 2640 is enabled by the operation of "end_of_seg_1" and OR gate 2653. Thus, the data elements in memory bank 2620 and code words in code memory bank 2640 are simultaneously accessed during the TAG_1 state. If a match signal is returned on the "DLU_header_match_1" output, then OR gate 2650 transfers the code word to the "DLU_cell_code_out" line. During a third time period, when a third fragment is received (i.e., TAG_2, state=8), memory bank 2630 is enabled by the "end_of_seg_2" and "end_of_comp_cell_2" signals. The code memory bank 2640 is enabled by the operation of "end_of_seg_2" and OR gate 2653. Thus, the data elements in memory bank 2630 and code words in code memory bank 2640 are simultaneously accessed during the TAG_2 state. If a match signal is returned on the "DLU_header_match_2" output, then OR gate 2650 transfers the code word to the "DLU_cell_code_out" line. Memory banks 2610, 2620, 2630, and 2640 may also be pre-loaded using write enable lines WE[0], WE[1], and WE[2]. The header memory banks may be organized in the memory array to allow parallel operation. While a memory bank is still processing data through its pipeline, the DLU can unload a new data tag fragment from the string FIFO into the next successive memory bank to begin processing.

Figure 27:
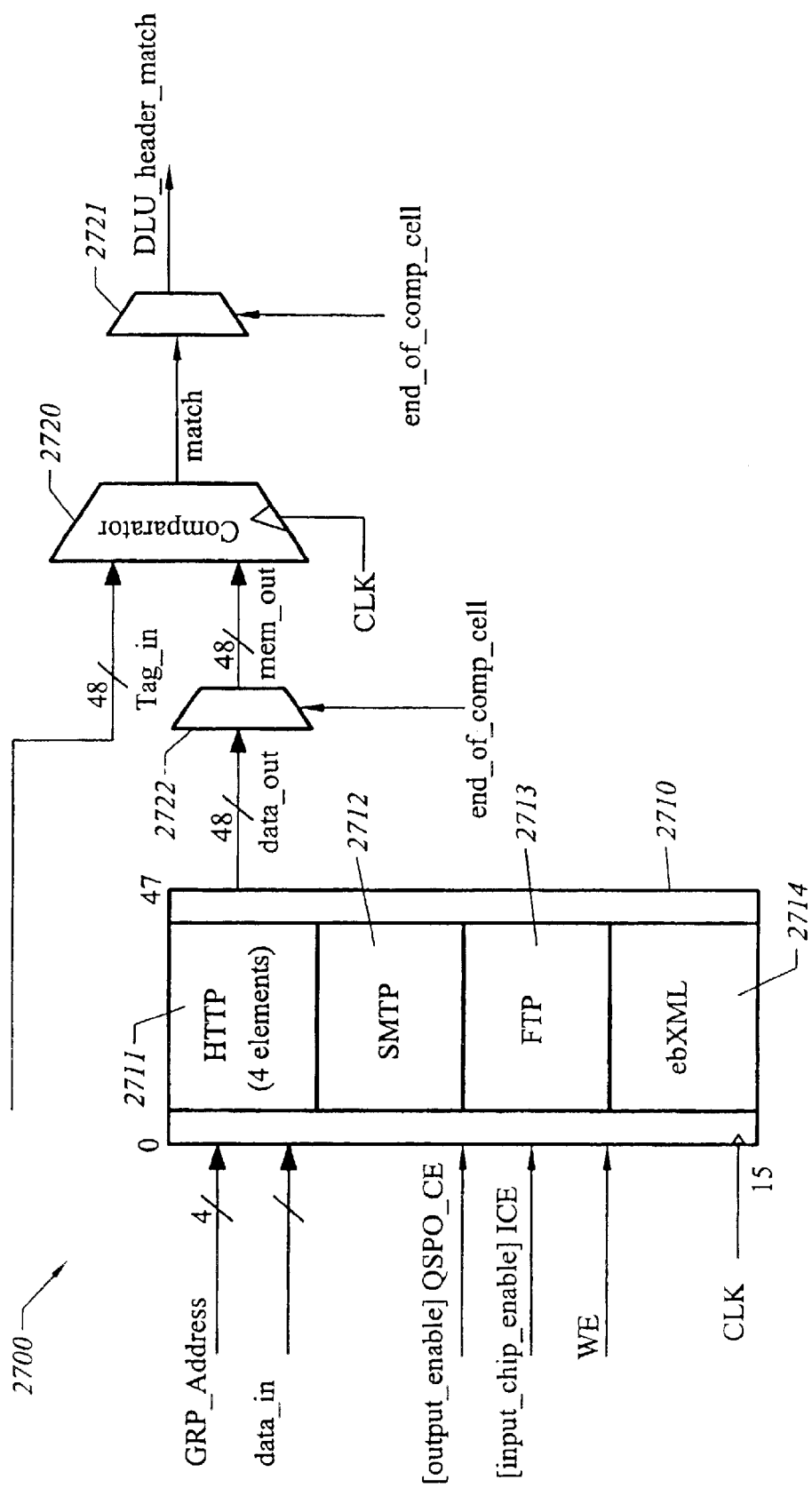
FIG. 27 illustrates a memory bank 2700 according to one embodiment of the present invention.

FIG. 27 illustrates a memory bank 2700 according to one embodiment of the present invention. Each memory bank 2700 in the system may include a memory block 2710 and comparator 2720. The memory block 2710 may be divided into protocol segments 2711, 2712, 2713, and 2714, for example. Each protocol segment may include a number of memory locations at specific for storing data fragments. In one embodiment, the memory block 2710 includes 16 48-bit memory locations that store protocol fragments. For example, a first protocol segment 2711 may include 4 HTTP protocol fragments. Other protocol segments 2712–2714 may include SMTP, FTP, or ebXML protocol fragments. The memory block receives the group address for accessing memory location. The inputs and outputs of the memory block are enables by QSPO_CE and ICE, respectively, which may be coupled to the "end_of_seg_x" signals. Data elements may also be loaded into the memory block on the "data_in" signal line under control of the write signal "WE". Furthermore, the memory block 2710 receives a clock signal CLK.

In response to receiving an address, the memory block 2710 transmits data elements on "data_out" line to the input of control gate 2722. The control gate 2722 is controlled by the "end_of_comp_cell" signal, which is activated under the control of the address controller in the DLU control logic. An input signal is received on the first input of comparator 2720. In one embodiment the input signal is a 48-bit base64 coded tag string data signal. The second input of the comparator 2720 is coupled to receive the data from the memory block location accessed by each address. Accordingly, the address controller will increment the address, and successive data elements in each memory location of a given protocol segment will be successively provided to the second input of comparator 2720 and compared to the input signal. The comparator 2720 is a 2 input 48-bit comparator, and also receives a clock signal CLK. In one embodiment, the comparator is a 2-stage comparator. If the input signal matches one of the data elements in the memory block, then a match signal is transmitted from the comparator output to the input of a second control gate 2721. The second control gate also receives the "end_of_comp_cell" signal, and will transmit the match signal to the "DLU_header_match" output of the memory bank.

Figure 28:
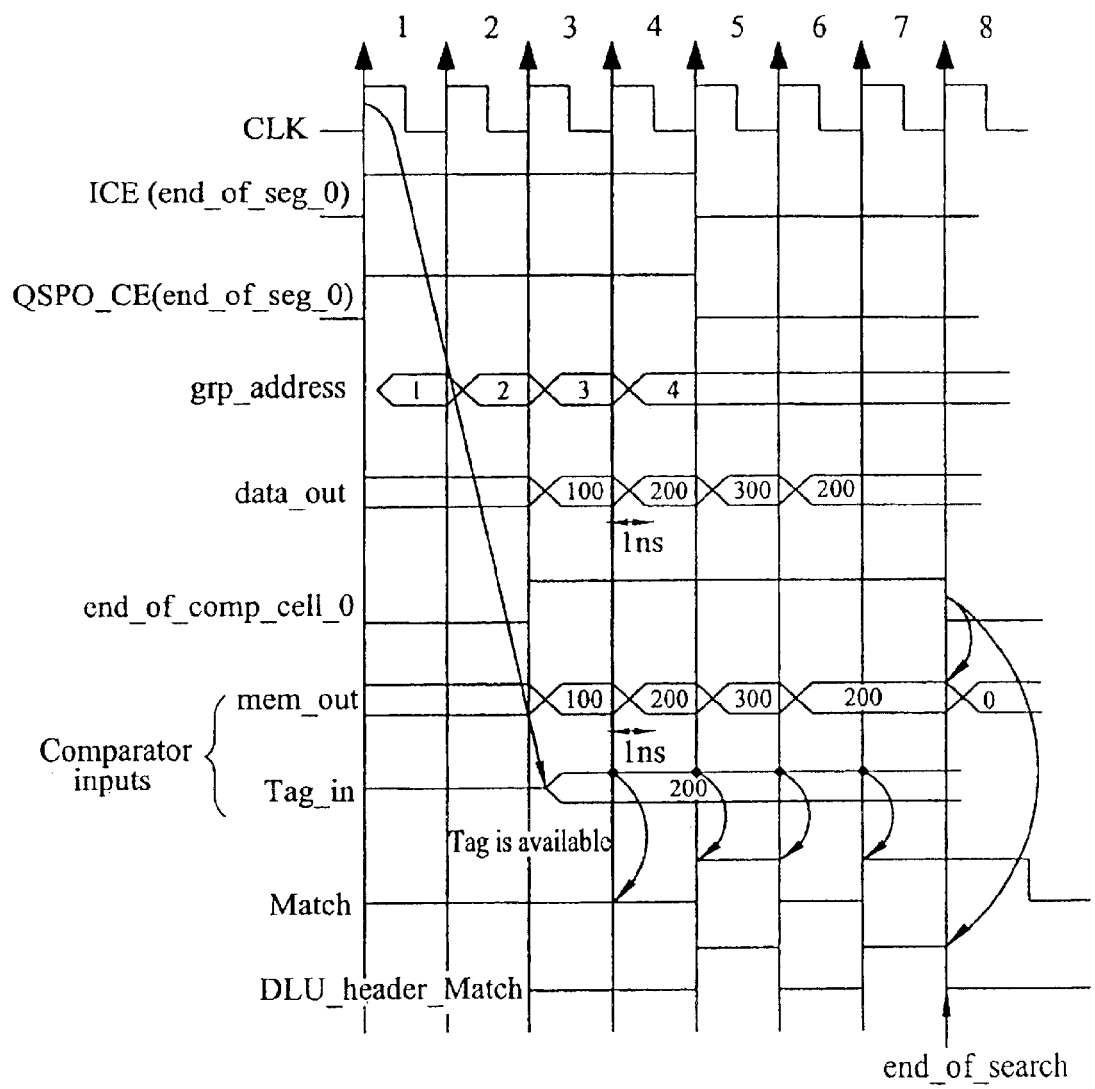
FIG. 28 is a timing diagram illustrating the operation of a memory bank according to one embodiment of the present invention.

FIG. 28 is a timing diagram illustrating the operation of a memory bank according to one embodiment of the present invention. The memory block and comparator each are activated by a clock signal shown as CLK. On the first clock, the inputs and outputs of the memory block are enabled when the ICE and QSPO_CE signals are activated. The first four group addresses are successively transmitted from the address controller and received by the memory block on the "grp_address" line during clock cycles 1–4. The "end_of_comp_cell_0" signal is activated at the beginning of clock cycle 3 to allow the accessed data in the memory locations to be transmitted to the second input of the comparator. Data elements "100," "200," "300," and "200" are illustrated. The input signal is available at the "tag_in" line during cycle 3. The input signal illustrated is a tag string of "200." On the rising edge of clock cycle 4, the output of the comparator will be inactive because the first element "100" does not match the input "200." However, during the next compare cycle, the accessed data element is equal to the input signal, and the match signal is activated in the rising edge of cycle 5. The "DLU_header_match" output signal is also activated from the match. After the four data locations are accessed and compared, the "end_of_comp_cell_0" signal is deactivated on the rising edge of cycle 8, signaling the end of a search.

Referring again to FIG. 24, the match check module 2420 receives the match results from each memory cell 2415 and a clock signal CLK, and generates a "no_match" if none of the memory banks accessed contained a match with the input signal. The match check module 2420 generates a "single_match" signal if one of the memory cells include a memory bank that contained a matching data element. The match check module 2420 generates a "multiple_match" signal is more than of the memory cells include a memory bank that contained a matching data element.

The output of the match check module 2420 is received by the history checking module 2430. The history checking module 2430 may include three history registers History_0 "REG0" 2431, History_1 "REG1" 2432, and History_2 "REG2" 2433. The history registers will be set to 0 at "reset_." The active history register is incremented by 1 when a "single_match" signal is asserted, and incremented by 2 if a "multiple_match" signal is asserted. The history checking module 2430 also receives the signals "end_of_comp_array_0," "end_of_comp_array_1," and "end_of_comp_array_2" from the address controller to keep track of the fragment being processed. For example, if the "end_of_comp_array_0" signal is asserted, then that means that a first fragment "fragment_0" is being processed. Accordingly, REG0 is updated. The history checking module 2430 outputs a "DLU_no_match," a "DLU_single_match," and a "DLU_multiple_match."

Figure 29:
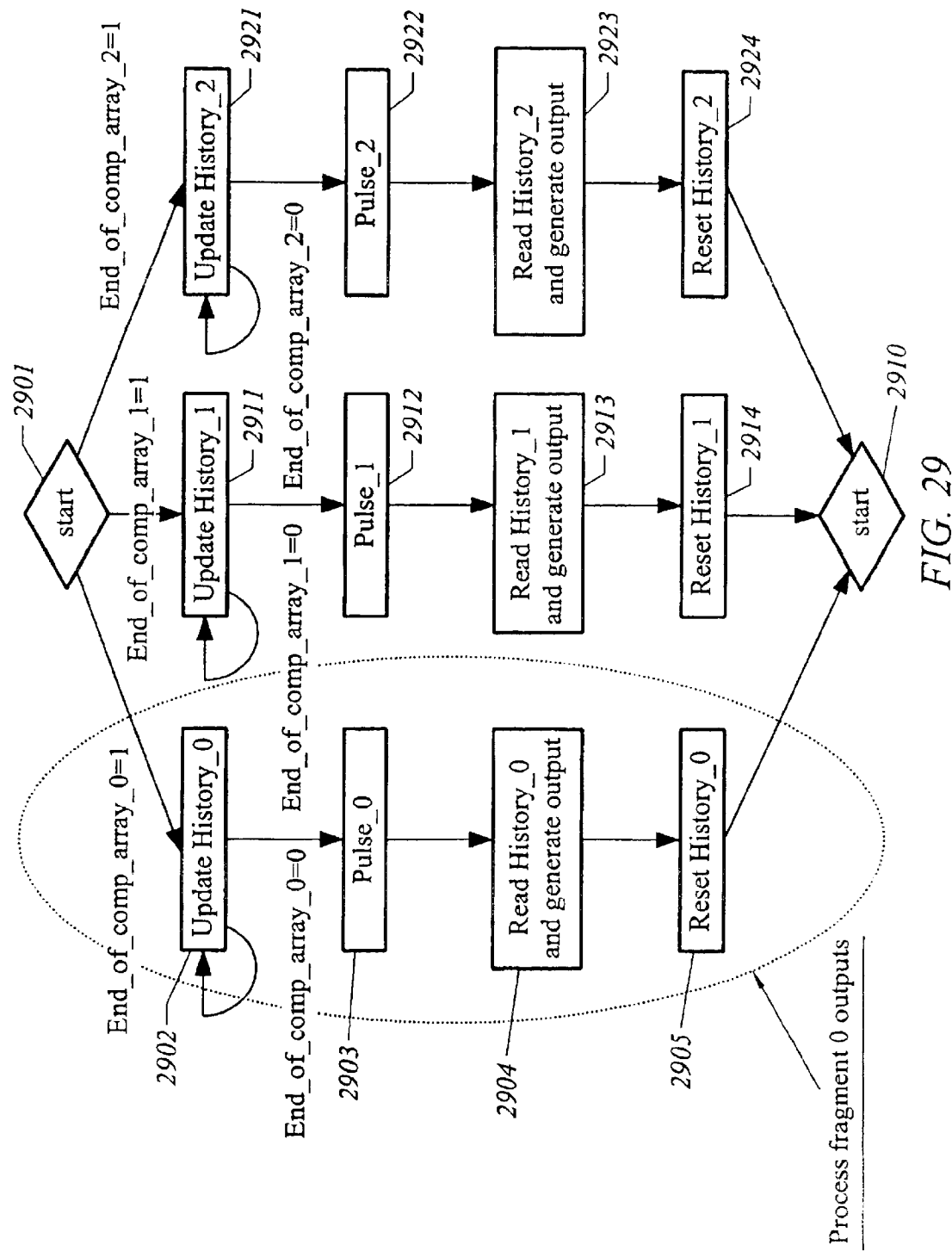
FIG. 29 is a state diagram illustrating the operation of the history tracking module according to one embodiment of the present invention.

FIG. 29 is a state diagram illustrating the operation of the history tracking module according to one embodiment of the present invention. The system begins at the start state 2901. When the "end_of_comp_array_0" is activated, the History_0 register 2431 is loaded with a value to indicate whether there was no match, a match, or multiple match at 2902. At the end of a first fragment compare cycle, the "end_of_comp_array_0" is de-activated, and a first pulse "pulse_0" is generated at 2903. The history tracking module 2430 then reads the value of the History_0 register 2431 and generates a first output at 2904. At 2905, the History_0 register 2431 is reset, and the history tracking module 2430 returns to start state at 2910. When the "end_of_comp_array_1" is activated, the History_1 register 2432 is loaded with a value to indicate whether there was no match, a match, or multiple match at 2911. At the end of a second fragment compare cycle, the "end_of_comp_array_1" is de-activated, and a second pulse "pulse_1" is generated at 2912. The history tracking module 2430 then reads the value of the History_1 register 2432 and generates a second output at 2913. At 2914, the History_1 register 2432 is reset, and the history tracking module 2430 again returns to start state at 2910. Similarly, when the "end_of_comp_array_2" is activated, the History_2 register 2433 is loaded with a value to indicate whether there was no match, a match, or multiple match at 2921. At the end of a third fragment compare cycle, the "end_of_comp_array_2" is de-activated, and a third pulse "pulse_2" is generated at 2922. The history tracking module 2430 then reads the value of the History_2 register 2433 and generate a third output at 2923. At 2924, the History_2 register 2433 is reset, and the history tracking module 2430 returns to start state at 2910.

Figure 30:
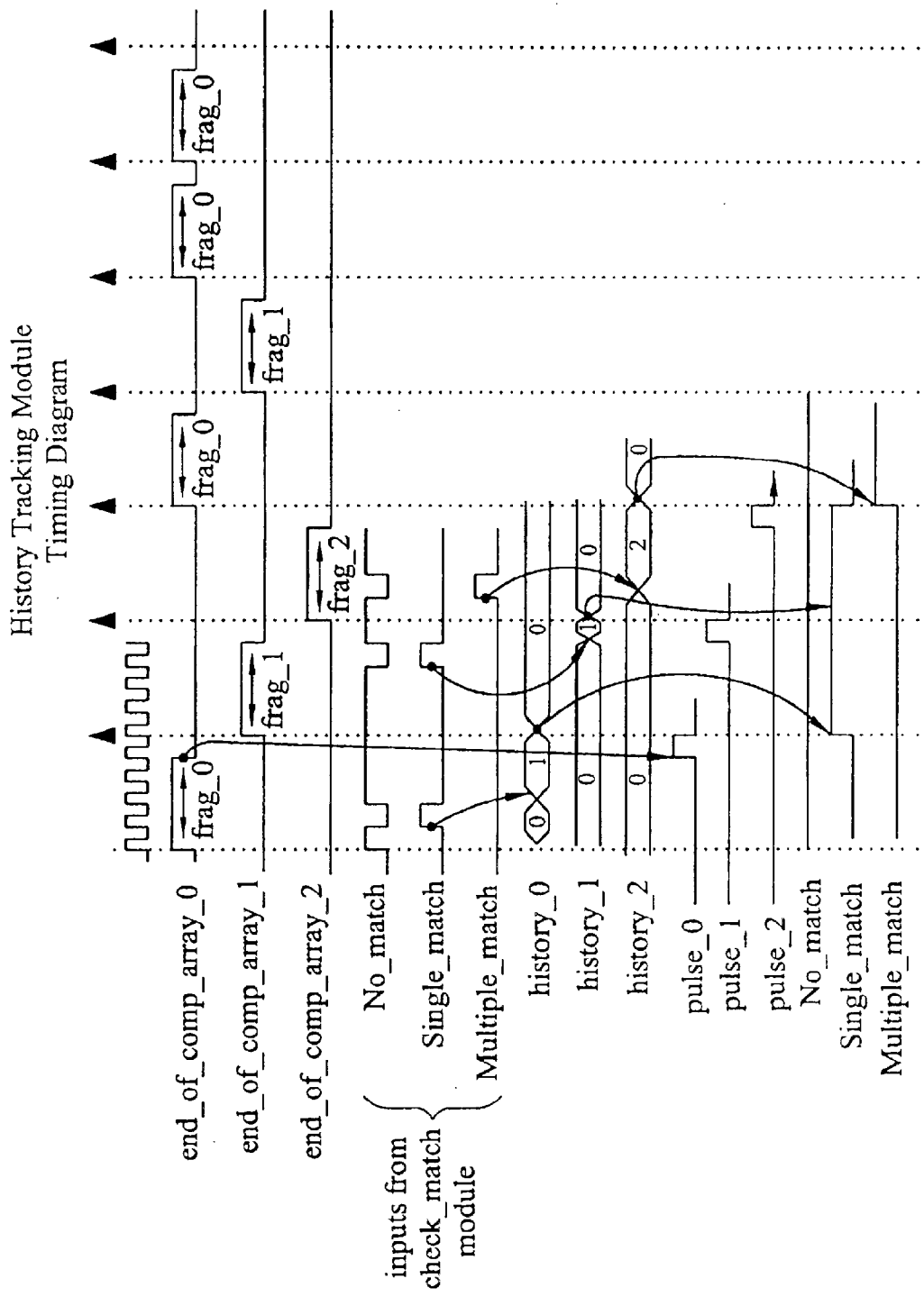
FIG. 30 is a timing diagram illustrating the operation of the history tracking module according to one embodiment of the present invention.

FIG. 30 is a timing diagram illustrating the operation of the history tracking module 2430 according to one embodiment of the present invention. When a first fragment "frag_0" is received, the address controller in DLU control logic 1920 activates "end_of_comp_array_0." The history tracking module 2430 then receives the inputs from the match check module 2420 and stores the result in the History_0 register 2431. A single match during the first fragment cycle is shown in FIG. 30, and the History_0 register 2431 records the single match. When the "end_of_comp_array_0" is de-activated by the address controller, pulse_0 is activated until the beginning of the next cycle, and the single match is transmitted on the "DLU_single_match" output of the history tracking module 2430. When a second fragment "frag_1" is received, the address controller in DLU control logic 1920 activates "end_of_comp_array_1." The history tracking module 2430 then receives the inputs from the match check module 2420 and stores the result in the History_1 register 2432. A single match during the second fragment cycle is shown in FIG. 30, and the History_1 register 2432 records the single match. When the "end_of_comp_array_1" is de-activated by the address controller, pulse_1 is activated until the beginning of the next cycle, and the single match is maintained in an active state on the "DLU_single_match" output of the history tracking module 2430. When a third fragment "frag_2" is received, the address controller in DLU control logic 1920 activates "end_of_comp_array_2." The history tracking module 2430 then receives the inputs from the match check module 2420 and stores the result in the History_2 register 2433. A multiple match during the third fragment cycle is shown in FIG. 30, and the History_2 register 2433 records the multiple match. When the "end_of_comp_array_2" is de-activated by the address controller, pulse_2 is activated until the beginning of the next cycle, and the multiple match is transmitted on the "DLU_single_match" output of the history tracking module 2430.

Figure 31:
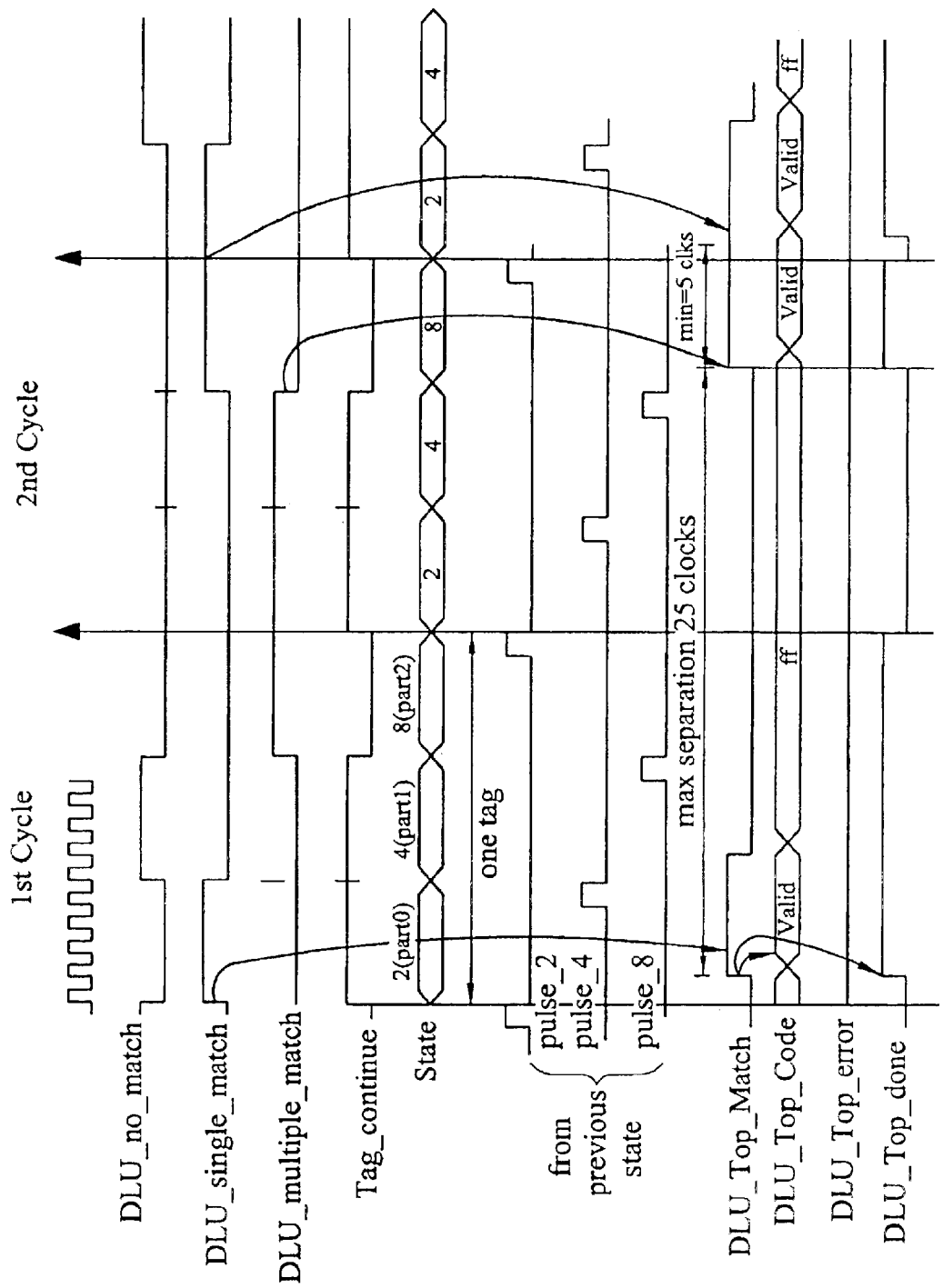
FIG. 31 is a timing diagram illustrating the operation of output stage for consecutive tag string data having three fragments according to one embodiment of the present invention.

FIG. 31 is a timing diagram illustrating the operation of output stage 2440 for consecutive tag string data having three fragments according to one embodiment of the present invention. The output stage 2440 receives the "DLU_no_match," "DLU_single_match," and "DLU_multiple_match" signals from the history tracking module 2430. The output stage 2440 also receives state information stored in delay buffer 2460 and a "tag_continue" single stored in delay buffer 2450. The output stage 2440 receives these inputs and generates a DLU match signal "DLU_top_match" and a DLU output code word "DLU_top_code" if a complete sequence input fragments matches a sequence of fragments in the DLU memory array. The output stage 2440 may also generate a "no match" signal indicating if a complete sequence of input fragments does not match a sequence of data fragments stored in the DLU memory array. When the output stage 2440 has completed processing the inputs, a DLU done signal "DLU_top_done" is generated.

Referring to FIG. 31, it can be seen that one of the features of the present embodiment is that the DLU may be able to find a match prior to receiving all the fragments of an input signal. As shown in FIG. 31, during the first cycle, the output stage 2440 receives an active "DLU_single_match" from the history tracking module 2430. Using the "DLU_single_match" signal, the state information (i.e., TAG_0 state=2), and tag continue information, the output stage 2440 is able to determine that the first fragment input signal matches a unique fragment in the first memory bank of the DLU memory array. Thus, the output stage generates a "DLU_top_done" signal, a "DLU_top_match" signal, and a "DLU_top_code." However, during the second cycle the output stage 2440 receives an active "DLU_multiple_match" from the history tracking module 2430 for both the first and second fragments. A single match is received only on this last fragment. This may correspond to two strings having the same first and second fragments, but a unique third fragment. Using the "DLU_single_match" signal, the state information (i.e., TAG_2 state=8), and tag continue information, the output stage 2440 is able to determine that the third fragment unique identifies a string stored across three memory banks in the DLU memory array. Thus, the output stage generates a "DLU_top_done" signal, a "DLU_top_match" signal, and a valid "DLU_top_code."

Figure 32:
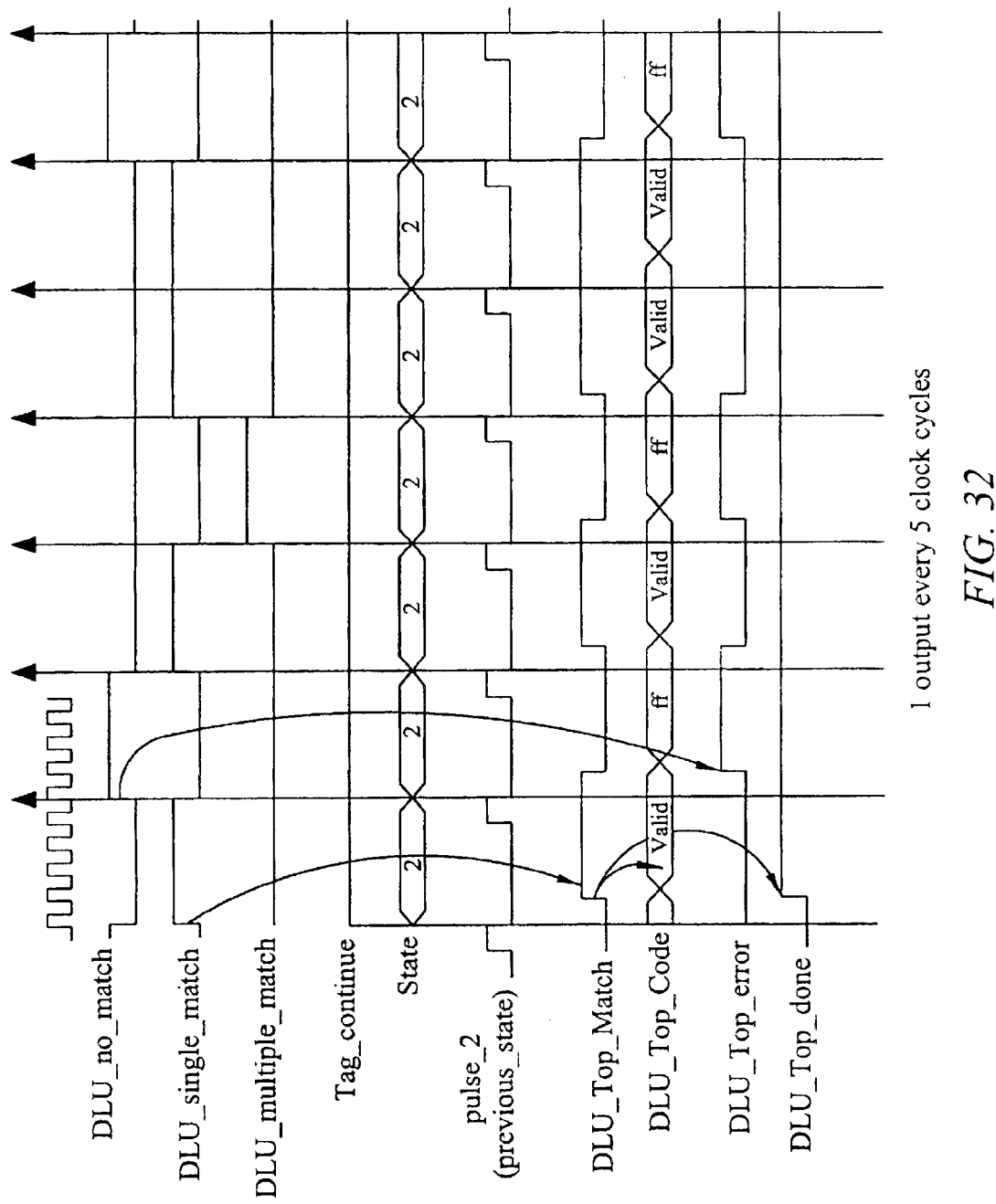
FIG. 32 is a timing diagram illustrating the operation of output stage for consecutive tag string data having one fragment length each, according to one embodiment of the present invention.

FIG. 32 is a timing diagram illustrating the operation of output stage 2440 for consecutive tag string data having one fragment length each, according to one embodiment of the present invention. During each cycle a new fragment is received and the tag continue bit is thus kept inactive. On the first cycle, a single match is produced, and the output stage 2440 generates a "DLU_top_done" signal and a "DLU_top_match" signal, and drives the code word onto the output "DLU_top_code." On the second cycle, a "DLU_no_match" is produced, and the output stage 2440 generates a "DLU_top_error" (i.e., a no match) signal and the code word on the output "DLU_top_code" is "don't care" "ff."

Figure 33:
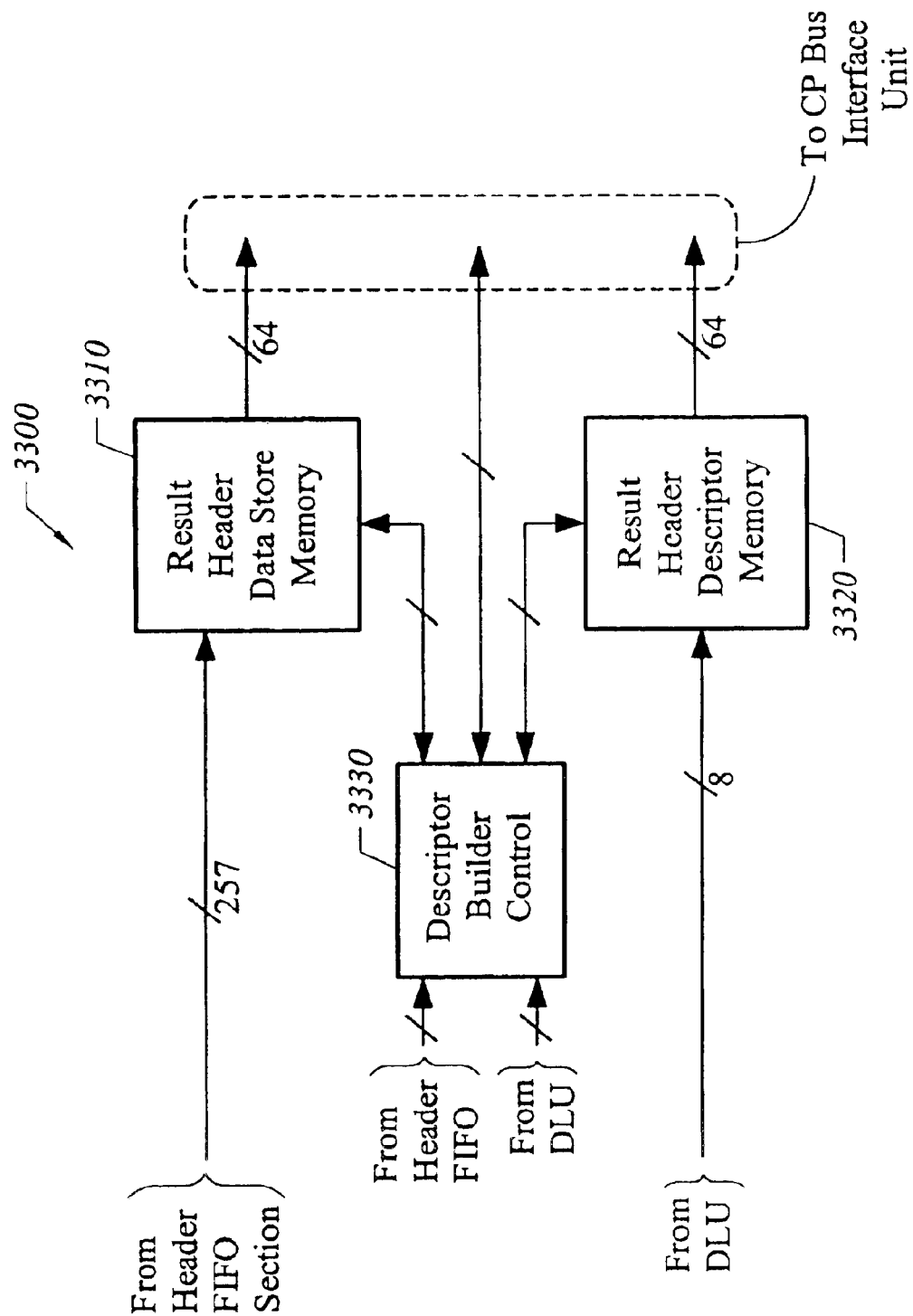
FIG. 33 illustrates a block diagram of a descriptor builder according to one embodiment of the present invention.

FIG. 33 is a block diagram illustrating a descriptor builder 3300, also referred to as a query builder, utilized in a parsing engine according to one embodiment of the present invention. The descriptor builder 3300 includes a result header data store ("RHDS") memory 3310, a result header descriptor ("RHD") memory 3320, and a descriptor builder control unit 3330. The descriptor builder 3300 generates parser output data structures for a parsing operation. The RHDS memory 3310 is coupled to receive the header string data and valid bit from header FIFO 624 of FIG. 6. The header string data may then be transmitted to CP bus interface unit 612 under the control of the descriptor builder control unit 3330. The RHD memory 3320 receives a code word result from the DLU if the tag string data, corresponding to the header string data in the RHDS memory 3310, matches one of the elements of the DLU (i.e., if the DLU returns a match signal). The RHD memory 3320 also receives an address pointer (discussed below) from the descriptor builder control unit 3330. The contents of the RHD memory 3320 may subsequently be transmitted to CP bus interface unit 612 under the control of the descriptor builder control unit 3330.

Figure 34:
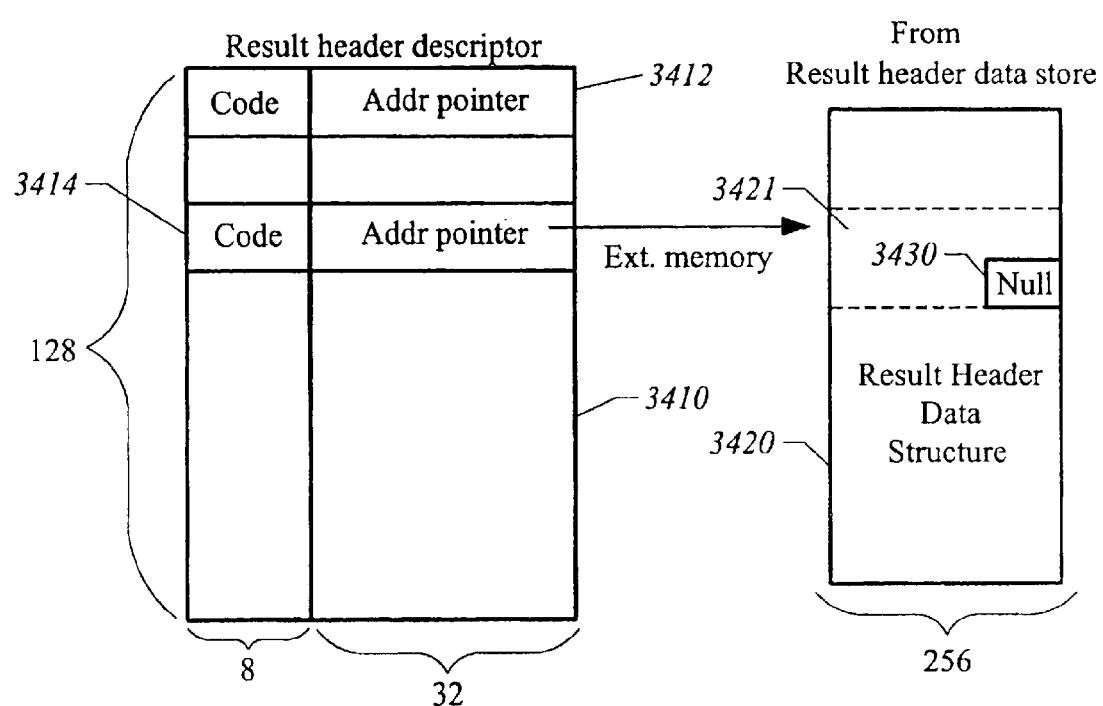
FIG. 34 illustrates a data structure generated by the parser after a parsing operation according to one embodiment of the present invention.

The data structure generated by the parser after a parsing operation according to one embodiment of the present invention is shown in FIG. 34. The first part of the parser output data structure is a result header descriptor 3410. The result header descriptor is a 128×40 data structure. Each element of the result header descriptor 3410 includes a code word field 3414 and an address pointer field 3412. The code word is the value returned by the DLU if tag string data matches one of the tags in the DLU. For example, the code word may be an 8-bit code corresponding to a protocol tag string. The address pointer field 3412 is a pointer to the start location of the header string data in external memory. For example, the address pointer may be a 32-bit CP memory address where the header string data, corresponding to the particular tag and code word, may be stored by the parser. Therefore, the result header descriptor 3410 may contain up to 128 code words and address pointers that indicate the location of the header string data corresponding to each tag. The result header descriptor data structure 3410 may be initially generated in the RHD memory 3320 of FIG. 33 during a parsing operation on a given layer. The result header descriptor 3410 may then be moved to external memory (e.g., CP memory) after the parser has completed parsing the layer or when the RHD memory 3420 is full.

The second part of the parser output data structure is the result header data structure 3420. The result header data structure 3420 is created by the parser in an external memory and includes the header string data 3421 corresponding to each code word in the result header descriptor 3410. The header string data is speculatively loaded from the header FIFO 624 of FIG. 6, into the RHDS memory 3310 in the descriptor builder 3300, and subsequently into external memory (e.g., CP memory) on the occurrence of a match signal from the DLU. The header string data 3421 in external memory is accessible by the address pointers 3412 in the result header descriptor 3410. Each header string data has a NULL string 3430 appended at the end to indicate the end of the header string data associated with that code word. The starting address pointer, indicating the start address of the header string data in external memory, may be specified by software in a configuration register (e.g., in the load/store unit 614). Accordingly, the address pointer 3412 may be generated by the load/store unit 614 of FIG. 6 by transmitting the start address pointer value in the configuration register to the descriptor builder control unit 3330. The descriptor builder control unit 3330 may then forward the start address pointer value to the result header descriptor 3410, in RHD memory 3320, before the result header descriptor is subsequently loaded into external memory.

Referring again to FIGS. 6 and 33, when the DLU unloads the tag string data from the tag FIFO 623, the descriptor builder 3300 may also unloaded the corresponding header string from the header FIFO 624 into RHDS memory 3310. Additionally, each tag string data may have multiple associated header string data, which may also be unloaded into the RHDS memory 3310. If the DLU returns a match signal, the header string data should be retained and transmitted to the result header data structure in external memory. If the DLU does not return a match signal, then the header string data should be ignored. Therefore, according to one embodiment of the present invention, the header string data may be speculatively loaded into the RHDS memory 3310 while the corresponding tag string data is processed by the DLU. If the DLU returns a match signal, the header string data is transmitted from the RHDS memory 3310 to external CP memory, and the start address pointer in the result header descriptor 3412 is programmed to the start address of the header string data in CP memory. However, if the DLU does not return a match, a RHDS memory 3310 according to one embodiment of the present invention discards the header string data associated with the tag string data in the DLU. The techniques of the present invention are advantageous because the speculative loading of header string data, which is associated with the tag string data, allows space in the string FIFO 622 to be freed up to receive additional upstream inputs from the string extractor. Thus, the processing efficiency of the data processing system is increased. Of course, it is to be understood that speculative loading of data according to embodiment of the present invention may be advantageous in other systems as well.

Figure 35:
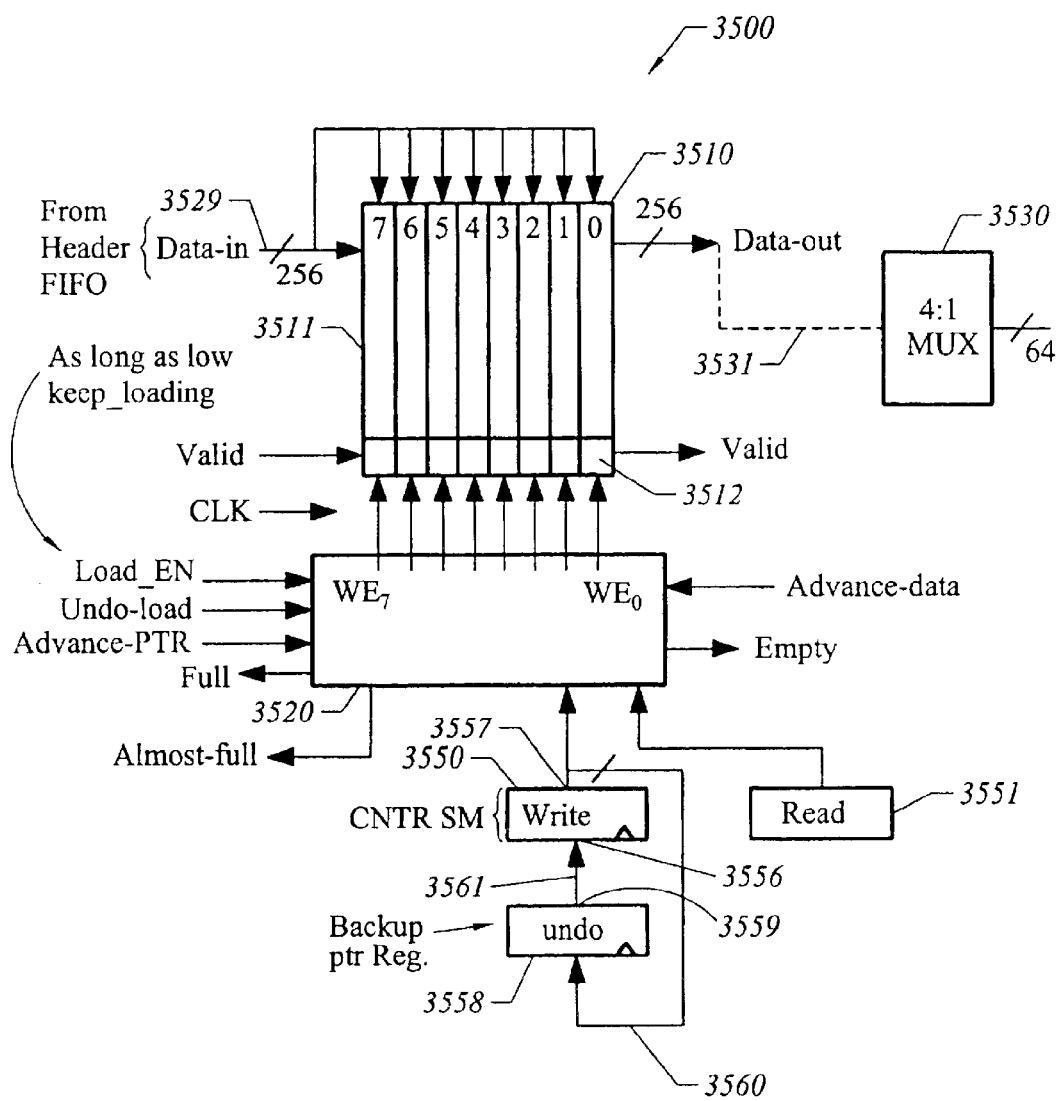
FIG. 35 illustrates a speculative memory that may be utilized in a result header data store memory according to one embodiment of the present invention.

FIG. 35 illustrates a speculatively loaded memory 3500 that may be utilized in the RHDS memory 3310 according to one embodiment of the present invention. The speculative memory includes a memory block 3510, a memory control unit 3520, and an output multiplexor 3530. The memory block 3510 is divided into rows and columns of memory cells. Each row in the memory block may be identified by an address. For example, memory block 3510 may include 8 rows 3511 each having a unique address (e.g., memory addresses 0–7). In one embodiment, each row may be 256-bits wide (i.e., 256 columns). In another embodiment, each row may be 48-bits wide. Header data strings may be received in memory block 3510 on header string bus 3529. Each row 3511 in the speculative memory 3500 may also include a valid bit 3512.

The memory control unit 3520 receives control signals load_EN and advance_data. When memory control unit 3520 receives a load_EN signal, data no header string bus 3529 is written into memory block 3510. Memory control unit 3520 is coupled to a write register 3550 that is loaded with an address of the memory block. The data on the header string bus 3529 may be written into the memory block at the address held in the write register. In one embodiment the write register is a counter that receives an increment signal as data is loaded into the memory block. Alternatively, when memory control unit 3520 receives an advance_data signal, data in memory block 3510 is read from the memory on data out bus 3531. Memory control unit 3520 is also coupled to a read register 3551 that is loaded with an address of the memory block. Data on the header string bus 3529 may be read from the memory block at the address held in the read register. In one embodiment the read register is a counter that receives an increment signal as data is read out of the memory block.

Memory control unit 3520 also receives control signals advance_PTR ("advance signal") and undo_load ("undo signal"). In one embodiment, the advance_PTR and undo_load control signals are used to control the loading of addresses in the write register 3550 and an undo register 3555. At the beginning of a memory write operation, the write register may be loaded with an initial start address for the immediately subsequent write operation. When the immediately subsequent write operation is completed, the write pointer will be loaded with a modified start address, indicating when data will be written to in the next write operation. For example, if the initial start address is the address for row 2, then data will be written into the memory block beginning at row two. As data is written into the memory, the write register may be incremented as rows are filled. If rows 2, 3, and 4 are filled by the write operation, then the modified start address will indicate row 5. Undo register 1055 is used to hold the address of the immediately preceding write operation. Thus, the undo register will be loaded with the start address for row 2 as a result of the above mention write operation. In one embodiment, the start address for a write operation may be stored into the undo register at the beginning of each write operation. After the write operation is complete, the memory control unit may be required to update either the write register or the undo register before the next write operation.

While the advance signal and undo signal are in an inactive state, the control circuit 3520 will maintain the values loaded into the write and undo registers. However, if the advance signal enters an active state, then the address in the write register 3550 is stored into the undo register 3555. An active advance signal may be received if, for example, the DLU transmits a "match" signal on the result bus. Accordingly, the header string data speculatively loaded into the memory block 3520 may be retained for further processing. On the other hand, if the undo signal enters an active state, then the address in the undo register 3555 is stored into the write register 3550. An active undo signal may be received if, for example, the DLU transmits a "no match" signal on the result bus. Accordingly, next subsequent memory write operation will begin at the start address for the immediately preceding write operation. As a result, the header string data speculatively loaded into the memory block 3520 will be overwritten, and thus discarded. It is to be understood that the above signaling scheme is illustrative of the operation of the speculatively loaded memory, and that other signaling schemes for controlling the memory and loading the write and undo registers could also be used.

In one embodiment, the write register includes a write data input 3556 and a write data output 3557. Additionally, the undo register may include an undo data input 3558 and an undo data output 3559. In one exemplary embodiment, the write data input is coupled to the undo data output by a data bus 3560, and the write data output is coupled to the undo data input by a data bus 3561. Address values in the write and undo registers may be transferred between the registers by activating load input enable lines for each register (not shown).

In one embodiment, the memory control circuit 3520 includes a full signal, almost_full signal, and empty signal. The memory control circuit 3520 may assert the full signal when the write address is equal a last row address in the memory block. Additionally, the memory control circuit 3520 may assert the almost_full signal when the write address is equal to a predefined intermediate row address in the memory block. Furthermore, the memory control circuit 3520 may asset the empty signal when the write address is equal a first row address in the memory block. In another embodiment, the memory control circuit 3520 may include a reset signal for initializing the read, write, and undo registers. The reset signal may be coupled to the read register, write register, and undo register. When the reset signal is in an active state, the read, write and undo registers may be set to the same initial address.

Figure 36:
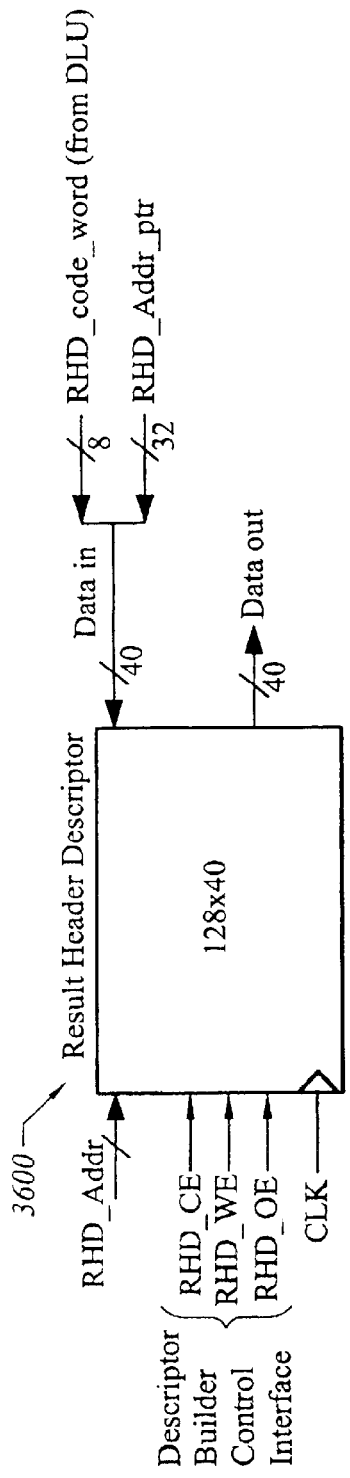
FIG. 36 illustrates a result header descriptor memory according to one embodiment of the present invention.

FIG. 36 illustrates a result header descriptor ("RHD") memory 3600 according to one embodiment of the present invention. The RHD memory 3600 may be a 128×40 memory array. The RHD memory array may receive the result header descriptor code word from the DLU (e.g., an 8-bit RHD_code_word). Additionally, the RHD memory may receive an address pointer value. The address pointer value may be a 32-bit address indicating the external memory location of the header string data corresponding to a particular code word. The RHD memory may also receive control signals from the descriptor builder control unit 1830 of FIG. 18. The control signals may include memory address signals RHD_Addr, chip enable signal RHD_CE_, write enable signal RHD_WE_, and output enable signal RHD_OE_. The RHD memory may also receive a clock signal CLK. Data in the RHD memory may be transmitted to the CP interface unit 612 of FIG. 6 on a data out line. In one embodiment, the data out line is a 40-bit data line.

Figure 37:
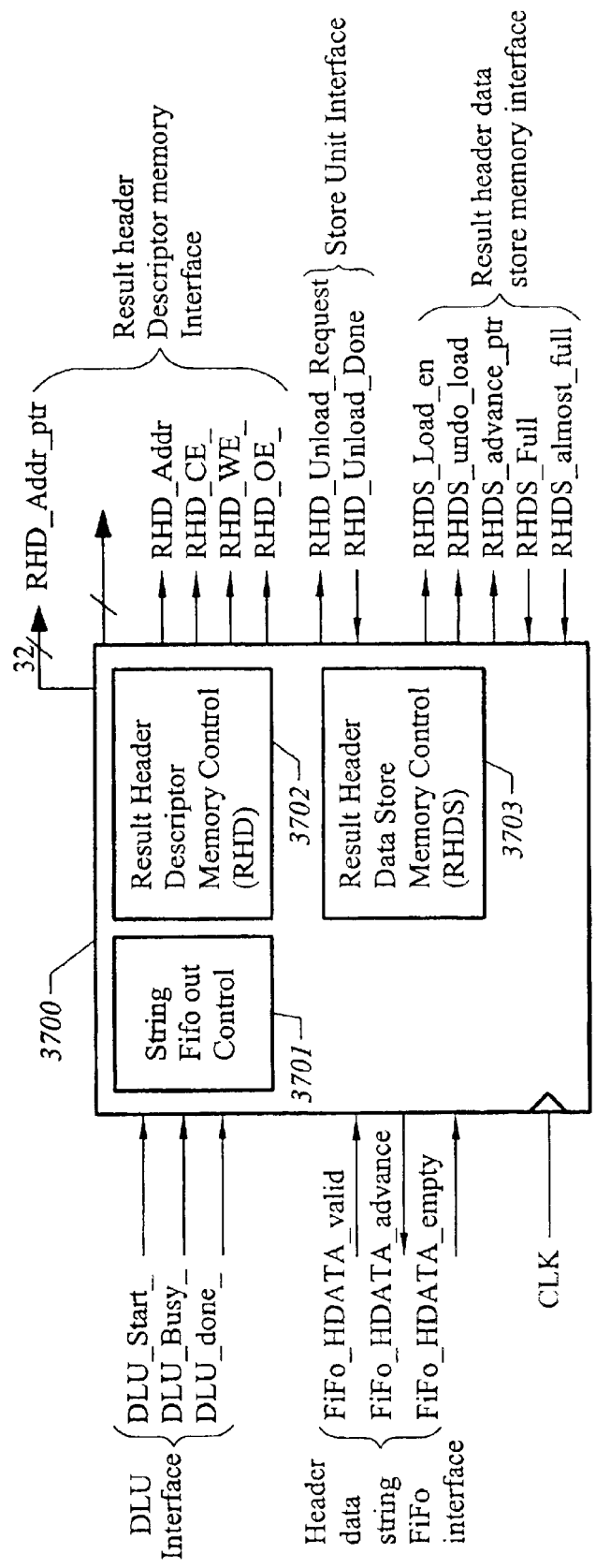
FIG. 37 illustrates a descriptor builder control unit according to one embodiment of the present invention.

FIG. 37 illustrates a descriptor builder control unit 3700 according to one embodiment of the present invention. The descriptor builder control unit 3700 includes a result header descriptor memory control unit ("RHD control") 3702, a result header data store memory control unit ("RHDS control") 3703, and a string FIFO out control unit 3701 for controlling the loading of the header string data from header FIFO 624 of FIG. 6. The RHD control unit 3702 may receive DLU status signals DLU_start_, DLU_busy_, and DLU_done_. Additionally, the RHD control unit may include header FIFO interface signals FIFO_HDATA_VALID (e.g., the header valid data bit), FIFO_HDATA_ADVANCE (e.g., a header FIFO advance signal), and FIFO_HDATA_EMPTY (e.g., a header FIFO empty signal). Furthermore, the RHD control unit may interface with the result header descriptor ("RHD") memory with signals RHD_ADDR_PTR (e.g., the address pointer to external memory), RHD_ADDR (e.g., the storage address in RHD memory), RHD_CE_ (e.g., enable), RHD_WE_ (e.g., write enable), and RHD_OE_ (e.g., output enable). The result header data store ("RHDS") memory 3310 of FIG. 33 also interfaces with the RHDS control unit 3703 over signal lines RHDS_LOAD_EN, RHDS_UNDO_LOAD, RHDS_ADVANCE_PTR, RHDS_FULL, and RHDS_ALMOST_FULL. Moreover, data in the RHDS memory 3310 and RHD memory 3320 may be transmitted to external memory by RHD control unit signals RHD_UNLOAD_REQUEST and RHD_UNLOAD_DONE, which are coupled to the system interface unit 610.

Having fully described alternative embodiments of the present invention, other equivalent or alternative techniques for implementing the systems and techniques of the present invention will be apparent to those skilled in the art. Accordingly, the embodiments disclosed above should be considered illustrative and not limiting when considered in light of the attached claims.

What is claimed is:
1. A memory system comprising:
a memory array for storing a plurality of data elements and a plurality of code words, the memory array comprising a plurality of memory blocks;
an address generator including an address line coupled to each memory block to simultaneously access individual memory locations in each memory block, the memory blocks producing a data element on a memory block output in response to receiving an address signal on the address line; and
a plurality of comparators, each comparator coupled to receive a memory block output and an input signal,
wherein when the memory block output matches the input signal, the memory system transmits a match signal and at least one of the code words on a result bus, and when the memory block output does not match the input signal, the memory system does not transmit a match signal and at least one of the code words on the result bus, and
a first portion of the data elements and code words belong to a first protocol and a second portion of the data elements and code words belong to a second protocol.
2. The memory system of claim 1 wherein the first and second protocols are selected from the group consisting of HTTP, SMTP, FTP, XML, ebXML, DNS, SSL, and POP3.
3. A memory system comprising:
a memory array for storing a plurality of data elements and a plurality of code words, the memory array comprising a plurality of memory blocks;
an address generator including an address line coupled to each memory block to simultaneously access individual memory locations in each memory block, the memory blocks producing a data element on a memory block output in response to receiving an address signal on the address line;
a plurality of comparators, each comparator coupled to receive a memory block output and an input signal,
wherein when the memory block output matches the input signal, the memory system transmits a match signal and at least one of the code words on a result bus, and when the memory block output does not match the input signal, the memory system does not maintain a match signal and at least one of the code words on the result bus; and a register coupled to the address generator, the register including a code indicating the number of data elements in each block that correspond to a protocol.

4. A memory system comprising:

a memory array for storing a plurality of data elements and a plurality of code words, the memory array comprising a plurality of memory blocks;

an address generator including an address line coupled to each memory block to simultaneously access individual memory locations in each memory block, the memory blocks producing a data element on a memory block output in response to receiving an address signal on the address line;

a plurality of comparators, each comparator coupled to receive a memory block output and an input signal, wherein when the memory block output matches the input signal, the memory system transmits a match signal and at least one of the code words on a result bus, and when the memory block output does not match the input signal, the memory system does not transmits a match signal and at least one of the code words on the result bus; and a register coupled to the address generator, the register including one or more bits for indicating which protocol from a plurality of protocols is enabled.

5. A memory system comprising:

a memory array for storing a plurality of data elements and a plurality of code words, the memory array comprising a plurality of memory blocks;

an address generator including an address line coupled to each memory block to simultaneously access individual memory locations in each memory block, the memory blocks producing a data element on a memory block output in response to receiving an address signal on the address line;

a plurality of comparators, each comparator coupled to receive a memory block output and an input signal, wherein when the memory block output matches the input signal, the memory system transmits a match signal and at least one of the code words on a result bus, and when the memory block output does not match the input signal, the memory system does not transmit a match signal and at least one of the code words on the result bus, and each memory block includes a plurality of memory locations having unique addresses, and each memory location includes a data element and a corresponding code word.

6. A memory system comprising:

a memory array for storing a plurality of data elements and a plurality of code words, the memory array comprising a plurality of memory blocks;

an address generator including an address line coupled to each memory block to simultaneously access individual memory location in each memory block, the memory blocks producing a data element on a memory block output in response to receiving an address signal on the address line; and a plurality of comparators, each comparator coupled to receive a memory block output and an input signal, wherein when the memory block output matches the input signal, the memory system transmits a match signal and at least one of the code words on a result bus, and when the memory block output does not match the input signal, the memory system does not transmit a match signal and at least one of the code words on the result bus, and a first portion of the plurality of memory blocks stores the plurality of data elements and a second portion of the plurality of memory blocks stores the plurality of code words.

7. A memory system comprising:

a memory array for storing a plurality of data elements and a plurality of code words, the memory array comprising a plurality of memory blocks;

an address generator including an address line coupled to each memory block to simultaneously access individual memory locations in each memory block, the memory blocks producing a data element on a memory block output in response to receiving an address signal on the address line; and a plurality of comparators, each comparator coupled to receive a memory block output and an input signal, wherein when the memory block output matches the input signal, the memory system transmits a match signal and at least one of the code words on a result bus, and when the memory block output does not match the input signal, the memory system does not transmit a match signal and at least one of the code words on the result bus, and the memory array comprises a plurality of memory cells, each memory cell including one or more memory banks and a code word bank, wherein each of the one or more memory banks includes one of the plurality of memory blocks for storing a plurality of data elements, and each code word bank includes one of the plurality memory blocks for storing a plurality of code words.

8. A method comprising:

receiving input string data in a memory system;

generating a start address;

transmitting the start address to a memory array to simultaneously access a plurality of memory blocks;

comparing the input string data to string data elements stored in the memory locations in each of the plurality of memory blocks identified by the start address; and transmitting a match signal and a code word when the input string data matches one of the string data elements, wherein the memory array stores string data for a plurality of protocols including at least two protocols selected from the group consisting of HTTP, SMTP, FTP, XML, ebXML, DNS, SSL, and POP3.

9. A method comprising:

receiving input string data in a memory system;

generating a start address;

transmitting the start address to a memory array to simultaneously access a plurality of memory blocks;

comparing the input string data to string data elements stored in the memory locations in each of the plurality of memory blocks identified by the start address;

transmitting a match signal and a code word when the input string data matches one of the string data elements; and offsetting the start address by a first value when the input string data is part of a first protocol and offsetting the start address by a second value when the input string data is part of a second protocol.

10. The method of claim 9 further comprising offsetting the start address in accordance with an enable bit stored in a register.

11. A method comprising:

receiving input string data in a memory system;

generating a start address;

transmitting the start address to a memory array to simultaneously access a plurality of memory blocks;

comparing the input string data to string data elements stored in the memory locations in each of the plurality of memory blocks identified by the start address;

transmitting a match signal and a code word when the input string data matches one of the string data elements; and sequentially transmitting successive addresses simultaneously to each memory block until the input string data matches one of the string data elements.

12. A method comprising:

receiving input string data in a memory system;

generating a start address;

transmitting the start address to a memory array to simultaneously access a plurality of memory blocks;

comparing the input string data to string data elements stored in the memory locations in each of the plurality of memory blocks identified by the start address;

transmitting a match signal and a code word when the input string data matches one of the string data elements; and sequentially transmitting successive address simultaneously to each memory block until a segment depth count is reached, and in accordance therewith, transmitting a no match signal.

13. The method of claim 12 further comprising sequentially transmitting successive addresses until a first segment depth count is reached when a first protocol is enabled, and sequentially transmitting successive addresses until a second segment depth count is reached when a second protocol is enabled.

14. A method comprising:

receiving input string data in a memory system;

generating a start address;

transmitting the start address to a memory array to simultaneously access a plurality of memory blocks;

comparing the input string data to string data elements stored in the memory locations in each of the plurality of memory blocks identified by the start address;

transmitting a match signal and a code word when the input string data matches one of the string data elements; and storing the code word and string data elements in first and second fields of the same memory locations.

* * * * *